United States Patent [19]
Nakata et al.

[11] Patent Number: 5,719,758
[45] Date of Patent: Feb. 17, 1998

[54] INVERTER CONTROL METHOD AND INVERTER APPARATUS USING THE METHOD

[75] Inventors: Hirofumi Nakata, Yamatotakada; Hirokazu Kodama, Gojou; Masaki Eguchi, Uji; Tsukasa Takebayashi, Yamatotakada, all of Japan

[73] Assignee: Sharp Kabushiki Kaisha, Osaka, Japan

[21] Appl. No.: 770,509

[22] Filed: Dec. 20, 1996

[30] Foreign Application Priority Data

Dec. 20, 1995 [JP] Japan .................................. 7-331858
Oct. 31, 1996 [JP] Japan .................................. 8-290614

[51] Int. Cl.⁶ .............................................. H02M 7/48
[52] U.S. Cl. .............................. 363/98; 363/132; 323/906
[58] Field of Search ........................... 363/15, 16, 17, 363/34, 95, 97, 98, 131, 132; 323/906, 299, 303

[56] References Cited

U.S. PATENT DOCUMENTS 4,375,662  3/1983  Baker ................................. 363/95
4,404,472  9/1983  Steigerwald ................... 323/906 X
5,268,832  12/1993  Kandatsu ............................. 363/95
5,625,539  4/1997  Nakata et al. ........................ 363/17

FOREIGN PATENT DOCUMENTS 57-206929  12/1982  Japan .

Primary Examiner—Peter S. Wong
Assistant Examiner—Y. J. Han

[57] ABSTRACT

A pulse width of a pulse train signal used for PWM (pulse width modulation) control is monitored. When a variation of the pulse width substantially disappears within a specified time, it is determined that an operating point on an output characteristic curve of a photovoltaic array is located on the open-circuit voltage side of a maximum power point. When the variation of the pulse width does not disappear after the elapse of the specified time, it is determined that the operating point is located on the short-circuit current side of the maximum power point. Based on the determination result, the inverter control is performed such that the operating point follows the maximum power point.

28 Claims, 30 Drawing Sheets

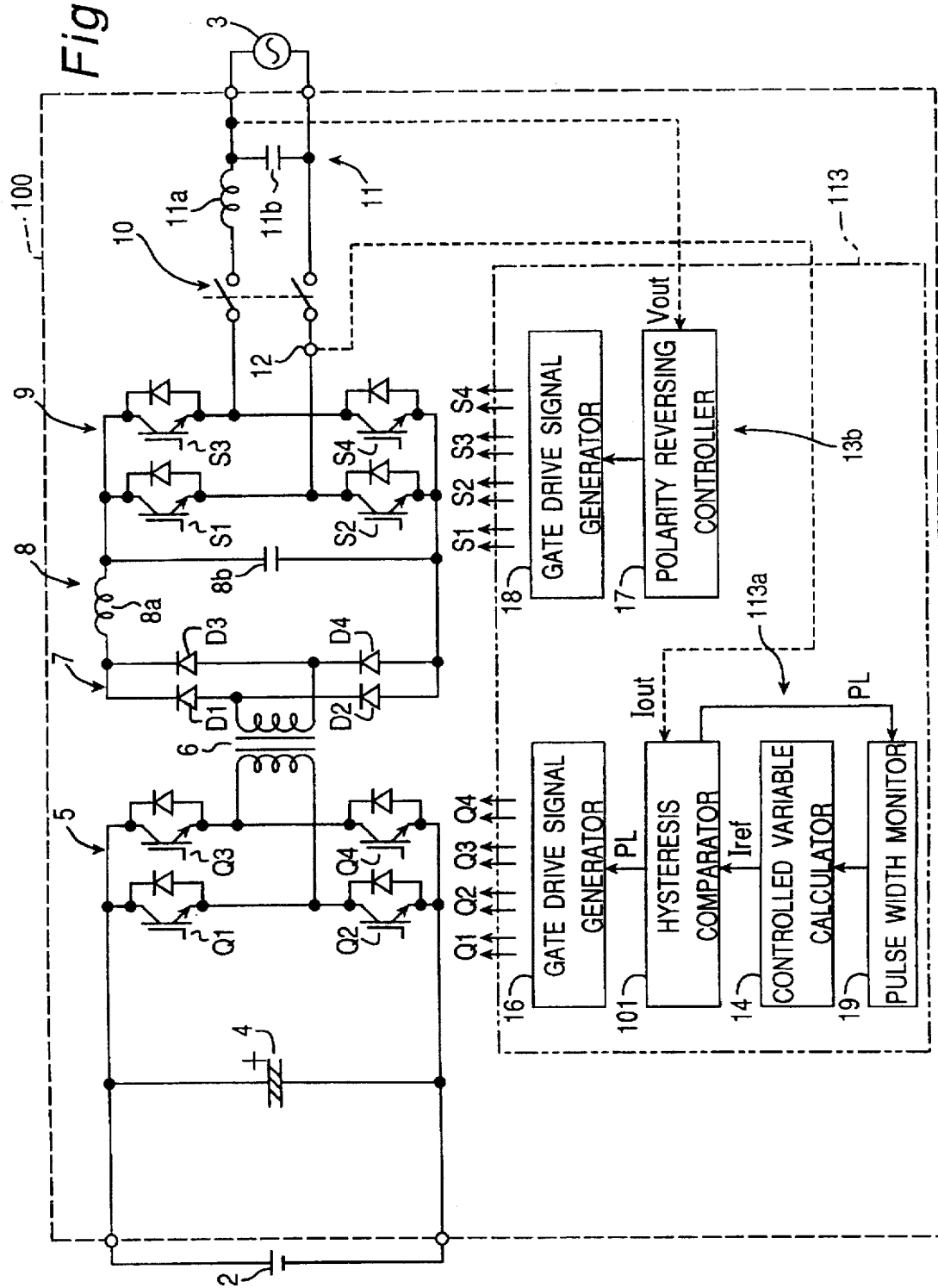

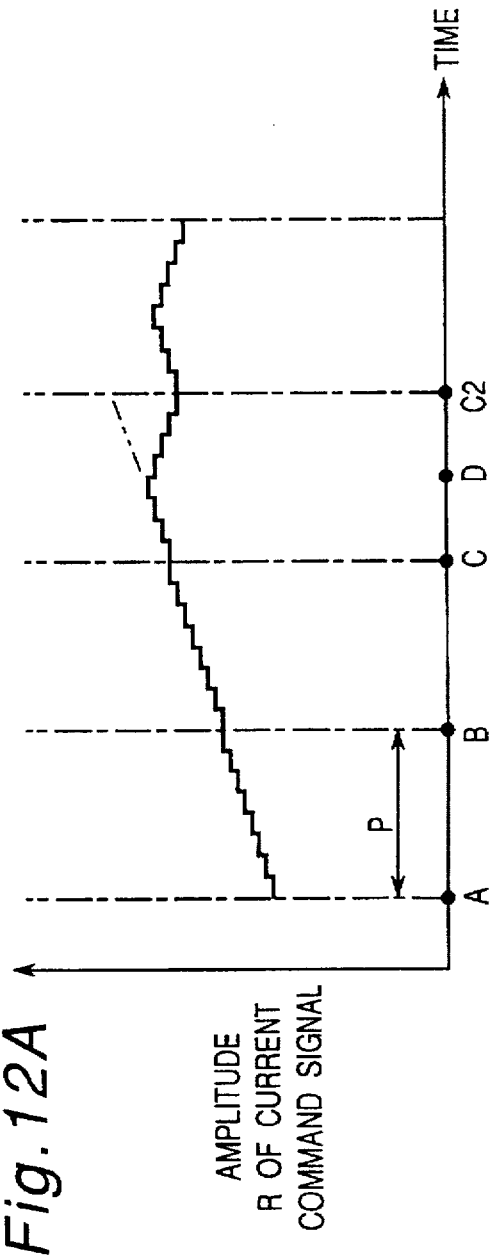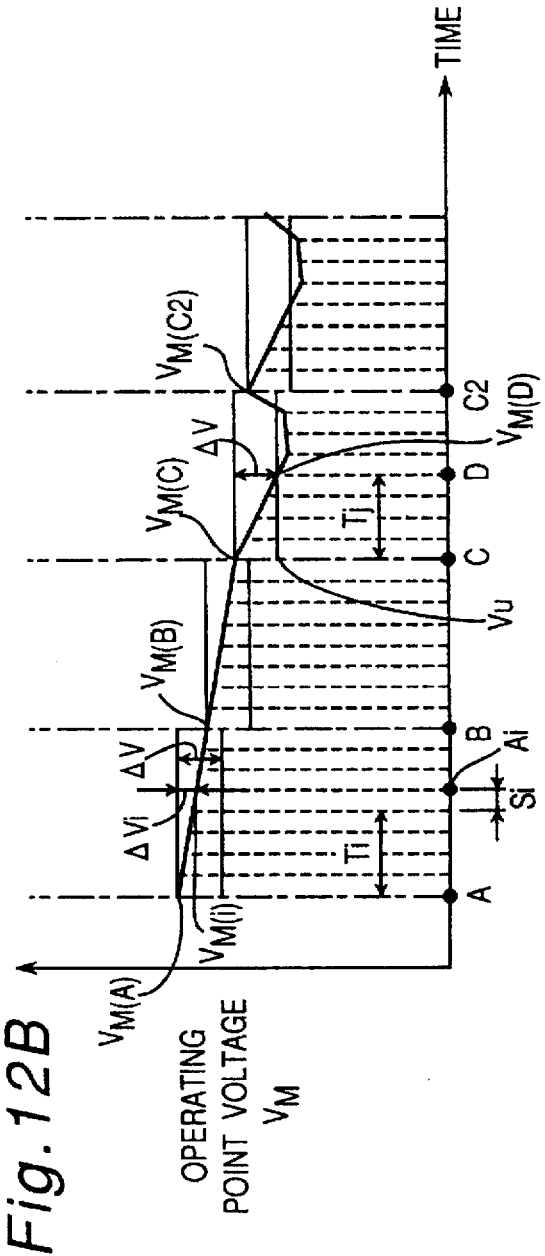

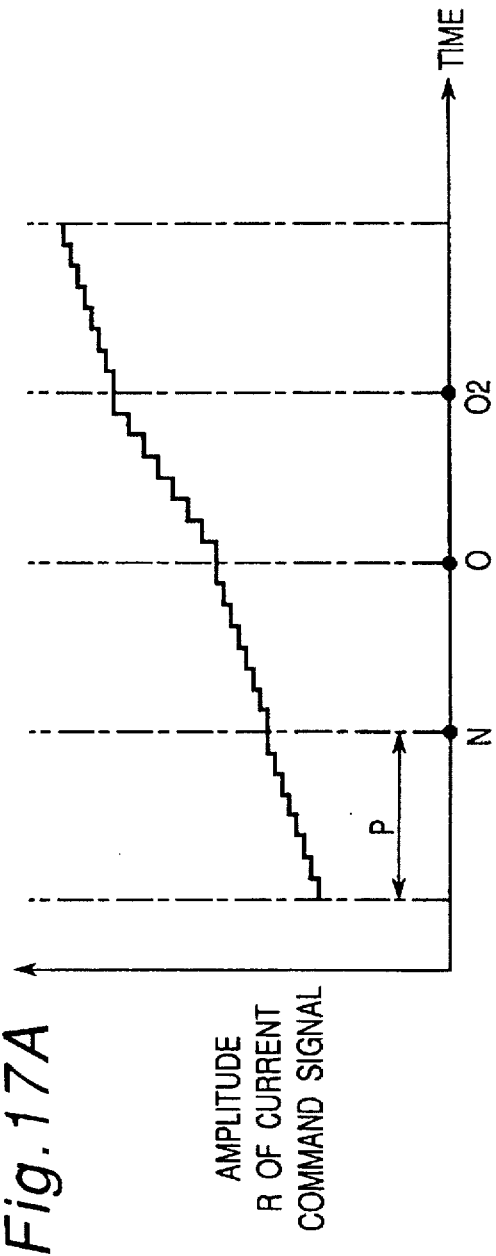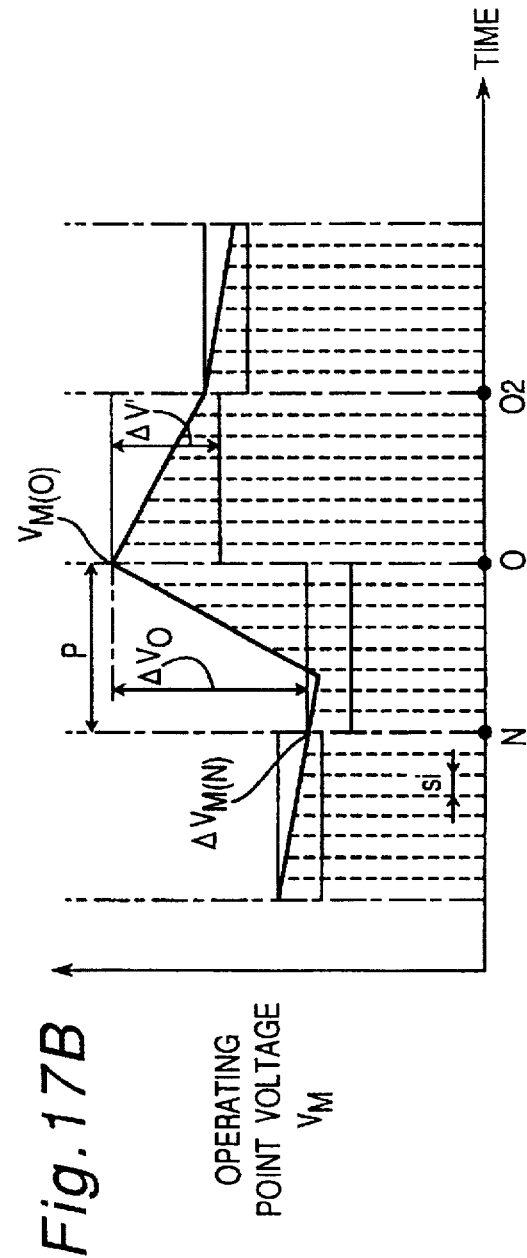
Fig. 17A
Fig. 17B

INVERTER CONTROL METHOD AND INVERTER APPARATUS USING THE METHOD

BACKGROUND OF THE INVENTION

The present invention relates to an inverter control method of controlling an inverter which converts DC power generated by an independent DC power supply, such as a solar battery, or photovoltaic array, into AC power and supplies the power to home- and business-use general AC loads or to existing commercial electric utility lines The present invention also relates to an inverter apparatus to which the control method is applied, and in particular, relates to maximum power point follow control.

It is been known that an output characteristic of a photovoltaic array which serves as a DC power supply changes depending on the variation of conditions such as the solar irradiance and the cell temperature of the photovoltaic array, and that a maximum power point at which a maximum power of the photovoltaic array can be taken out, exists on an output characteristic curve of the photovoltaic array. In view of the above, in conventional inverter apparatuses, the maximum power has been taken out of the photovoltaic array by executing the control of making a photovoltaic array operating point on the output characteristic curve of the photovoltaic array coincide with the maximum power point.

For such maximum power point follow control, there is known a conventional method of determining the maximum power point by obtaining the momentarily changing output characteristic curve of the photovoltaic array. However, since the output characteristic curve is nonlinear, it is not easy to obtain the output characteristic curve through calculation. Furthermore, since the output characteristic curve changes every moment, the inverter apparatus using this method has a complicated construction.

In view of the above, as a prior art inverter control method eliminating such inconveniences, there is known a control method of detecting the output power of a photovoltaic array from the DC voltage and the DC current of the photovoltaic array and making the photovoltaic array operating point follow the maximum power point. In concrete, the maximum power point is detected by shifting the photovoltaic array operating point along the output characteristic curve such that the obtained output power value of the photovoltaic array is maximized. A prior art inverter apparatus 50 to which this control method is applied will be described with reference to FIG. 27.

The inverter apparatus 50 converts DC power outputted from a photovoltaic array 51 into AC power having the same phase and frequency of 50/60 Hz as those of a commercial electric utility line 53 and supplies the power to the commercial electric utility line 53.

The DC power inputted from the photovoltaic array 51 into the inverter apparatus 50 is converted into a high-frequency AC (several tens to several hundreds kHz) by a high-frequency inverter bridge 54 and supplied to the primary side of a high-frequency transformer 55. The high-frequency transformer 55 has the role of isolating the photovoltaic array 51 side from the commercial electric utility line 53 side, and the high-frequency AC isolated by the high-frequency transformer 55 is rectified by a diode bridge 56 provided on the secondary side of the high-frequency transformer 55. The rectified components rectified in the diode bridge 56 are subjected to high-frequency component removal and smoothing by a filter circuit 57 comprised of a DC reactor and a capacitor connected in parallel with it. Then, the resulting DC having a full-rectified waveform obtained through the filter circuit 57 is subjected to polarity reversing control at a low-frequency (50/60 to several hundreds Hz) in a low-frequency inverter bridge 58, so that a low-frequency sine-wave AC is obtained.

Further, in the stage previous to the high-frequency inverter bridge 54 are provided a DC capacitor 59 for regulating the fluctuation of the input power to the inverter apparatus 50 and a DC input current detector 60. In the stage subsequent to the low-frequency inverter bridge 58 are provided an inverter output current detector 61, a relay 62 for effecting connection with and disconnection from the commercial electric utility line 53 side, and an AC filter 63 for absorbing higher harmonic components.

The switching control for the high-frequency inverter bridge 54 and the low-frequency inverter bridge 58 is performed by a control circuit 64 as follows. First, switching control of the low-frequency inverter bridge 58 will be described. That is, based on a commercial electric utility line voltage signal $V_{out}$ detected from the stage subsequent to the AC filter 63, the direct current having the full-rectified waveform is subjected to polarity reversing control at a low-frequency (50/60 to several hundreds Hz) in a polarity reversing controller 65 inside the control circuit 64. Thereby, four switching elements S1 through S4 of the low-frequency inverter bridge 58 are subjected to on/off control by a gate drive signal generator 66.

Switching control of the high-frequency inverter bridge 54 is performed as follows. That is, a current command signal (reference waveform signal for an inverter output current) $I_{ref}$ is generated in a controlled variable calculator 68 inside the control circuit 64. Then, in a PWM (pulse width modulation) controller 67, an error between an inverter output current signal $I_{out}$ detected by the inverter output current detector 61 and the current command signal $I_{ref}$ is calculated. Further, PWM modulation control is performed with an amplified error signal obtained by amplifying the error and a carrier signal, thereby forming a pulse train signal PL. Further, the generated pulse train signal PL is outputted to a gate drive signal generator 69, and four switching elements Q1 through Q4 of the high-frequency inverter bridge 55 are subjected to the on/off control based on the pulse train signal PL.

In such an inverter apparatus 50, an inverter controlled variable for varying the inverter output is the amplitude R of the current command signal $I_{ref}$ used in the PWM modulation control.

The voltage at the photovoltaic array operating point at which the maximum power is taken out of the photovoltaic array 51 has a characteristic that the voltage changes every moment according to the solar irradiance and the cell temperature of the photovoltaic array 51. Therefore, a photovoltaic array current-to-voltage characteristic curve is as shown in FIG. 28. FIG. 28 shows characteristic curves for solar irradiances E11 and E12 and a cell temperature of t°C. Further, the inverter controlled variable that is the amplitude R of the current command signal $I_{ref}$, or load characteristic curves L5, L6 and L7 are shown as the inclinations of line segments representing respective controlled variables in FIG. 28.

Assuming that the characteristic curve in the case where the solar irradiance is E11 is IV(E11), the photovoltaic array operating point on the characteristic curve IV(E11) can be controlled to an arbitrary point ($P_1$, $P_2$, $P_3$) by changing the load characteristic curves (controlled variables) L5, L6 and L7. That is, assuming that the photovoltaic array operating point is $P_1$ in the case where the solar irradiance is E11 and the load characteristic curve (controlled variable) is L5, when the solar irradiance changes to E12, the photovoltaic array operating point shifts from the point $P_1$ to a point $P_1'$ on the load characteristic curve L5 so long as the load characteristic curve (controlled variable) L5 is constant. Likewise, the photovoltaic array operating points $P_2$ and $P_3$ shift to $P_2'$ and $P_3'$, respectively.

The control of taking out the maximum power from the photovoltaic array 51 having such a characteristic is as follows. That is, an operating point voltage $V_M$ obtained from a DC input voltage $V_{in}$ detected across the DC capacitor 59 and a DC input current $I_{in}$ detected by the DC input current detector 60 are inputted to a power calculator 70 inside the control circuit 64. The power calculator 70 calculates a DC input power $W_{in}$ from the inputted operating point voltage $V_M$ and DC input current $I_{in}$ and outputs the same to a power comparator 71. The power comparator 71 temporarily stores therein the inputted DC input power $W_{in}$ as DC input power $W_{in}'$.

Then, the power comparator 71 compares a newly inputted DC input power $W_{in}$ with the preceding DC input power $W_{in}'$ temporarily stored in the power comparator 71. Then, by the increase or decrease of the power obtained here and the sign of increase/decrease (the sign is positive when the controlled variable is increased, i.e., when the inclination of the load characteristic curve is increased, while the sign is negative when the controlled variable is decreased conversely) of the controlled variable that has been obtained at the preceding time and temporarily stored in the controlled variable calculator 68, the inverter controlled variable (the amplitude R of the current command signal $I_{ref}$ used in the PWM modulation control) is newly determined.

By controlling the switching elements Q1 through Q4 of the high-frequency inverter bridge 54 so as to turn them on and off based on the newly determined controlled variable, the photovoltaic array operating point P on the photovoltaic array characteristic curve is varied, thereby executing the control of making the output of the photovoltaic array 51 follow the maximum power point.

A relationship between the controlled variable and the photovoltaic array operating point on the photovoltaic array characteristic curve will be described with reference to FIG. 29. FIG. 29 shows a photovoltaic array power-to-voltage characteristic curve IV(E11) and IV(E12) at the solar irradiances E11 and E12.

Assume that at a photovoltaic array operating point v on the photovoltaic array power-to-voltage characteristic curve shown in FIG. 29, the switching elements Q1 through Q4 of the high-frequency inverter bridge 54 are subjected to the on/off control by the PWM modulation control at a controlled variable Kv. Then, the switching elements of the high-frequency inverter bridge 54 are further subjected to the on/off control at a controlled variable Kπ which is increased by one step from Kv so as to further follow the maximum power point from the point v. As a result, the photovoltaic array operating point shifts to a point π, and the DC input power $W_{in}$ that can be taken out of the photovoltaic array 51 increases.

In this case, if the following conditions:
(1) the present power value $W_{in}$ (Wπ) has increased from the preceding power value $W_{in}'$ (Wv); and
(2) the sign of increase/decrease of the controlled variable in the stage of shift from the preceding photovoltaic array operating point (v) to the present photovoltaic array operating point (π) is positive (+1 step)

are satisfied, the controlled variable is newly increased by one step.

Then, by executing the PWM modulation control by a newly set controlled variable Kρ and subjecting the switching elements Q1 through Q4 to the on/off control, the photovoltaic array operating point shifts to a point ρ.

At the point ρ, similarly to the preceding point π, the power value is increased and the sign of increase/decrease of the controlled variable is positive, and therefore, the controlled variable is further increased by one step to Kσ. Then, by executing the PWM modulation control by the newly set controlled variable Kσ and subjecting the switching elements Q1 through Q4 to the on/off control, the photovoltaic array operating point shifts to a point σ.

In this case, if the following conditions:
(3) the present power value $W_{in}$ (Wσ) has decreased from the preceding power value $W_{in}'$ (Wρ); and
(4) the sign of increase/decrease of the controlled variable in the stage of shift from the preceding photovoltaic array operating point (ρ) to the current photovoltaic array operating point (σ) is positive (+1 step)

are satisfied, the controlled variable is then decreased by one step to Kρ.

Then, the PWM modulation control is carried out by the newly set controlled variable Kρ to control the switching elements Q1 through Q4 so as to turn them on and off.

If reducing the controlled variable by one step to Kρ results in that the DC input power $W_{in}$ increases, that is, if the following conditions:
(5) the present power value $W_{in}$ has increased from the preceding power value $W_{in}'$; and
(6) the sign of increase/decrease of the controlled variable in the stage of shift from the preceding photovoltaic array operating point to the current photovoltaic array operating point is negative (−1 step)

are satisfied, the controlled variable is then increased by one step.

The above control operation is repeated so as to perform the control of making the photovoltaic array operating point follow the maximum power point.

However, the prior art inverter control method controls the photovoltaic array operating point on the photovoltaic array output characteristic curve by sequentially executing the various operations of: (a) detecting the DC input voltage signal $V_{in}$ and the DC input current signal $I_{in}$; (b) inspecting the increase/decrease of the power by calculating the DC input power value $W_{in}$ based on the detected signals $V_{in}$ and $I_{in}$; and (c) determining the inverter controlled variable by the increase/decrease of the inspected power value and the sign of increase/decrease of the controlled variable. Therefore, it takes much time to perform the control operation. Also, it takes much time for the output power of the photovoltaic array 51 to change after the control operation for the photovoltaic array operating point is performed, which results in a bad control response.

Furthermore, according to the prior art inverter control method, in the case where the solar irradiance abruptly changes when the photovoltaic array operating point shifts, it is impossible to decide whether the change of power has occurred as a consequence of the shift of the photovoltaic array operating point or the change of the solar irradiance. Consequently, the photovoltaic array operating point disadvantageously shifts in the wrong direction, so that the maximum power point cannot be readily and quickly reached. Therefore the conventional control method could not take out the maximum power of the photovoltaic array 51 efficiently.

Furthermore, the prior art control method requires detection of the DC input voltage $V_{in}$ and the DC input current $I_{in}$, and therefore, a detector and a detection circuit for detecting them are necessary. Furthermore, a circuit for calculating the output power of the photovoltaic array 51 and inspecting the increase/decrease of the power is also necessary. For the above reasons, the circuit for executing the control could not be constructed at low cost.

SUMMARY OF THE INVENTION

The object of the present invention is therefore to provide an inverter control method and inverter apparatus capable of achieving a good control response characteristic, efficiently taking out the maximum output power and suppressing the component cost low.

In order to accomplish the above object, the present invention provides an inverter control method which performs an on/off control of switching elements connected to a DC power supply such that an inverter output current signal coincides with a reference current waveform signal so as to convert DC power from the DC power supply into an AC power, comprising:

monitoring one of (1) a pulse width of a pulse train signal for executing the on/off control of the switching elements, (2) an error between the reference current waveform signal and the inverter output current signal and (3) change per unit time of voltage at a DC power supply operating point;

determining whether the DC power supply operating point is located on an open-circuit voltage side or on a short-circuit current side of a maximum power point on an output characteristic curve of the DC power supply based on a result of the monitoring; and controlling the inverter output based on a result of decision such that the DC power supply operating point follows the maximum power point.

According to the present invention, when it is determined that the operating point is located on the open-circuit voltage side of the maximum power point, the inverter output is increased such that the DC power supply operating point shifts toward the maximum power point. On the other hand, when it is determined that the operating point is located on the short-circuit current side of the maximum power point, the inverter output is decreased such that the operating point shifts to the open-circuit voltage side. Thereby, it is possible to make the DC power supply operating point follow the maximum power point.

Also, operations of increasing and decreasing the inverter output can be performed by increasing and decreasing an amplitude of the reference current waveform signal, respectively.

In an embodiment, the pulse width of the pulse train signal is monitored, and when a variation of the pulse width substantially disappears within a specified time, it is decided that the operating point on the output characteristic curve of the DC power supply is located on the open-circuit voltage side of the maximum power point. On the other hand, when the variation of the pulse width does not disappear after an elapse of the specified time, it is determined that the operating point is located on the short-circuit current side of the maximum power point. Then, based on the determination, the on/off operation of the switching elements is performed through pulse width modulation (PWM) control.

According to the method of this embodiment, when a photovoltaic array is used as a direct current supply, the operating point control for taking out a maximum DC power from the photovoltaic array is performed, not by an external signal such as a DC input voltage or a DC input current having an inferior accuracy, but by the inverter internal signal of the pulse width of the pulse train signal for executing the on/off control of the switching elements. Therefore, the inverter controlled variable can be rapidly changed according to an inverter output current. Therefore, the present invention achieves a maximum power point follow control which can rapidly control the operating point and which has an excellent accuracy with respect to the solar irradiance and the cell temperature change as well as a good control response characteristic.

Furthermore, even when the solar irradiance abruptly changes, the inverter control can be made to follow it, thereby allowing the operating point to follow the maximum power point. This allows the maximum power point follow control having a good control response characteristic to be performed.

Furthermore, the above arrangement obviates the provision of the circuit for detecting the external data of the DC input current, DC input voltage and the like, a photovoltaic array power calculating section and a photovoltaic array power comparing section, and this simplifies the circuit construction and allows the cost to be suppressed low.

According to one embodiment, when the pulse width becomes greater than a preset maximum permissible width, it is determined that the operating point is located on the short-circuit current side of the maximum power point.

In this case, even when the solar irradiance is great, the maximum power point follow control can be performed with high accuracy, and this is able to further improve the control response characteristic of the maximum power point follow control.

In an embodiment, the error between the reference current waveform signal and the inverter output current signal is monitored. When the error substantially disappears within a specified time, it is determined that the DC power supply operating point is located on the open-circuit voltage side of the maximum power point. Then, the amplitude of the reference current waveform signal is increased to shift the operating point toward the maximum power point. On the other hand, when the error does not disappear after an elapse of the specified time, it is determined that the operating point is located on the short-circuit current side of the maximum power point. The amplitude of the reference current waveform signal is then reduced to shift the operating point to the open-circuit voltage side.

Similar to the above method which monitors the pulse width of the pulse train signal, this inverter control method also performs the operating point control for taking out a maximum DC power from the photovoltaic array not by an external signal such as a DC input voltage or a DC input current having an inferior accuracy, but by the inverter internal signal representing the error between the reference current waveform signal and the inverter output current signal. Therefore, the inverter controlled variable can be rapidly changed according to the inverter output current. Therefore, the present invention achieves a maximum power point follow control which can rapidly control the operating point and which has an excellent accuracy with respect to the solar irradiance and the cell temperature change as well as a good control response characteristic.

Furthermore, even when the solar irradiance abruptly changes, the inverter control can be made to follow it, thereby allowing the operating point to follow the maximum power point. This allows the maximum power point follow control having a good control response characteristic to be performed.

Furthermore, the above arrangement obviates the provision of the circuit for detecting the external data of the DC input current, DC input voltage and the like, a DC power calculating section and a DC power comparing section, and this simplifies the circuit construction and allows the cost to be suppressed low.

Also, by monitoring the change per unit time of voltage at the DC power supply operating point, it can be determined based on the change what position on the output characteristic curve the operating point is located at. Therefore, in the case that the direct current supply is a photovoltaic array, even though the solar irradiance abruptly changes, the position of the operating point at that time is instantaneously determined.

When the solar irradiance is stable, the voltage at the photovoltaic array operating point scarcely changes per unit time. In such a case, by monitoring the change per unit time of the voltage at the photovoltaic array operating point while executing the control of increasing or decreasing the inverter output, the photovoltaic array operating point can be surely detected even when the solar irradiance is stable.

According to this embodiment, it is not required to obtain DC power in contrast to the prior art, and therefore, this arrangement obviates the need for the DC input current detector, detector circuit, DC power calculator and power comparator. The above arrangement is capable of simplifying the circuit construction, and therefore, the cost of the components of an inverter apparatus can be suppressed low.

It is acceptable to set an upper limit value of the change per unit time of voltage at the DC power supply operating point and compare the upper limit with the aforementioned monitored change of voltage. For example, the change per unit time of the voltage at the DC power supply operating point is monitored while executing the operation of increasing the inverter output. When the voltage at the DC power supply operating point is lowered and the change of voltage does not exceed the upper limit value, it is determined that the DC power supply operating point is located on the open-circuit voltage side of the maximum power point. When the voltage at the DC power supply operating point is lowered and the change of voltage exceeds the upper limit value, it is determined that the DC power supply operating point is located on the short-circuit current side of the maximum power point. By using this method, the position of the DC power supply operating point on the output characteristic curve is determined with high accuracy. When it is determined that the operating point is located on the open-circuit voltage side of the maximum power point, the operation of increasing the inverter output is continued. When it is determined that the operating point is located on the short-circuit current side of the maximum power point, the operation is switched to the operation of decreasing the inverter output. Therefore, the operating point can be made to rapidly follow the maximum power point.

By setting the controlled variable of the inverter output according to the magnitude of the change per unit time of voltage at the DC power supply operating point, the DC power supply operating point can be made to rapidly follow the maximum power point even when the change of voltage is great.

According to one embodiment, the DC power supply operating point is made to follow the maximum power point on the output characteristic curve by monitoring an error between a reference current waveform signal and an inverter output current signal in addition to the change per unit time of the voltage at the DC power supply operating point. In more detail, by monitoring the change per unit time of voltage at the photovoltaic array operating point when the DC power supply is a photovoltaic array, the photovoltaic array operating point can be made to rapidly follow the maximum power point when the solar irradiance abruptly changes. On the other hand, by monitoring the error between the reference current waveform signal and the inverter output current signal, the photovoltaic array operating point can be made to rapidly follow the maximum power point when the solar irradiance is stable.

When monitoring both the change of voltage and the error, it is preferable to alternately repeat the operation of increasing or decreasing the inverter output and the operation of maintaining the unchanged state of the inverter output. In this case, by monitoring the change per unit time of voltage at the photovoltaic array operating point while executing the operation of increasing or decreasing the inverter output and the operation of maintaining the unchanged state of the inverter output, the accuracy of the result of monitoring becomes good. On the other hand, by monitoring the error between the reference current waveform signal and the inverter output current signal while executing the operation of maintaining the unchanged state of the inverter output, the accuracy of the result of monitoring becomes good.

In an embodiment, the change per unit time of voltage at the DC power supply operating point and the error between the reference current waveform signal and the inverter output current signal are monitored while the operation of increasing the inverter output is repeatedly performed alternately with an operation of maintaining the unchanged state of the inverter output. And when the voltage at the DC power supply operating point is lowered and the change of voltage does not exceed the upper limit value or when the error substantially disappears within a specified time, it is determined that the DC power supply operating point is located on the open-circuit voltage side of the maximum power point. On the other hand, when the voltage at the DC power supply operating point is lowered and the change of voltage exceeds the upper limit value or when the error does not disappear after an elapse of the specified time, it is determined that the DC power supply operating point is located on the short-circuit current side of the maximum power point. Then, the alternate operations of increasing the inverter output and maintaining the unchanged state of the inverter output are continued when it is determined that the DC power supply operating point is located on the open-circuit voltage side of the maximum power point. On the other hand, when it is determined that the DC power supply operating point is located on the short-circuit current side of the maximum power point, switchover to the operation of decreasing the inverter output is performed.

Also, it is possible to make the DC power supply operating point follow the maximum power point on the output characteristic curve by monitoring the variation of the pulse width of the pulse train signal in addition to the change per unit time of voltage at the DC power supply operating point. More specifically, when the DC power supply is a photovoltaic array, by monitoring the change per unit time of voltage at the photovoltaic array operating point, it is possible to make the photovoltaic array operating point rapidly follow the maximum operating point when the photovoltaic array intensity abruptly changes. On the other hand, by monitoring the variation of the pulse width of the pulse train signal, it is possible to make the photovoltaic array operating point rapidly follow the maximum operating point when the photovoltaic array intensity remains stable.

In the case of monitoring both the change of voltage and the variation of the pulse width as well, it is preferable to alternately repeat the operation of increasing or decreasing the inverter output and the operation of maintaining the unchanged state of the inverter output. In this case, by monitoring the change per unit time of voltage at the photovoltaic array operating point while executing the operation of increasing or decreasing the inverter output and the operation of maintaining the unchanged state of the inverter output, the accuracy of the result of monitoring becomes good. On the other hand, by monitoring the variation of the pulse width of the pulse train signal while executing the operation of maintaining the unchanged state of the inverter output, the accuracy of the result of monitoring becomes good.

Since the position of the operating point is detected based on the accurate monitoring result, the position detection accuracy of the operating point is improved.

In an embodiment, the change per unit time of voltage at the DC power supply operating point and the variation of the pulse width of the pulse train signal are monitored while the operation of increasing the inverter output is repeatedly performed alternately with the operation of maintaining the unchanged state of the inverter output. And, when the voltage at the DC power supply operating point is lowered and the change of voltage does not exceed the upper limit value or when the variation of the pulse width substantially disappears within a specified time, it is determined that the DC power supply operating point is located on the open-circuit voltage side of the maximum power point. Also, when the voltage at the DC power supply operating point is lowered and the change of voltage exceeds the upper limit value or when the variation of the pulse width does not disappear after an elapse of the specified timed, it is determined that the DC power supply operating point is located on the short-circuit current side of the maximum power point. The alternate operations of increasing the inverter output and maintaining the unchanged state of the inverter output are continued when it is determined that the DC power supply operating point is located on the open-circuit voltage side of the maximum power point, but switchover to the operation of decreasing the inverter output is performed when it is determined that the DC power supply operating point is located on the short-circuit current side of the maximum power point.

Furthermore, the present invention provides an inverter apparatus to carry out the above-mentioned inverter control method.

In an inverter apparatus which has switching elements connected to a DC power supply and a control circuit for executing an on/off control of the switching elements such that an inverter output current signal coincides with a reference current waveform signal, and converts DC power from the DC power supply into an alternating current, the control circuit comprises:

a monitoring section which monitors one of (1) a pulse width of a pulse train signal for executing the on/off control of the switching elements, (2) an error between the reference current waveform signal and the inverter output current signal and (3) change per unit time of voltage at a DC power supply operating point, and determine whether the DC power supply operating point is located on an open-circuit voltage side or on a short-circuit current side of a maximum power point on an output characteristic curve of the DC power supply, based on a result of monitoring; and a control section which controls the inverter output such that the DC power supply operating point follows the maximum power point, based on a result of determination made by the monitoring section.

In an embodiment, the monitoring section monitors the pulse width of the pulse train signal, thereby determining that the operating point on the output characteristic curve of the DC power supply is located on the open-circuit voltage side of the maximum power point when a variation of the pulse width substantially disappears within a specified time, and determining that the operating point is located on the short-circuit current side of the maximum power point when the variation of the pulse width does not disappear after an elapse of the specified time. When the monitoring section determines that the operating point is located on the open-circuit voltage side of the maximum power point, the control section increases the inverter output such that the operating point shifts toward the maximum power point. On the other hand, when the monitoring section determines that the operating point is located on the short-circuit current side of the maximum power point, the control section reduces the inverter output such that the operating point shifts to the open-circuit voltage side.

In an embodiment, the monitoring section comprises a pulse width comparator comparing the pulse width with a preset maximum permissible width and determines that the operating point is located on the short-circuit current side of the maximum power point when the pulse width is wider than the maximum permissible width.

In another embodiment, the monitoring section monitors the error between the reference current waveform signal and the inverter output current signal, thereby determining that the operating point on the output characteristic curve of the DC power supply is located on the open-circuit voltage side of the maximum power point when the error substantially disappears within a specified time, and determining that the operating point is located on the short-circuit current side of the maximum power point when the error does not disappear after an elapse of the specified time. When the monitoring section determines that the operating point is located on the open-circuit voltage side of the maximum power point, the control section shifts the operating point toward the maximum power point by controlling the amplitude of the reference current waveform signal to increase. On the other hand, when the monitoring section determines that the operating point is located on the short-circuit current side of the maximum power point, the control section shifts the operating point to the open-circuit voltage side by controlling the amplitude of the reference current waveform signal to reduce.

In another embodiment, the monitoring section monitors the change per unit time of voltage at the DC power supply operating point, thereby determining that the DC power supply operating point is located on the open-circuit voltage side of the maximum power point when the change per unit time of voltage at the DC power supply operating point does not exceed the upper limit value, and determining that the DC power supply operating point is located on the short-circuit current side of the maximum power point when the change of voltage exceeds the upper limit value.

When the monitoring section determines that the DC power supply operating point is located on the open-circuit voltage side of the maximum power point, the control section continues the operation of increasing the inverter output, and switches over to the operation of decreasing the inverter output when the monitoring section determines that the DC power supply operating point is located on the short-circuit current side of the maximum power point.

In an embodiment, the control circuit further comprises an error monitoring section which monitors the error between the reference current waveform signal and the inverter output current signal, and which determines that the DC power supply operating point is located on the open-circuit voltage side of the maximum power point when the error substantially disappears within a specified time, and which determines that the DC power supply operating point is located on the short-circuit current side of the maximum power point when the error does not disappear after an elapse of the specified time.

In another embodiment, the control circuit further comprises a pulse width monitoring section which monitors the pulse width of the pulse train signal, and which determines that the DC power supply operating point is located on the open-circuit voltage side of the maximum power point when the variation of the pulse width substantially disappears within a specified time, and which determines that the DC power supply operating point is located on the short-circuit current side of the maximum power point when the variation of the pulse width does not disappear after an elapse of the specified time.

The control circuit of the inverter apparatus according to each embodiment of the present invention has a circuit construction simpler than the control circuit of the prior art inverter apparatus, and therefore, the cost can be suppressed further than in the prior art.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a diagram showing the total construction of an inverter apparatus according to a second embodiment of the present invention;

FIGS. 12A and 12B are graphs schematically showing the change in amplitude of a current command signal and the change of voltage at the operating point in accordance with the change in amplitude, respectively, in the inverter apparatus of the third embodiment;

FIGS. 17A and 17B are schematic graphs showing the change in amplitude of the current command signal and the change of voltage at the operating point in accordance with the amplitude change, respectively, in the inverter apparatus of the third embodiment;

DETAILED DESCRIPTION OF THE PREFERRED EMBODIMENTS (First Embodiment)

Figure 1:
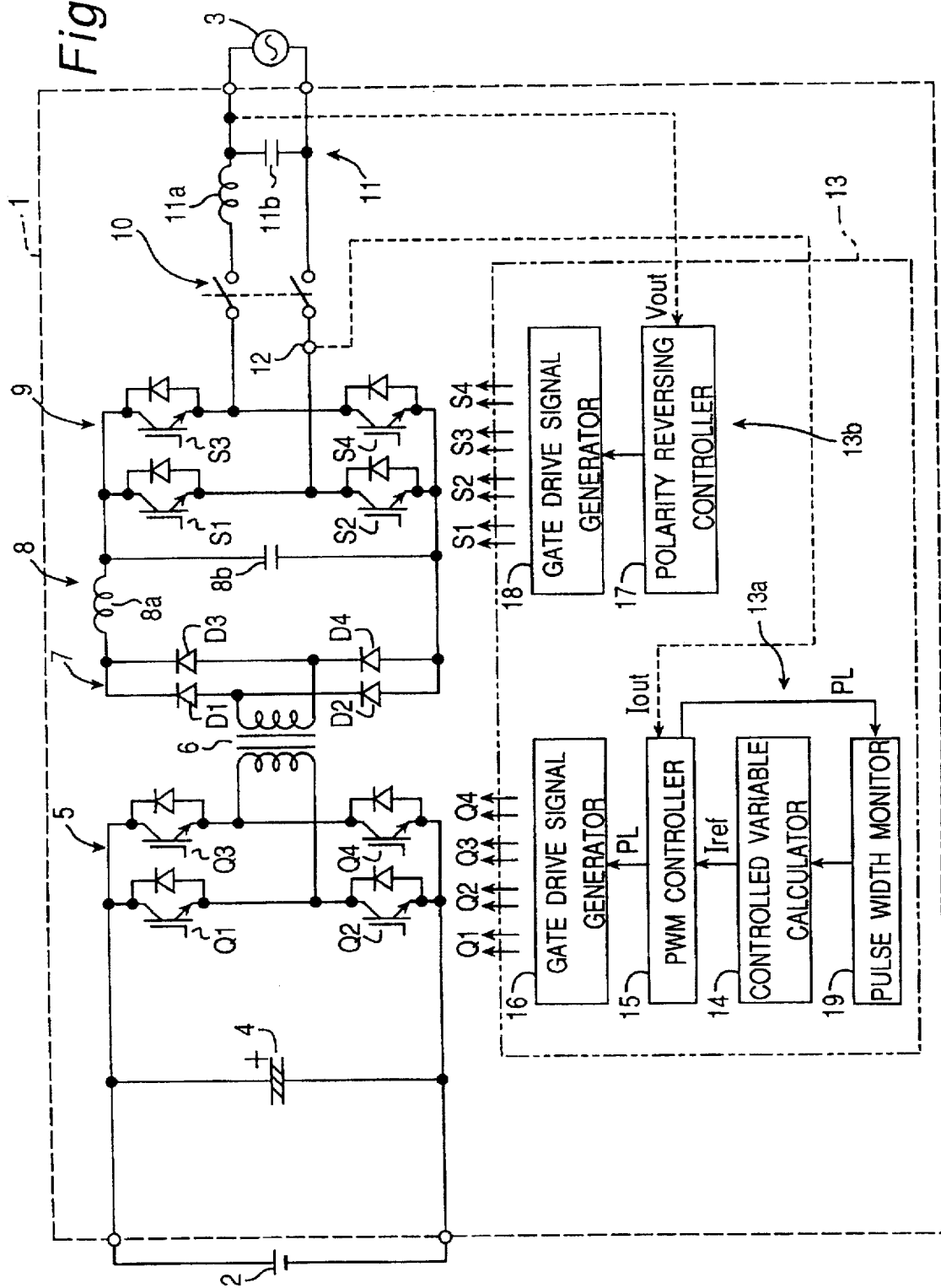
FIG. 1 is a schematic diagram showing the total construction of an inverter apparatus according to a first embodiment of the present invention.

FIG. 1 is a circuit diagram showing an inverter apparatus 1 according to a first embodiment of the present invention.

The inverter apparatus 1 converts DC power outputted from a photovoltaic array 2 into AC power having the same phase and frequency of 50/60 Hz as those of a commercial electric utility line 3 and supplies the power to the commercial electric utility line 3.

The inverter apparatus 1 comprises a DC capacitor 4, a high-frequency inverter bridge 5, a high-frequency transformer 6, a diode bridge 7, a filter circuit 8, a low-frequency inverter bridge 9, a relay 10, an AC filter 11, an inverter output current detector 12 and a control circuit 13.

The DC capacitor 4 regulates the fluctuation of the DC power inputted from the photovoltaic array 2. The high-frequency inverter bridge 5 has switching elements Q1, Q2, Q3 and Q4 and converts the DC power inputted to the inverter apparatus 1 into a high-frequency AC (several tens to several hundreds kHz). The high-frequency transformer 6 has a role of isolating the photovoltaic array 2 side from the commercial electric utility line 3 side. The diode bridge 7 having diodes D1, D2, D3 and D4 is connected to the secondary side of the high-frequency transformer 6 and rectifies the high-frequency AC. The filter circuit 8 is comprised of a DC reactor 8a and a capacitor 8b which are connected in parallel with each other, and operates to remove high-frequency components from the rectified waveform and smooth the same. The low-frequency inverter bridge 9, which is comprised of switching elements S1, S2, S3 and S4, is connected to the stage subsequent to the filter circuit 8, and subjects the direct current having a full-rectified waveform to polarity reversing control at a low frequency (50/60 to several hundreds Hz) to form a sine-wave alternating current of a low frequency. The relay 10 performs connection and disconnection between the photovoltaic array 2 side and the commercial electric utility line 3 side. The AC filter 11 is comprised of an AC reactor 11a and a capacitor 11b and absorbs higher harmonic components. The inverter output current detector 12 is provided at the stage subsequent to the low-frequency inverter bridge 9 and operates to detect an inverter output current signal $I_{out}$ and output the same to the control circuit 13. The control circuit 13 controls the high-frequency inverter bridge 5 and the low-frequency inverter bridge 9.

The control circuit 13 is comprised of a high-frequency inverter bridge control system 13a and a low-frequency inverter bridge control system 13b.

The high-frequency inverter bridge control system 13a has a controlled variable calculator 14, a PWM controller 15, a gate drive signal generator 16 and a pulse width monitor 19. The controlled variable calculator 14 generates a current command signal $I_{ref}$ which is a reference waveform signal of the inverter output current $I_{out}$ and whose amplitude R corresponds to the controlled variable of the inverter apparatus 1. The PWM controller 15 integrates the waveform of an error between the current command signal $I_{ref}$ and the inverter output current signal $I_{out}$ in units of a specified period, and subjects the obtained integrated waveform data to PWM control to generate a pulse train signal PL. The gate drive signal generator 16 controls the four switching elements Q1 through Q4 of the high-frequency inverter bridge 5 so as to turn them on and off based on the pulse train signal PL generated by the PWM controller 15.

To the pulse width monitor 19 is inputted the pulse train signal PL obtained by the PWM controller 15, and the pulse width monitor 19 always monitors the pulse width $P_W$ of the inputted pulse train signal PL. The pulse width $P_W$ of the pulse train signal PL varies with certain regularity corresponding to the change of the output power of the photovoltaic array 2. Therefore, by monitoring the change of the pulse width $P_W$, it is decided whether the operating point on the photovoltaic array output characteristic curve is located on an open-circuit voltage side or on a short-circuit current side of a maximum power point.

The low-frequency inverter bridge control system 13b has a polarity reversing controller 17 and a gate drive signal generator 18. The polarity reversing controller 17 subjects the direct current having the full-rectified waveform to polarity reversing control at a low frequency (50/60 to several hundreds Hz) based on a commercial electric utility line voltage signal $V_{out}$ detected from the stage subsequent to the AC filter 11. The gate drive signal generator 18 controls the four switching elements S1 through S4 of the low-frequency inverter bridge 9 so as to turn them on and off based on the control by the polarity reversing controller 17.

For the switching elements Q1 through Q4 of the high-frequency inverter bridge 5 and the switching elements S1 through S4 of the low-frequency inverter bridge 9, an IGBT, for example, can be used.

Next, operation of the inverter apparatus 1 having the above construction will be described. Basically, the switching elements Q1 through Q4 of the high-frequency inverter bridge 5 are controlled to be turned on or off so that the error between the inverter output current signal $I_{out}$ that has been detected by the inverter output current detector 12 and fed back and the current command signal $I_{ref}$ determined by the controlled variable calculator 14, disappears. That is, firstly a controlled variable for the inverter is determined by the controlled variable calculator 14, and a current command signal $I_{ref}$ having this controlled variable R as its amplitude is generated and outputted to the PWM controller 15. On the other hand, the inverter output current detector 12 detects an inverter output current $I_{out}$ at that time and outputs the same to the PWM controller 15. In the PWM controller 15, the error between the inputted current command signal $I_{ref}$ and the inverter output current signal $I_{out}$ is subjected to waveform integration in units of a specified period, and the obtained integral waveform data is subjected to PWM modulation control to generate a pulse train signal PL for turning on or off the switching elements Q1 through Q4 of the high-frequency inverter bridge 5 and output the signal to the gate drive signal generator 16. The PWM modulation control by the PWM controller 15 is performed so that the error between the current command signal $I_{ref}$ and the inverter output current signal $I_{out}$ converges on zero, and consequently the inverter output current signal $I_{out}$ unlimitedly approaches the current command signal $I_{ref}$.

Thus, the inverter output current is controlled. In the above control, the current command signal $I_{ref}$ is the target of control of the inverter output current signal $I_{out}$.

In the gate drive signal generator 16, the switching elements Q1 through Q4 of the high-frequency inverter bridge 5 are subjected to the on/off control based on the inputted pulse train signal PL. With this arrangement, the DC power inputted from the photovoltaic array 2 is converted into a high-frequency AC (several tens to several hundreds kHz) in the high-frequency inverter bridge 5 and supplied to the primary side of the high-frequency transformer 6. The high-frequency transformer 6 isolates the photovoltaic array 2 side from the commercial electric utility line 3 side, and the high-frequency AC isolated by the high-frequency transformer 6 is rectified by the diode bridge 7 provided on the secondary side of the high-frequency transformer 6. The rectified components obtained through rectification by the diode bridge 7 is subjected to high-frequency component removal and smoothing by the filter circuit 8. Then, the direct current formed into a full-rectified waveform by the filter circuit 8 is subjected to polarity reversing control at a low frequency (50/60 to several hundreds Hz) in the low-frequency inverter bridge 9 to become a low-frequency sine-wave AC. Then, the sine-wave AC is connected to or disconnected from the commercial electric utility line 3 side by the relay 10, and after absorbing higher harmonic components by the AC filter 11, the resulting signal is outputted to the commercial electric utility line 3.

The inverter apparatus 1 converts the DC power into the AC power in a manner as described above. In this kind of DC/AC conversion control, by varying the amplitude R of the current command signal $I_{ref}$ that is the target value of the inverter output current signal $I_{out}$, the operating point on the photovoltaic array characteristic curve is controlled.

Next, maximum power point follow control of the inverter apparatus 1 will be described. First, its essential point will be described. That is, the pulse train signal PL obtained by the PWM controller 15 is also inputted to the pulse width monitor 19, where the pulse width $P_W$ of the pulse train signal PL is always monitored. The pulse width $P_W$ of the pulse train signal PL varies in accordance with a specific regularity corresponding to the change of the output power of the photovoltaic array 2, and therefore, by monitoring the change of the pulse width $P_W$, the pulse width monitor 19 decides whether the operating point on the photovoltaic array output characteristic curve is located on the open-circuit voltage $V_{OC}$ side or on the short-circuit current $I_{SC}$ side of the maximum power point. Then, by varying the amplitude R of the current command signal $I_{ref}$, i.e., the inverter controlled variable, according to the above decision, the maximum power is taken out of the photovoltaic array 2.

In the case of this kind of inverter control method, the following matter is required. That is, the photovoltaic array 2 has the feature that, actually, its output characteristic changes every moment depending on the solar irradiance and the temperature of the constituent elements of the photovoltaic array 2. Therefore, in order to control the inverter controlled variable so that the operating point on the photovoltaic array current-to-voltage characteristic curve follows the maximum power point, control having an excellent operating point control response, i.e., such control is required that, when the photovoltaic array characteristic changes abruptly as a consequence of the change of the solar irradiance or the cell temperature of the photovoltaic array 2, a maximum power point $W_{MAX}$ after the change can be momentarily followed.

Taking this point into account, the above operating point control method will be described further in detail. The current command signal $I_{ref}$ formed in the controlled variable calculator 14 is the signal that serves as the target value of the inverter output current signal $I_{out}$ as described above. Furthermore, the amplitude R of this current command signal $I_{ref}$ corresponds to the inverter controlled variable that is an amount of control by which the operating point on the photovoltaic array current-to-voltage characteristic curve is controlled. Therefore, by varying the amplitude R of the current command signal $I_{ref}$ that is the inverter control value, the operating point on the photovoltaic array current-to-voltage characteristic curve is controlled.

Figure 2:
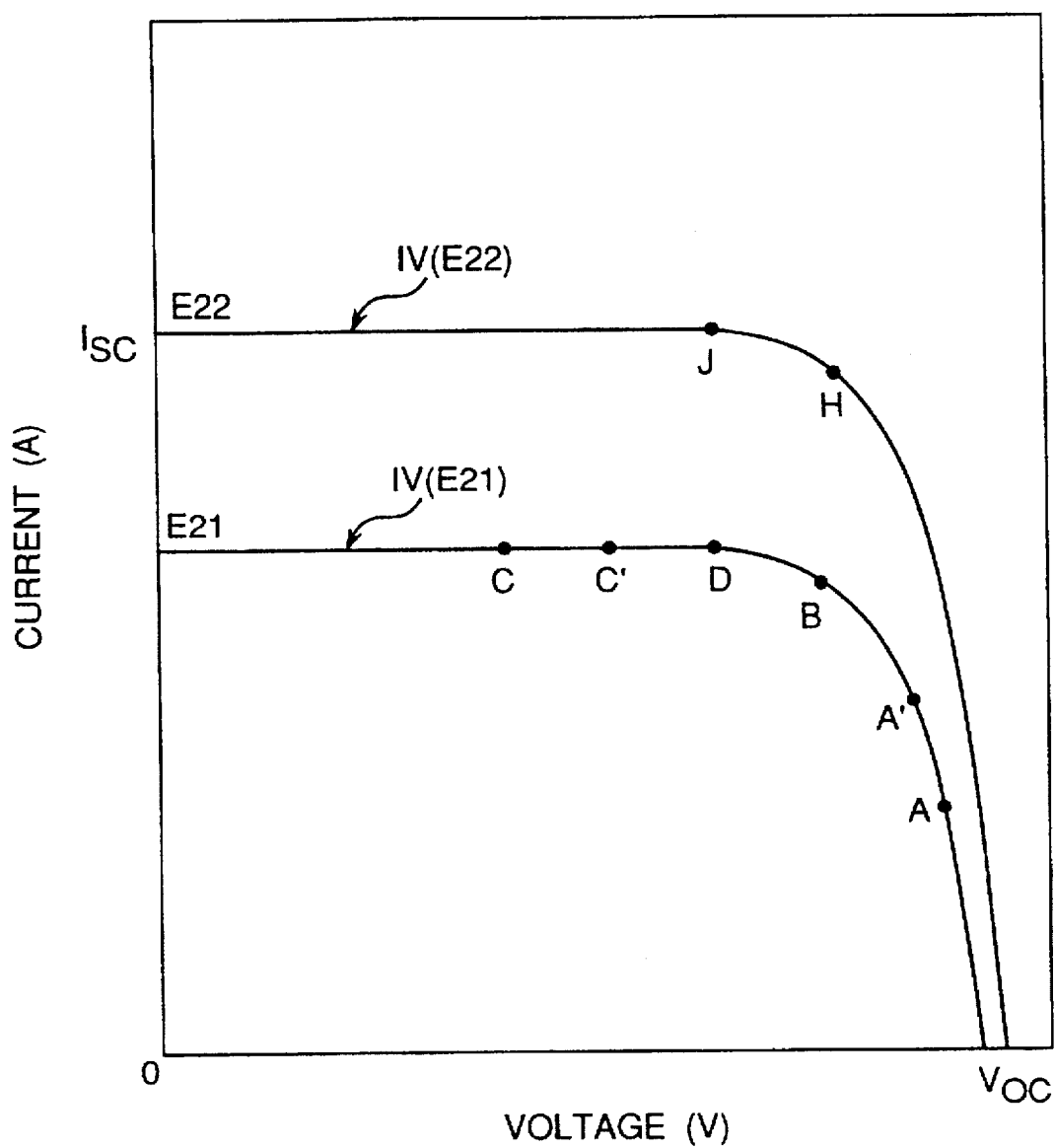
FIG. 2 is a graph schematically showing the change of an operating point on photovoltaic array characteristic curves in the first embodiment.
Figure 3A:
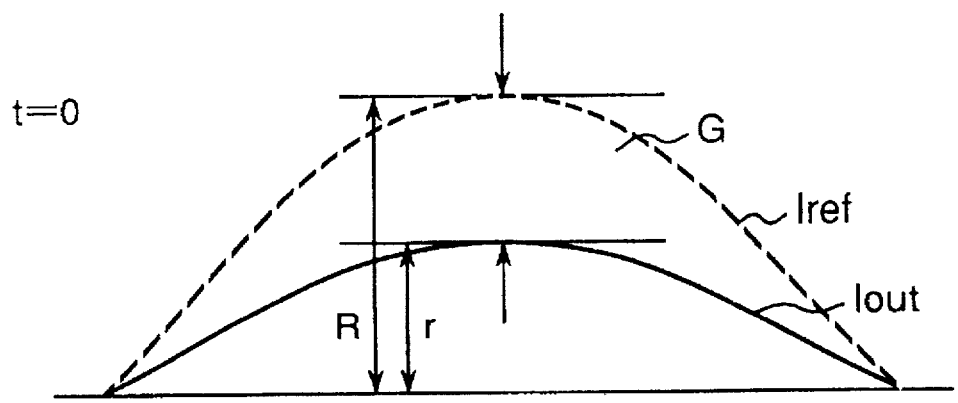
FIGS. 3A and 3B are diagrams showing a relation between a current command signal $I_{ref}$ and an inverter output current signal $I_{out}$ in the first embodiment.
Figure 3B:
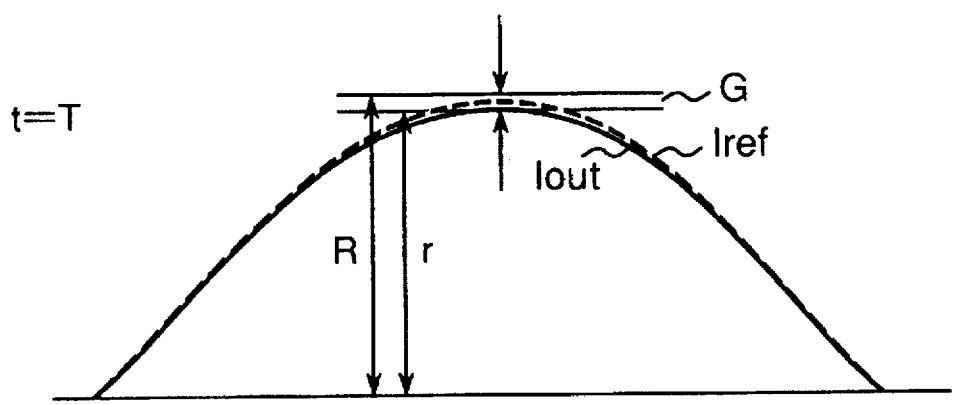
Figure 4:
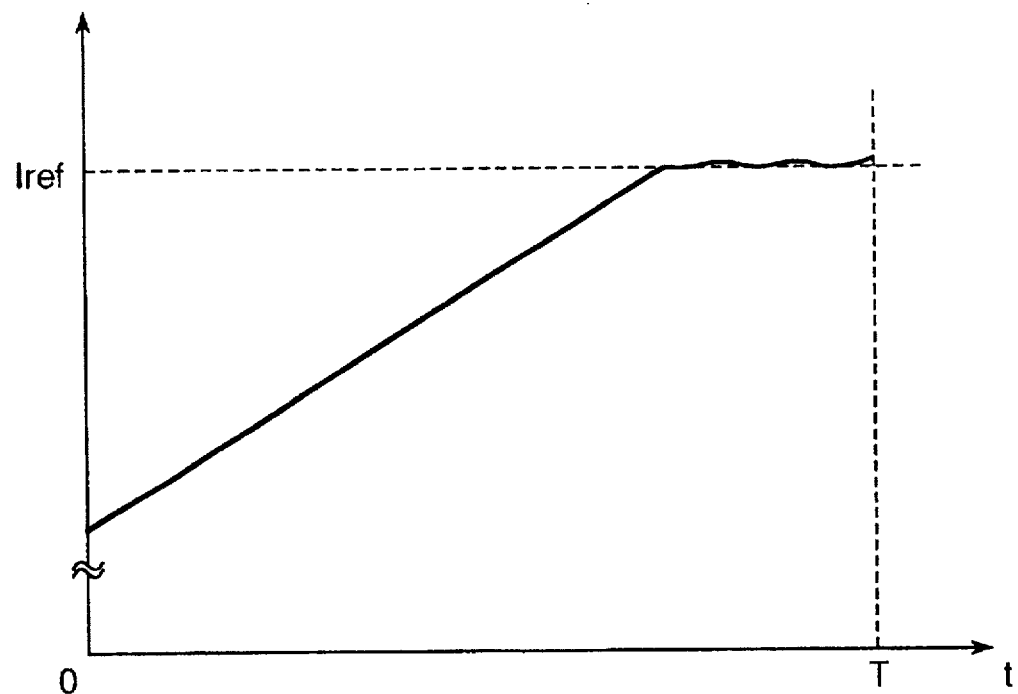
FIG. 4 is a graph schematically showing the change of the inverter output current signal $I_{out}$ during a specified time T in the first embodiment.

Referring now to FIG. 2 it is assumed that the operating point is located at point A on the open-circuit voltage $V_{OC}$ side of the maximum power point on a photovoltaic array current-to-voltage characteristic curve IV(E21) at a relatively low solar irradiance E21. In this case, when the PWM modulation control is performed with the amplitude R (controlled variable) of the current command signal $I_{ref}$ increased, or with the controlled variable changed to a bigger one the operating point shifts to A' after the elapse of a specified time (t=T), and the amplitude r of the inverter output current signal $I_{out}$ converges on the increased amplitude $R_1$ and the error G almost disappears, as shown in FIGS. 3A, 3B and 4. FIG. 3A shows the initial stage (t=0) of the PWM modulation control wherein an error G exists sufficiently, while FIG. 3B shows a stage after the elapse of the specified time (t=T) wherein the error G has almost disappeared. FIG. 4 shows the change with time of the inverter output current signal $I_{out}$.

In this stage, the pulse width $P_W$ of the pulse train signal PL varies as follows. That is, although the pulse width $P_W$ varies in the initial stage of the PWM modulation control when the error G exists, the variation becomes small with the reduction of the error G. When the error G disappears, the variation of the pulse width $P_W$ disappears, and it converges on a stabilized pulse width $P_{W1}$ after the elapse of a specified time. When the controlled variable is increased, the pulse width $P_W$ varies in a direction in which the width is increased. When the controlled variable is reduced, the width varies in a direction in which it is reduced. The variation of the pulse width $P_W$ described as above is monitored by the pulse width monitor 19.

When such a variation of the pulse width $P_W$ that it converges on a stabilized pulse width after the elapse of a specified time is observed, it is decided that the operating point A is located on the open-circuit voltage $V_{OC}$ side of the maximum power point, and the controlled variable is controlled in the direction in which it is increased (in the direction in which the amplitude R of the current command signal $I_{ref}$ is increased), i.e., the target value of the controlled variable is set one step greater than the preceding value.

Then, in this state, the high-frequency inverter bridge 5 is further subjected to PWM modulation control. Then, after the elapse of the specified time (t=T), the amplitude r of the inverter output current signal $I_{out}$ converges on an amplitude R that is increased from the preceding amplitude R, and the error G almost disappears. In this case, the pulse width $P_W$ of the pulse train signal PL varies as follows. That is, the pulse width $P_W$ varies in the direction in which it is increased from the pulse width $P_{W1}$ in the initial stage of the PWM modulation control in this period, however, the pulse width converges on a stabilized pulse width $P_{W2}$ ($P_{W2}>P_{W1}$) after the elapse of the specified time.

Upon detecting that the pulse width $P_W$ has varied as described above, the pulse width monitor 19 decides that the operating point has shifted to B toward the maximum power point side by one step from A', but that the operating point has not yet shifted beyond the maximum power point to the short-circuit current side. Then, according to the result of decision, the controlled variable calculator 14 continues the control of increasing the amplitude R.

Figure 5:
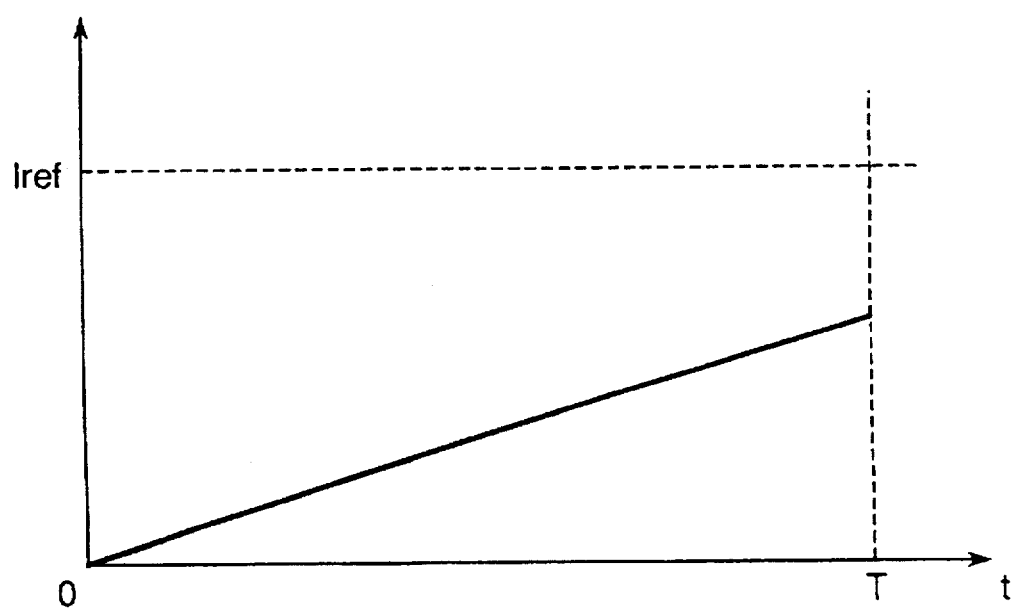
FIG. 5 is a graph schematically showing the change of the inverter output current signal $I_{out}$ during the specified time T in the first embodiment.

When such an amplitude increasing control is continued and the operating point shifts from the open-circuit voltage $V_{OC}$ side to the short-circuit current $I_{SC}$ side beyond the maximum power point, the variation of the amplitude R becomes as follows. That is, as shown in FIG. 5, when the high-frequency inverter bridge 5 is subjected to the PWM modulation control after the operating point has been shifted to the short-circuit current $I_{SC}$ side of the maximum power point, the amplitude r of the inverter output current signal $I_{out}$ does not converge on the set amplitude R even after the elapse of the specified time (t=T) and the error G does not disappear.

In this case, the pulse width $P_W$ of the pulse train signal PL varies as follows. That is, the pulse width $P_W$ is not stabilized even after the elapse of the specified time, and the variation of the pulse width does not disappear.

When such variation of the pulse width $P_W$ as described above is observed, it is decided that the operating point has shifted to the short-circuit current $I_{SC}$ side of the maximum power point, and the amplitude R of the current command signal $I_{ref}$ is reduced by one step. That is, the target value of the controlled variable is set smaller by one step, and the high-frequency inverter bridge 5 is subjected to the PWM modulation control in this state.

On the other hand, assume that the operating point is located at C on the short-circuit current $I_{SC}$ side of the maximum power point on the photovoltaic array characteristic curve at the solar irradiance E21 as shown in FIG. 2. In this case, when the PWM modulation control is performed with the amplitude R (controlled variable) of the current command signal $I_{ref}$ reduced by one step to set the target of the operating point at C', that is, with the amplitude R narrowed by one step, the amplitude r of the inverter output current signal $I_{out}$ does not converge on the narrowed amplitude $R_1$ even after the elapse of the specified time (t=T), and the error G does not disappear.

In this stage, the pulse width $P_W$ of the pulse train signal PL varies as follows. That is, the pulse width $P_W$ is not stabilized even after the elapse of the specified time, and the variation of the pulse width does not disappear.

When such variation of the pulse width $P_W$ as described above is observed, it is decided that the operating point C' is located on the short-circuit current $I_{SC}$ side of the maximum power point, and the control is performed in the direction in which the target value (the amplitude R of the current command signal $I_{ref}$) is reduced by one step. That is, the target of the operating point is set at D.

When the high-frequency inverter bridge 5 is further subjected to the PWM modulation control in this state and the pulse width monitor 19 detects that the pulse width $P_W$ has varied as follows, it is decided that, although the operating point C' has shifted to D toward the maximum power point side, it has not yet shifted to the open-circuit voltage $V_{OC}$ side beyond the maximum power point. That is, even after the elapse of a specified time, the amplitude r of the inverter output current signal $I_{out}$ is not converged on an amplitude R that is reduced from the preceding amplitude R, and the error G still continues to exist. In accordance with this, the pulse width $P_W$ of the pulse train signal PL is not stabilized even after the elapse of the specified time, and the variation of the pulse width $P_W$ still exists.

When the pulse width monitor 19 decides that, although the operating point has shifted from C' toward the maximum power point side to D, it has not yet shifted to the open-circuit voltage $V_{OC}$ side beyond the maximum power point, the controlled variable calculator 14 continues the control of reducing the amplitude R (controlled variable reducing control).

When such amplitude reducing control as described above is continued and the operating point shifts from the short-circuit current $I_{SC}$ side to the open-circuit voltage $V_{OC}$ side beyond the maximum power point, the variation of the amplitude R becomes as follows. That is, when the specified time (t=T) has elapsed while subjecting the high-frequency inverter bridge 5 to the PWM modulation control in the state in which the operating point is already shifted to the open-circuit voltage $V_{OC}$ side of the maximum power point, the amplitude r of the inverter output current signal $I_{out}$ converges on the set amplitude R, and the error G substantially disappears.

In this stage, the pulse width $P_W$ of the pulse train signal PL varies as follows. That is, the pulse width $P_W$ is stabilized after the elapse of the specified time (t=T), and the variation of the pulse width $P_W$ disappears. When the pulse width monitor 19 detects such variation of the pulse width $P_W$ as described above and decides that the operating point has shifted to the open-circuit voltage $V_{OC}$ side of the maximum power point, the controlled variable calculator 14 controls the amplitude R of the current command signal $I_{ref}$ in the direction in which the amplitude R is increased (in the direction in which the controlled variable is made larger).

By repeating the above control, the PWM control of the high-frequency inverter bridge 5 is performed so that the operating point follows the maximum power point.

The aforementioned control method is a control method for the relatively small solar irradiance E21. Next, a control method for a great solar irradiance E22 as in the case of fine weather will be described. In this case, what is different from the aforementioned control method resides in a method of determining that the operating point located on the open-circuit voltage $V_{OC}$ side has shifted from the open-circuit voltage $V_{OC}$ side to the short-circuit current $I_{SC}$ side beyond the maximum power point.

Figure 6A:
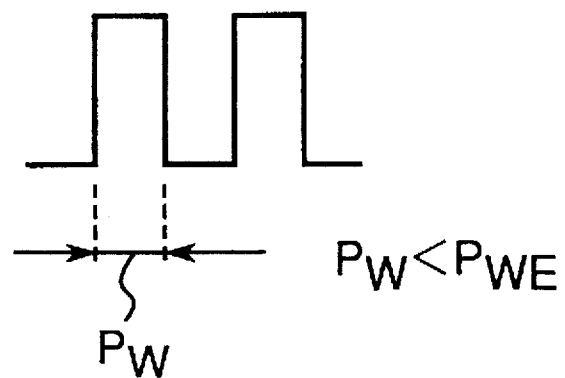
FIGS. 6A and 6B are charts showing the change of a pulse width $P_W$ of the first embodiment.
Figure 6B:
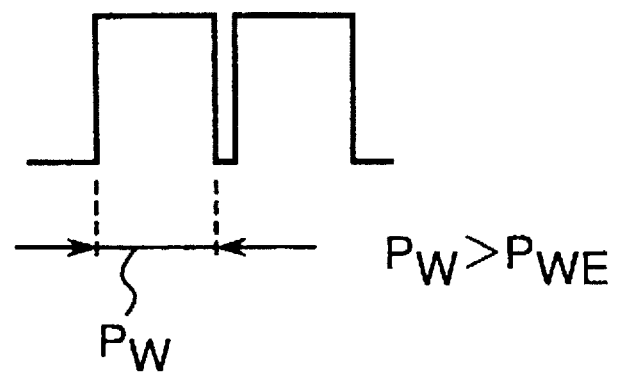

As shown in FIG. 2, when an operating point H located on the open-circuit voltage $V_{OC}$ side is shifted by the amplitude increasing control toward the maximum power point side reaches at point J located on the short-circuit current $I_{SC}$ side beyond the maximum power point in the case of the great solar irradiance E22, the pulse width $P_W$ varies as follows. That is, as shown in FIG. 6B, in the pulse width monitor 19, the pulse width $P_W$ being monitored becomes greater than a predetermined maximum permissible width $P_{WE}$. When such a state results, it is decided that the operating point has shifted from the open-circuit voltage $V_{OC}$ side to the short-circuit current $I_{SC}$ side beyond the maximum power point. Therefore, the controlled variable calculator 14 switches the control for increasing the controlled variable to the control for reducing the controlled variable, similarly to the aforementioned control method. FIG. 6A shows a state in which the pulse width $P_W$ does not exceed the maximum permissible width $P_{WE}$, and FIG. 6B shows a state in which the pulse width $P_W$ exceeds the maximum permissible width $P_{WE}$.

In this case, the preset maximum permissible width $P_{WE}$ is optimally set at about 90% of the maximum value (26.2 μs, for example) of the pulse width $P_W$. Furthermore, the pulse width $P_W$ to be consistently monitored may be a pulse width in an arbitrary position, however, in particular, a pulse width $P_W$ around the center of a half-period pulse signal data is the best.

Furthermore, the maximum permissible width $P_{WE}$ may have a preset value or may be varied according to the change in the inverter power, the solar irradiance, and/or the cell temperature of the photovoltaic array 2 or the like.

Figure 7:
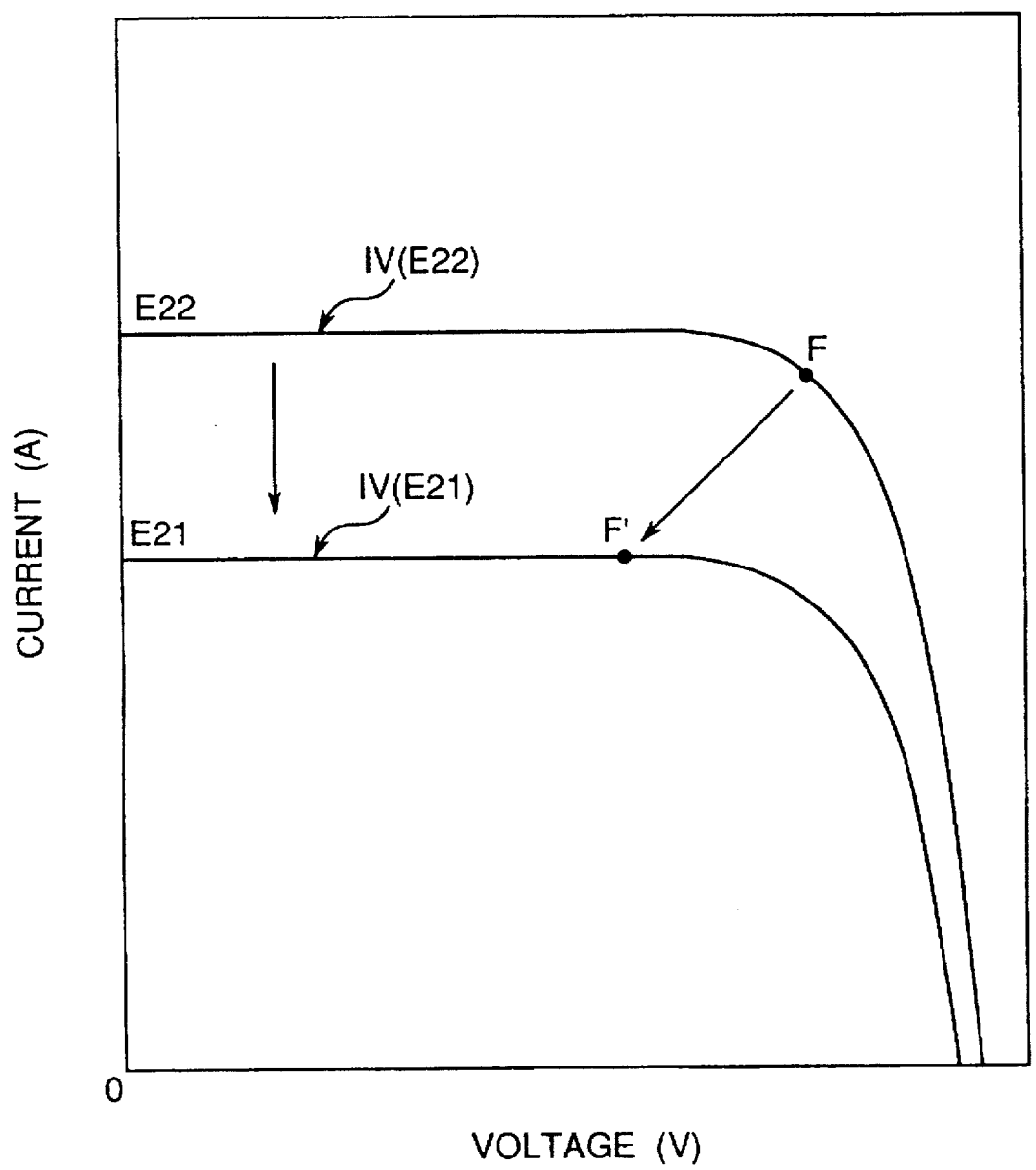
FIG. 7 is a graph schematically showing the change of the operating point on photovoltaic array characteristic curves in the first embodiment.

Further, the following describes a case in which when the operating point is following the maximum power point on the photovoltaic array current-to-voltage characteristic curve IV(E22) for the great solar irradiance E22, the solar irradiance is abruptly reduced to the relatively small solar irradiance E21. That is, it is assumed that as shown in FIG. 7, an operating point F that had been following the maximum power point on the photovoltaic array current-to-voltage characteristic curve IV(E22) has shifted to an operating point F' on the short-circuit current $I_{SC}$ side on the characteristic curve IV(E21) due to an abrupt change of the solar irradiance.

Figure 8A:
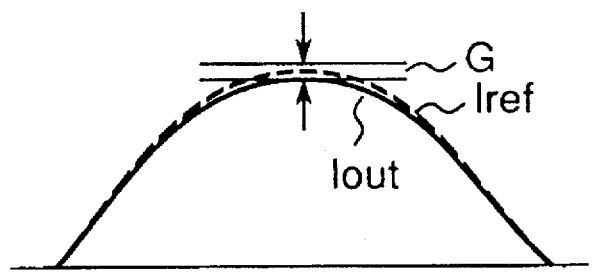
FIGS. 8A, 8B and 8C are diagrams showing a relation between the current command signal $I_{ref}$ and the inverter output current signal $I_{out}$ in the first embodiment.
Figure 8B:
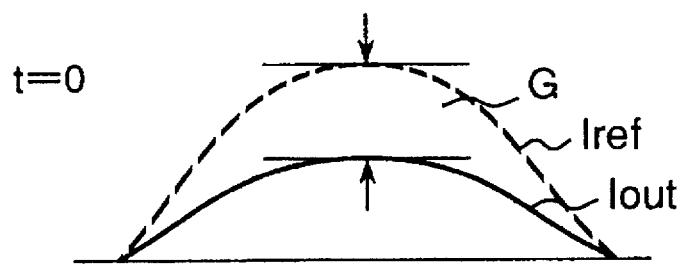
Figure 8C:
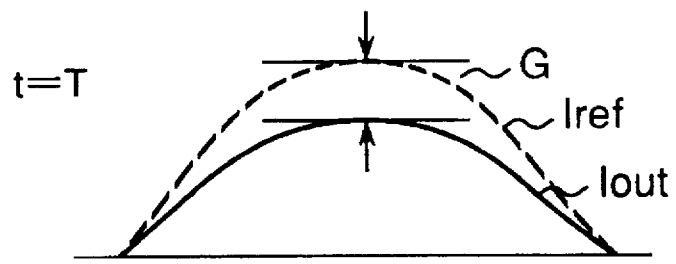

At the operating point F on the photovoltaic array current-to-voltage characteristic curve IV(E22), the error G between the current command signal $I_{ref}$ and the inverter output current signal $I_{out}$ scarcely exists, as shown in FIG. 8A. However, as shown in FIG. 8B, at the time t=0 immediately after the shift of the operating point to F', the inverter output current signal $I_{out}$ is reduced, and therefore, the error G increases. In this stage, unless the current command signal $I_{ref}$ is changed, the inverter output current signal $I_{out}$ tries to increase toward the target value of the current command signal $I_{ref}$. However, the inverter output current $I_{out}$ at the maximum power output that can be taken out of the photovoltaic array 2 at the solar irradiance E21 is smaller than the present target value of the current command signal $I_{ref}$. Consequently, the inverter output current signal $I_{out}$ does not approach the current command signal $I_{ref}$, and therefore, it cannot reach the current command signal $I_{ref}$ even when the specified time t=T has passed. Therefore, as shown in FIG. 8B, the error G is left even after the elapse of the specified time (t=T). In this stage, the pulse width $P_W$ continues to increase and tries to increase even when the time t=T is reached. In such a case, it is decided that the operating point F' is located on the short-circuit current $I_{SC}$ side of the maximum power point, and a target value reduced by one step is newly set. That is, the amplitude R of the current command signal $I_{ref}$ is reduced by one step. By thus setting the amplitude R smaller by one step, the error G between the newly set current command signal $I_{ref}$ and the inverter output current signal $I_{out}$ becomes smaller than the error G between the previously set current command signal $I_{ref}$ and the inverter output current signal $I_{out}$, as shown in FIG. 8C. Then, the amplitude R of the current command signal $I_{ref}$ is reduced one step by one step until almost no error G is left within the specified time (t=T). When the state in which almost no error G exists is achieved within the specified time (t=T), it is decided that the operating point has shifted from the short-circuit current $I_{SC}$ side to the open-circuit voltage $V_{OC}$ side beyond the maximum power point, and the controlled variable reducing control is switched to the controlled variable increasing control. That is, the amplitude R of the current command signal $I_{ref}$ is increased one step by one step. Repeating the above processing allows the operating point to follow the maximum power point.

In this inverter apparatus 1, the controlled variable is set in 256 steps with respect to an inverter rated output current of 0 to 15 A (effective value). Furthermore, in regard to the monitoring of the pulse width $P_W$ in controlling the high-frequency inverter bridge 5 so as to turn them on and off, either the pulse width $P_W$ at the on-time or the pulse width $P_W$ at the off-time of the pulse train signal PL may be used.

In the above embodiment, the controlled variable is changed by one step, a constant value. That is, an amplitude change amount of the current command signal $I_{ref}$ that is the target value of the inverter output current signal $I_{out}$ is made constant. However, the amplitude change amount of the current command signal $I_{ref}$ may be variable.

Thus, the inverter apparatus 1 can achieve an excellent control performance in regard to the control of making the operating point on the photovoltaic array current-to-voltage characteristic curve follow the maximum power point in order to take out as much DC power as possible from the photovoltaic array 2. The inverter apparatus 1 also achieves a good control response characteristic capable of rapidly following the maximum power point even when the solar irradiance abruptly changes. Furthermore, a maximum output power of the photovoltaic array 2 can be taken out correctly and efficiently, so that the power can be supplied to the load or the commercial electric utility line 3. Also, the component cost is suppressed low.

Figure 1A:
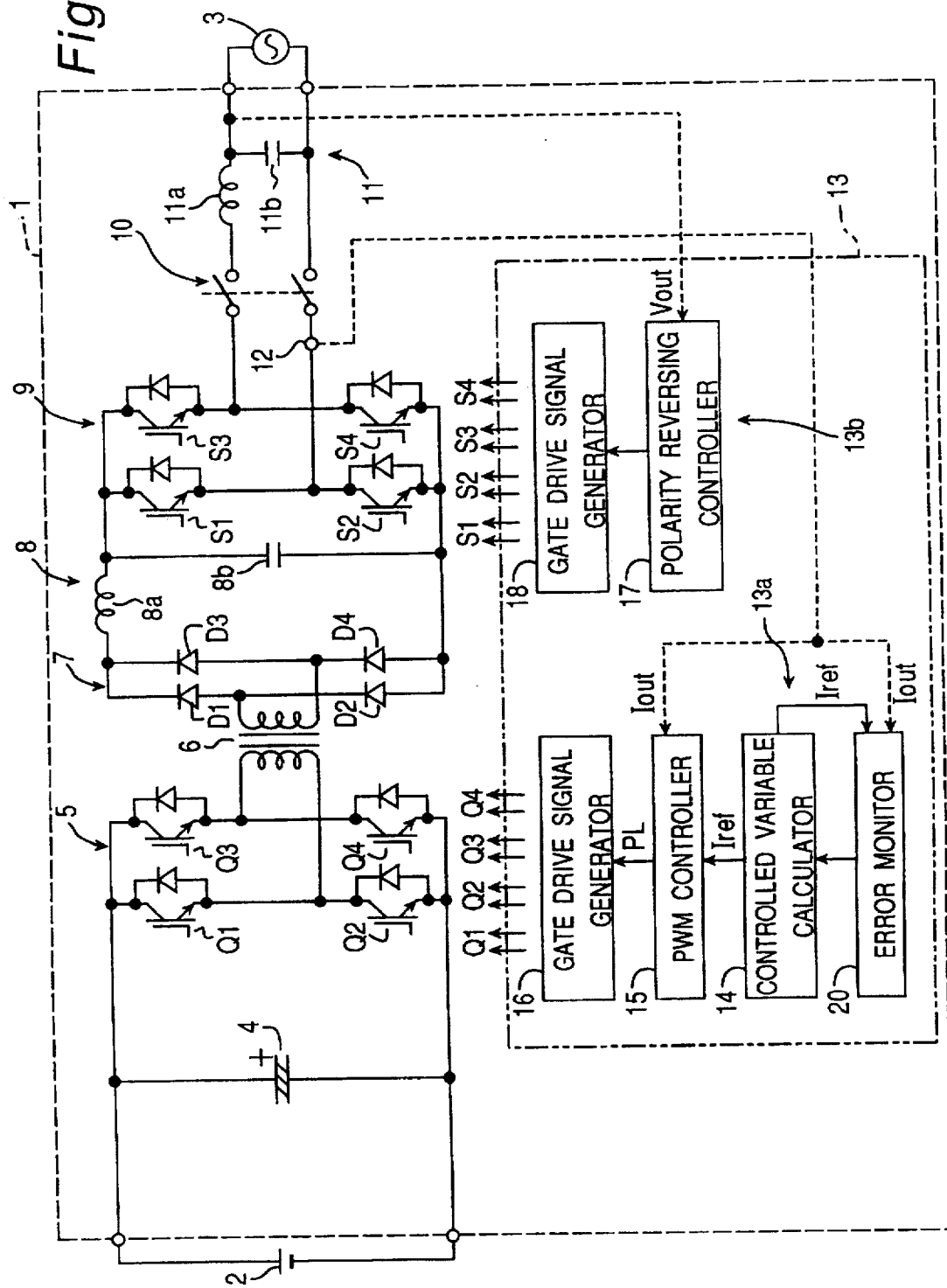
FIG. 1A is a diagram showing the total construction of a modification example of the inverter apparatus shown in FIG. 1.

In the inverter apparatus 1, the pulse width monitor 19 decides which side the operating point is located on with respect to the maximum power point by monitoring the pulse width $P_W$ of the pulse train signal PL used for the PWM modulation control. However, by providing an error monitor 20 in place of the pulse width monitor 19, as shown in FIG. 1A, it can be also decided which side the operating point is located on with respect to the maximum power point by monitoring the error G. The control method in this case will be described below.

Assume that the operating point is located at A on the open-circuit voltage $V_{OC}$ side of the maximum power point on the photovoltaic array current-to-voltage characteristic curve IV(E21) at the relatively low solar irradiance E21 as shown in FIG. 2. In this case, when the PWM modulation control is performed with the amplitude R of the current command signal $I_{ref}$ increased, i.e., with the controlled variable changed such that it becomes larger, the operating point shifts to A' after the elapse of the specified time (t=T), and the amplitude r of the inverter output current signal $I_{out}$ converges on the increased amplitude R and the error G almost disappears, as shown in FIGS. 3A, 3B and 4. Such variation of the error G is monitored by the error monitor 20.

When the error G disappears after the elapse of the specified time, the error monitor 20 decides that the operating point A is located on the open-circuit voltage $V_{OC}$ side of the maximum power point, and informs the controlled variable calculator 14 of the result of decision. Then, the controlled variable calculator 14 sets the target value of the controlled variable greater by one step than in the preceding time, so that the amplitude R of the current command signal $I_{ref}$ is increased.

When the amplitude increasing control as described above is continued and the operating point shifts from the open-circuit voltage $V_{OC}$ side to the short-circuit current $I_{SC}$ side beyond the maximum power point, the error G varies as follows. That is, when the high-frequency inverter bridge 5 is subjected to the PWM modulation control in the state in which the operating point has been shifted to the short-circuit current $I_{SC}$ side of the maximum power point, the amplitude r of the inverter output current signal $I_{out}$ does not converge on the set amplitude R even after the elapse of the specified time (t=T), and the error G does not disappear.

When such variation of the error G is observed, it is decided that the operating point has shifted to the short-circuit current $I_{SC}$ side of the maximum power point, and the amplitude R of the current command signal $I_{ref}$ is reduced by one step. That is, the target value of the controlled variable is reduced by one step, and the high-frequency inverter bridge 5 is subjected to the PWM modulation control in this state.

On the other hand, assume that the operating point is located at C on the short-circuit current $I_{SC}$ side of the maximum power point on the photovoltaic array current-to-voltage characteristic curve IV(E21) at the solar irradiance E21 as shown in FIG. 2. In this case, when the modulation control is performed with the target of the operating point set to C' by changing the amplitude R (controlled variable) of the current command signal $I_{ref}$, or the target value of the controlled variable, to the side on which it is reduced by one step, the amplitude r of the inverter output current signal $I_{out}$ does not converge on the increased amplitude R even after the elapse of the specified time (t=T), and the error G does not disappear.

When such variation of the error G is observed, it is decided that the operating point C is located on the short-circuit current $I_{SC}$ side of the maximum power point, and the target value of the controlled variable (the amplitude R of the current command signal $I_{ref}$) is controlled to be reduced by one step. In other words, the target of the operating point is set to D.

When the controlled variable reducing control as described above is continued and the operating point shifts from the short-circuit current $I_{SC}$ side to the open-circuit voltage $V_{OC}$ side beyond the maximum power point, the variation of the amplitude R is as follows. That is, when the specified time (t=T) has elapsed while subjecting the high-frequency inverter bridge 5 to the PWM modulation control in the state that the operating point has been shifted to the open-circuit voltage $V_{OC}$ side of the maximum power point, the amplitude r of the inverter output current signal $I_{out}$ converges on the set amplitude R, and the error G almost disappears.

Upon detecting such variation of the pulse error G, the error monitor 20 decides that the operating point has shifted to the open-circuit voltage $V_{OC}$ side of the maximum power point, and consequently the controlled variable calculator 14 increases the amplitude R of the current command signal $I_{ref}$ (i.e., makes the controlled variable greater).

By repeating the control as described above, the high-frequency inverter bridge 5 is subjected to PWM modulation control so that the operating point follows the maximum power point.

Figure 1B:
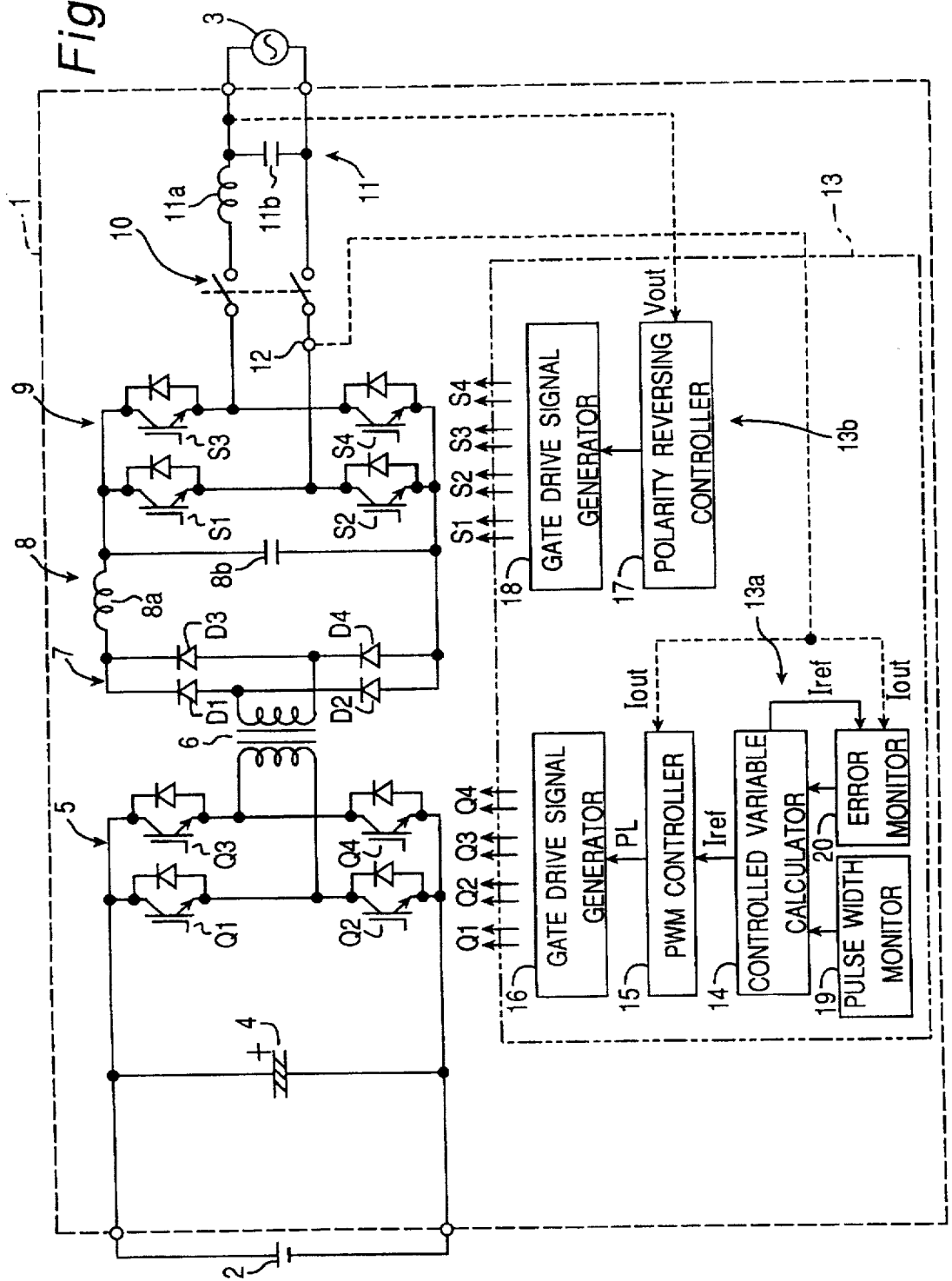
FIG. 1B is a diagram showing the total construction of another modification example of the inverter apparatus shown in FIG. 1.

The high-frequency inverter bridge control system 13a can have both the pulse width monitor 19 and the error monitor 20, as shown in FIG. 1B. In this case, for relatively small solar irradiances such as E21, the PWM control of the high-frequency inverter bridge 5 is performed based on the monitoring result by the error monitor 20 in the manner as described in connection with FIG. 1A. On the other hand, for great solar irradiances such as E22, the PWM control of the high-frequency inverter bridge 5 is performed based on the monitoring result by the pulse width monitor 19 in the manner as described in connection with FIG. 1. Accordingly, whether or not the operating point has shifted from the open-circuit voltage $V_{OC}$ side to the short-circuit current side beyond the maximum power point in the case of the great solar irradiance E22 is decided by determining whether or not the pulse width $P_W$ has exceeded the maximum permissible width $P_{WE}$, as described above.

(Second Embodiment)

FIG. 9 is a circuit diagram of an inverter apparatus 100 according to a second embodiment of the present invention.

This inverter apparatus 100 has many components that are the same as or similar to those of the inverter apparatus 1 shown in FIG. 1. Therefore, in FIG. 9 the same or similar components are denoted by the same reference numerals, and no detailed description is provided therefor.

This inverter apparatus 100 is characterized in that it has a hysteresis comparator 101 in place of the PWM controller 15 in the high-frequency inverter bridge control system 13 shown in FIG. 1, within a high-frequency inverter bridge control system 113a of the control circuit 113. The hysteresis comparator 101 compares the inverter output current signal $I_{out}$ with the current command signal $I_{ref}$ and controls the inverter output current signal $I_{out}$ such that the actual value of the inverter output current signal $I_{out}$ falls within a range having an upper and lower limits at a specified amplitude over and under the current command signal $I_{ref}$. That is, the hysteresis comparator 101 controls the inverter output current by its instantaneous value.

Next, inverter control operation of the inverter apparatus 100 will be described. A controlled variable calculator 14 determines the amplitude R of the current command signal $I_{ref}$ or the inverter controlled variable, to generate the current command signal $I_{ref}$. Then, the hysteresis comparator 101 compares the current command signal $I_{ref}$ with the inverter output current signal $I_{out}$, and supplies the gate drive signal generator 16 with the pulse train signal PL for controlling the four switching elements Q1 through Q4 of the high-frequency inverter bridge 5 so as to turn them on and off. On the other hand, the pulse width monitor 19 monitors the pulse width of the pulse train signal PL, and judges whether the operating point is located on the open-circuit voltage $V_{OC}$ side of the maximum power point or on the short-circuit current $I_{SC}$ side of the maximum power point according to the change of the pulse width $P_W$. Based on the result of the decision, the high-frequency inverter bridge 5 is subjected to the PWM modulation control so that the operating point follows the maximum power point.

Figure 10:
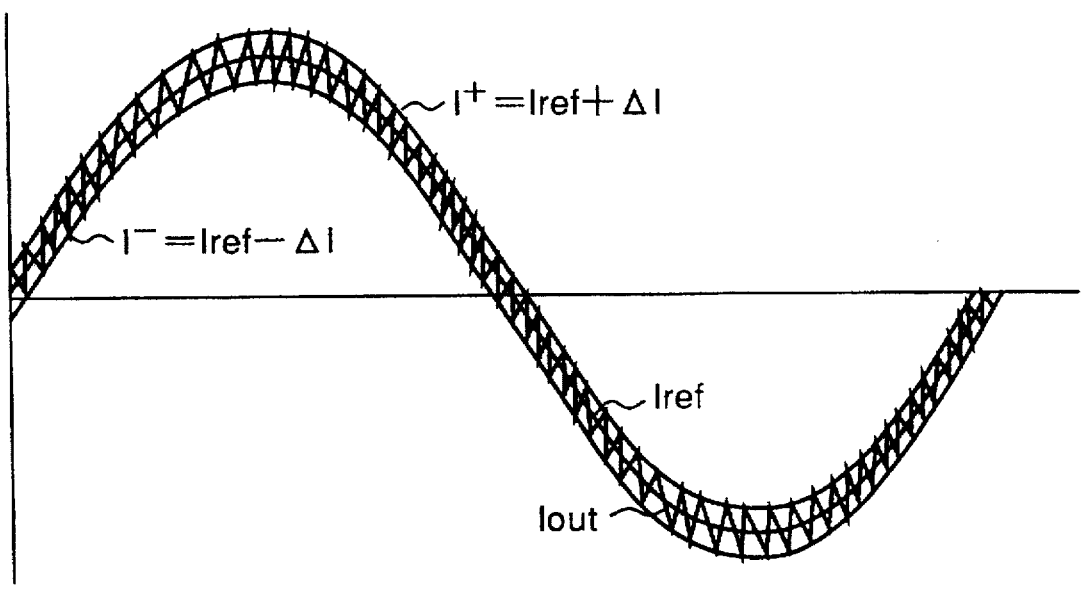
FIG. 10 is a diagram showing a relation between the current command signal $I_{ref}$ and the inverter output current signal $I_{out}$ in the second embodiment.

Next, operation of the hysteresis comparator 101 will be described. In the hysteresis comparator 101, as shown in FIG. 10, an upper limit value $I^+$ ($=I_{ref}+\Delta I$) and a lower limit value $I^-$ ($=I_{ref}-\Delta I$); $\Delta I$ being a given value, are beforehand given as set values. Then, the inverter output current signal $I_{out}$ is detected by the inverter output current detector 12, and the current command signal $I_{ref}$ generated by the controlled variable calculator 14 is compared with the inverter output current signal $I_{out}$ in the hysteresis comparator 101. When it is found that the inverter output current signal $I_{out}$ exceeds the set upper limit value $I^+$, a pulse train signal PL for turning on the switching elements Q1 and Q4 and turning off the switching elements Q2 and Q3 of the high-frequency inverter bridge 5 is generated and outputted to the gate drive signal generator 16. When the high-frequency inverter bridge 5 is switched by this pulse train signal PL, the inverter output current signal $I_{out}$ reduces and the current gradient reduces.

Subsequently, when the inverter output current signal $I_{out}$ becomes lower than the set lower limit value $I^-$, a pulse train signal PL for turning off the switching elements Q1 and Q4 and turning on the switching elements Q2 and Q3 of the high-frequency inverter bridge 5 is generated and outputted to the gate drive signal generator 16. When the high-frequency inverter bridge 5 is switched by this pulse train signal PL, the inverter output current signal $I_{out}$ increases and the current gradient increases.

By executing the switching control as described above, the inverter output current signal $I_{out}$ experiences such a transition that it reciprocates between the upper limit value $I^+$ and the lower limit value $I^-$ every time of switching. That is, the feedback control of making the inverter output current signal $I_{out}$ follow the current command signal $I_{ref}$ by reciprocating within a width of $\pm \Delta I$, is achieved. Therefore, by changing the amplitude R of the current command signal $I_{ref}$ by the controlled variable calculator 14, the inverter output can be changed.

(Third Embodiment)

Figure 11:
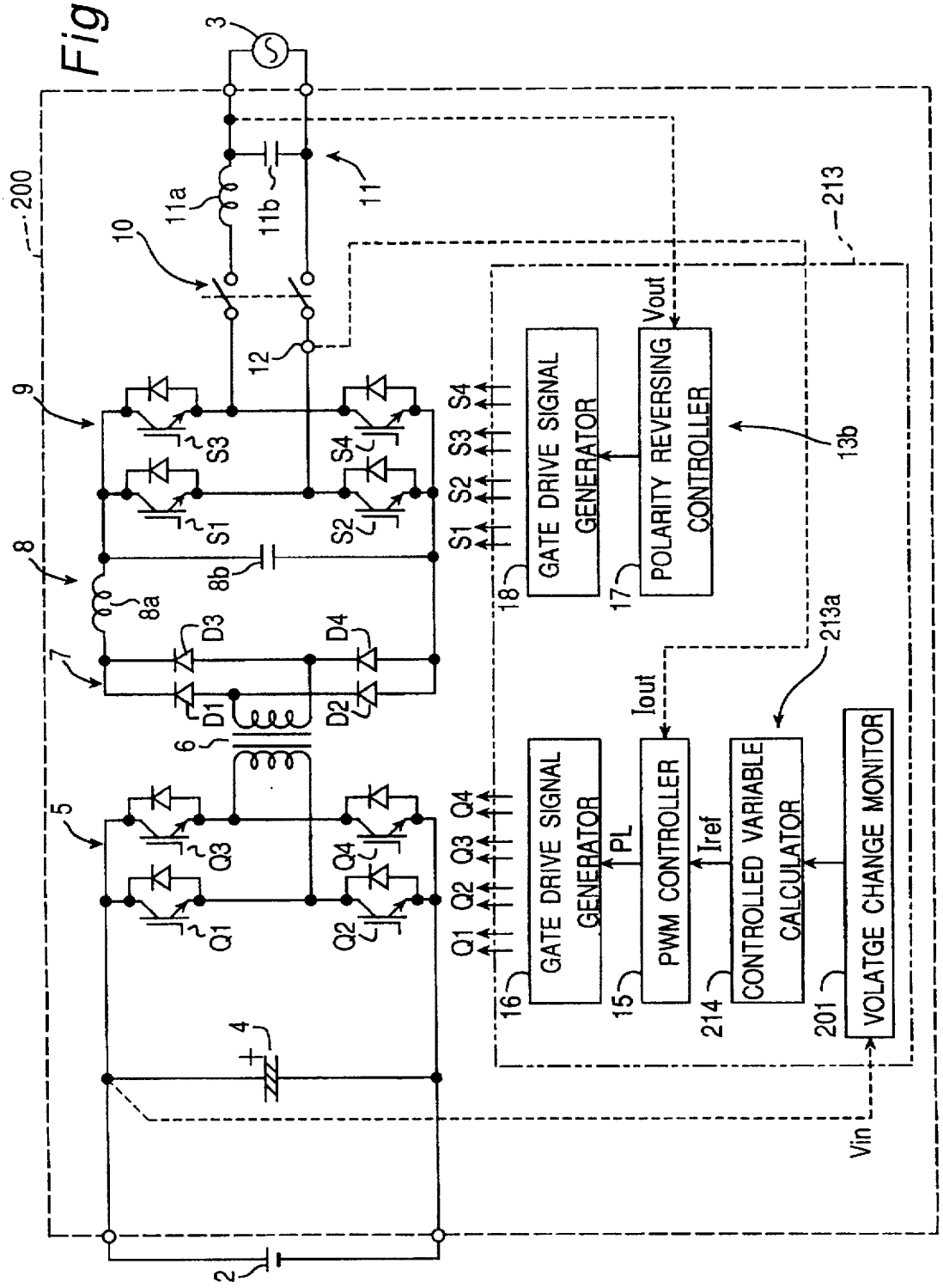
FIG. 11 is a diagram showing the total construction of an inverter apparatus according to a third embodiment of the present invention.

FIG. 11 is a circuit diagram showing an inverter apparatus 200 according to a third embodiment of the present invention. In FIG. 11, the same or similar components as those of the inverter apparatus 1 shown in FIG. 1 are denoted by the same reference numerals as those shown in FIG. 1, and no detailed description is provided therefor.

A high-frequency inverter bridge control system 213a of a control circuit 213 of the inverter apparatus 200 is provided with a voltage change monitor 201 in place of the pulse width monitor in the first and second embodiments. The voltage change monitor 201 monitors the change per unit time of a photovoltaic array operating point voltage $V_M$ obtained from a DC input voltage $V_{in}$ detected across the DC capacitor 4, and supplies the monitoring result to a controlled variable calculator 214.

Next, maximum power point follow control of this inverter apparatus 200 will be described. As described hereinbefore, the photovoltaic array 2 practically has the feature that its output characteristic varies every moment depending on the solar irradiance and the cell temperature. Therefore, in order to take out a maximum DC power from the photovoltaic array 2, it is required to increase the control response ability of the photovoltaic array operating point so that even when the solar irradiance and the cell temperature abruptly change, the maximum power point $W_{MAX}$ on the photovoltaic array characteristic curve at the solar irradiance changed is instantaneously followed. In order to obtain such a control response ability, the inverter apparatus 200 performs control as follows.

First, operation of the controlled variable calculator 214 will be described. As shown in FIG. 12, the controlled variable calculator 214 performs as a basic control operation the operation of setting an arbitrary period P that is plural times (n times in this case) as great as a sampling time s and gradually increasing the amplitude R (corresponding to the inverter output) of the current command signal $I_{ref}$ at a constant rate of increase, or in several steps, during the period P.

On the other hand, the voltage change monitor 201 monitors every sampling time s whether or not the change per unit time of the operating point voltage $V_M$ (referred to as a voltage change ratio $\alpha$ hereinafter) exceeds an upper limit value $\beta$. This upper limit value $\beta$ is set as follows. That is, when the amplitude R of the current command signal $I_{ref}$ is gradually increased at a constant rate of increase in the period P, the photovoltaic array operating point shifts sequentially from the open-circuit voltage side to the maximum power point $W_{MAX}$, and then to the short-circuit current side, with which the operating point voltage $V_M$ reduces. In this stage, when the photovoltaic array operating point is located on the open-circuit voltage side of the maximum power point $W_{MAX}$, the change of voltage is gentle. When the photovoltaic array operating point is located on the short-circuit current side of the maximum power point $W_{MAX}$, the change of voltage is abrupt.

The reason why the change of voltage is abrupt on the short-circuit current side is as follows. That is, when the operation of increasing the amplitude R is performed in the state that the photovoltaic array operating point is located on the short-circuit current side of the maximum power point $W_{MAX}$, in spite of the fact that the DC power inputted from the photovoltaic array 2 has reached the maximum power point $W_{MAX}$, the operation requires more DC power. Consequently, the photovoltaic array operating point shifts greatly in the direction in which the voltage reduces, i.e., in the direction in which it comes closer to the short-circuit current side away from the maximum power point $W_{MAX}$.

Therefore, a change of voltage that is permissible in the state that the photovoltaic array operating point is located on the open-circuit voltage side of the maximum power point $W_{MAX}$ is calculated under the condition that the amplitude R is gradually increased at a constant rate of increase, and the calculated change of voltage is stored as the upper limit value $\beta$ in the voltage change monitor 201. In practice, the upper limit value $\beta$ is set as follows. That is, a change of voltage generated when the control of increasing the amplitude R at a constant rate of increase during the period P in the state that the photovoltaic array operating point is located on the open-circuit voltage side of the maximum power point $W_{MAX}$ is defined as a voltage change $\Delta V'$, and a change of voltage that is slightly greater than the voltage change $\Delta V'$ is set as a permissible voltage change $\Delta V$. The reason why the permissible voltage change $\Delta V$ is made slightly greater than the voltage change $\Delta V'$ is that accuracy of locating the photovoltaic array operating point is lowered when the permissible voltage change $\Delta V$ is made too much greater than the voltage change $\Delta V'$.

Then, a value $\Delta V/P$ obtained by dividing the thus set permissible voltage change $\Delta V$ by the period P is set as the upper limit value $\beta$ ($\beta = \Delta V/P$).

The voltage change monitor 201, in which the calculated upper limit value $\beta$ is already stored, monitors the voltage change ratio $\alpha$. The monitoring of the voltage change ratio $\alpha$ is performed as follows. In the present case, the following description is provided referring to FIGS. 12A, 12B and 13 and on the assumption that the photovoltaic array operating point is located at a point A on the open-circuit voltage side of the maximum power point $W_{MAX(E1)}$ on the photovoltaic array power-to-voltage characteristic curve PV(E1) for the state E1 that the solar irradiance is great and stable.

The voltage change monitor 201 stores therein the value of the operating point voltage $V_{M(A)}$ at the start time (point A) of the period P as a voltage standard $V_{ST}$. When the controlled variable calculator 214 performs the control of gradually increasing the amplitude R of the current command signal $I_{ref}$ at a constant rate of increase during the period P in this state, the photovoltaic array operating point shifts on the photovoltaic array power-to-voltage characteristic curve PV(E1) (point A→point B), with which the operating point voltage $V_M$ reduces.

In this stage, the voltage change monitor 201 calculates a voltage change ratio $\alpha_{(1\ to\ n)}$ every sampling time $s_{(1\ to\ n)}$. The voltage change ratio $\alpha_{(1\ to\ n)}$ is calculated as follows. In this case, the following description is provided by taking as an example a voltage change ratio $\alpha_i$ after the elapse of an i'th sampling time $s_i$ from the start time (point A, for example) of the period P. A voltage change $\Delta V_i$ ($=V_{ST}-V_{M(i)}$) is obtained by subtracting an operating point voltage $V_{M(i)}$ at the time point (point $A_i$) after the elapse of the i'th sampling time $s_i$ from the start time of the period P from the voltage standard $V_{ST}$ (corresponding to an operating point voltage $V_{M(A)}$ at the point A). Then, a voltage change ratio $\alpha_i$ ($=\Delta V_i/T_i$) is obtained by dividing the obtained voltage change $\Delta V_i$ by an elapsed time $T_i$ from the start time of the period P to the end of the i'th sampling time $s_i$.

The voltage change monitor 201 locates the photovoltaic array operating point by comparing in magnitude the thus obtained voltage change ratio $\alpha_i$ with an upper limit value $\beta$ and according to the direction of the change of voltage. That is, when the direction of the change of voltage is negative ($V_{ST}>V_{M(i)}$) and $\alpha_i<\beta$, it is decided that the photovoltaic array operating point after the elapse of the sampling time $s_i$ is located on the open-circuit voltage side of the maximum power point $W_{MAX(E1)}$. On the other hand, when the direction of the change of voltage is negative ($V_{ST}>V_{M(i)}$) and $\alpha_i>\beta$, it is decided that the photovoltaic array operating point after the elapse of the sampling time $s_i$ is located on the short-circuit current side of the maximum power point $W_{MAX(E1)}$.

(Operation in the case where $\alpha<\beta$)

If the photovoltaic array operating point shifts from the point A to the point $A_i$, both located on the open-circuit voltage side of the maximum power point $W_{MAX(E1)}$, then $V_{ST}>V_{M(i)}$ (meaning that the direction of the change of voltage is negative) at the point $A_i$, and $\alpha_i<\beta$. Upon detecting the above state, the voltage change monitor 201 decides that the photovoltaic array operating point at the point $A_i$ is located on the open-circuit voltage side of the maximum power point $W_{MAX(E1)}$, and outputs a signal representing the information to the controlled variable calculator 214. The controlled variable calculator 214 continues the operation of gradually increasing the amplitude R of the current command signal $I_{ref}$ based on this signal.

When the above state continues for the period P, the voltage change monitor 201 updates the voltage standard $V_{ST}$. The updating of the voltage standard $V_{ST}$ is performed by updating and storing an operating point voltage ($V_{M(B)}$, $V_{M(C)}$) at the time point (point B, point C) after the elapse of the period P as the next voltage standard $V_{ST}$.

After updating the voltage standard $V_{ST}$, the controlled variable calculator 214 further continues the operation of gradually increasing the amplitude R of the current command signal $I_{ref}$. By repeating the above operation, the photovoltaic array operating point approaches the maximum power point $W_{MAX(E1)}$.

(Operation in the case where $\alpha>\beta$)

Figure 13:
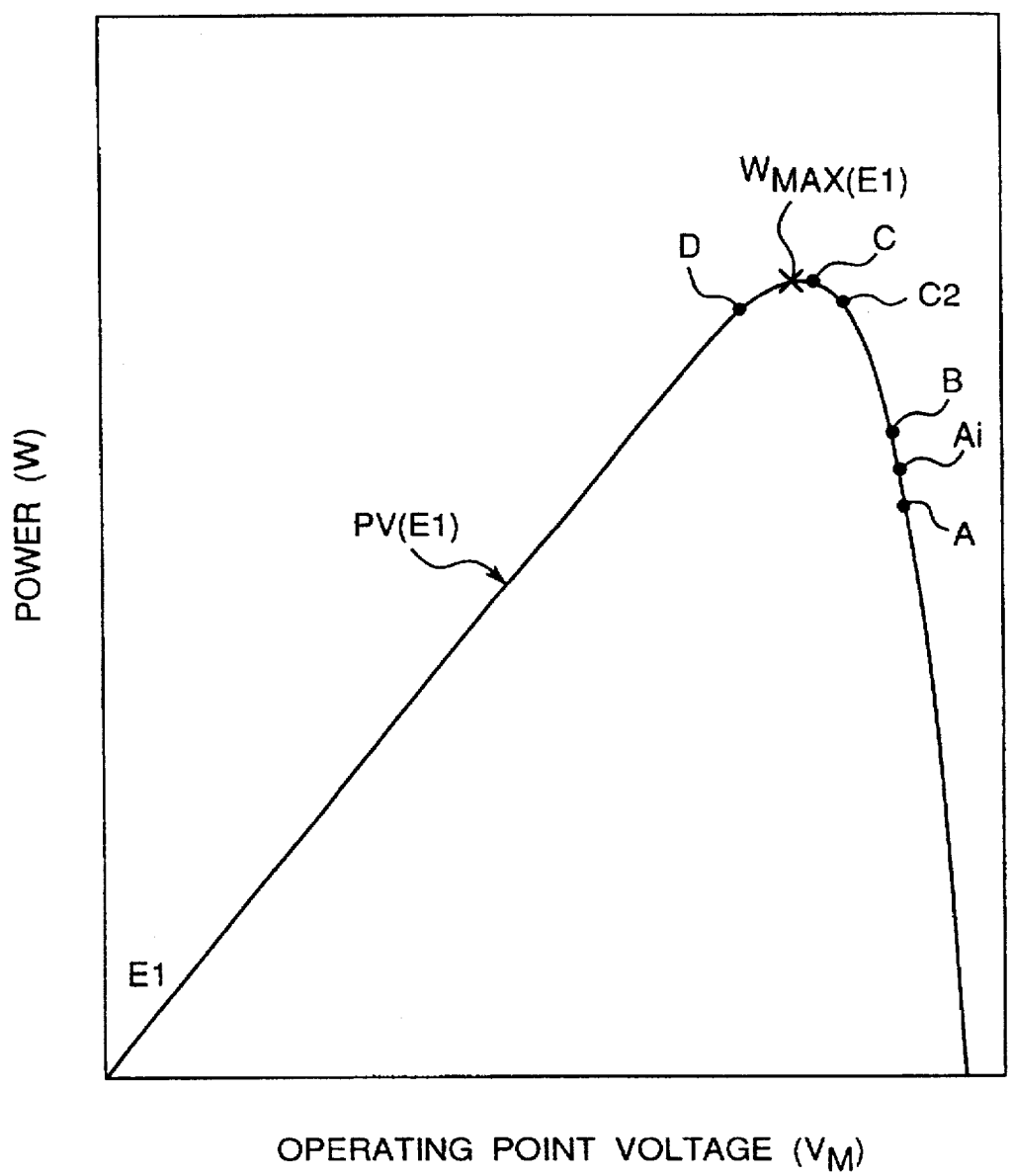
FIG. 13 is a graph schematically showing a relation between the voltage at the operating point of the inverter apparatus of the third embodiment and the photovoltaic array output power.

In FIGS. 13, 12A and 12B, when the operation of increasing the amplitude R of the current command signal $I_{ref}$ continues at the point C located about the maximum power point $W_{MAX(E1)}$ on the open-circuit voltage side (in this case, the point C is set at the time point at which it is synchronized with the start of the period P for the sake of simplicity of explanation) and a power greater than the maximum power that can be taken out of the photovoltaic array 2 is demanded, the photovoltaic array operating point shifts from the point C to a point D beyond the maximum power point $W_{MAX(E1)}$ by being pulled toward the short-circuit current side. In this stage, the operating point voltage $V_M$ changes in the direction in which it is largely reduced as time elapses.

Such change of the operating point voltage $V_M$ as described above is detected by the voltage change monitor 201. That is, referring to FIG. 12B, by subtracting an operating point voltage $V_{M(D)}$ at the time of the point D from the voltage standard $V_{ST}$ (=operating point voltage $V_{M(C)}$) at the point C, a voltage change $\Delta V_D$ ($=V_{ST}-V_{M(D)}$) is obtained. Then, a voltage change ratio $\alpha_D$ ($=\Delta V_D/T_j$) is obtained by dividing the obtained voltage change $\Delta V_D$ by an elapsed time $T_j$ from the point C to the point D.

The voltage change monitor 201 makes the following decision based on a comparison of the thus obtained voltage change ratio $\alpha_D$ with the upper limit value $\beta$ and the direction of the change of voltage. In this case, the voltage at the photovoltaic array operating point greatly reduces as time elapses, and therefore, $V_{ST}>V_{M(D)}$ (meaning that the direction of the change of voltage is negative) and $\alpha_D>\beta$. Upon detecting the above fact, the voltage change monitor 201 decides that the photovoltaic array operating point at the point D at which $V_{ST}>V_{M(D)}$ and $\Delta_D>\beta$ is located on the short-circuit current side of the maximum power point $W_{MAX(E1)}$.

Upon determining that the photovoltaic array operating point is located on the short-circuit current side of the maximum power point $W_{MAX(E1)}$, the voltage change monitor 201 outputs a signal representing the information to the controlled variable calculator 214 at the moment (=point D) at which the exceeding of the voltage change ratio $\alpha_D$ over the upper limit value $\beta$ is detected, without waiting for the completion of the period P. Based on this signal, the controlled variable calculator 214 instantaneously switches over to the operation of making the inverter output reduce, or reducing the amplitude R of the current command signal $I_{ref}$.

When the controlled variable calculator 214 continues the operation of reducing the amplitude R of the current command signal $I_{ref}$, the photovoltaic array operating point shifts from the position on the short-circuit current side of the maximum power point $W_{MAX(E1)}$ toward the maximum power point $W_{MAX(E1)}$ and finally to a position on the open-circuit voltage side of the maximum power point $W_{MAX(E1)}$.

The fact that the photovoltaic array operating point has shifted to the open-circuit voltage side beyond the maximum power point $W_{MAX(E1)}$ is decided as follows. That is, when the photovoltaic array operating point shifts from the short-circuit current side, to the maximum power point, and then to the open-circuit voltage side, the operating point voltage $V_M$ increases. Therefore, the voltage change monitor 201 calculates a voltage lower limit $V_U$ ($=V_{ST}-\Delta V$) by subtracting the permissible voltage change $\Delta V$ from the voltage standard $V_{ST}$ ($=V_{M(C)}$). Then, the operating point voltage $V_M$ detected every sampling time s is compared with the voltage lower limit $V_U$. When $V_M<V_U$, it is decided that the photovoltaic array operating point is still located on the short-circuit current side of the maximum power point $W_{MAX(E1)}$, and a signal representing the information is outputted to the controlled variable calculator 214. Then, the controlled variable calculator 214 continues the operation of reducing the amplitude R of the current command signal $I_{ref}$ by which the photovoltaic array operating point further shifts toward the open-circuit voltage side.

On the other hand, when $V_M>V_U$ (corresponding to a point C2 in FIG. 12B), it is decided that the photovoltaic array operating point has shifted to the open-circuit voltage side beyond the maximum power point $W_{MAX(E1)}$ as a consequence of the shift of the photovoltaic array operating point to the open-circuit voltage side, and a signal representing this information is outputted to the controlled variable calculator 214. Then, the controlled variable calculator 214 stops the operation of reducing the amplitude R of the current command signal $I_{ref}$ and switches the operation conversely to the operation of increasing the amplitude R of the current command signal $I_{ref}$. In this stage, the voltage change monitor 201 updates the voltage standard $V_{ST}$ using an operating point voltage $V_{M(C2)}$ at the time point when $V_M$ becomes $V_M > V_U$ (point C2).

By repeating the operation as described above, the photovoltaic array operating point located on the short-circuit current side of the maximum power point $W_{MAX(E1)}$ can be instantaneously shifted to the open-circuit voltage side of the maximum power point $W_{MAX(E1)}$, thereby allowing the photovoltaic array operating point to rapidly follow the maximum power point $W_{MAX(E1)}$ in the state E1 in which the solar irradiance is great and stable.

Furthermore, in executing the operation of reducing the amplitude R of the current command signal $I_{ref}$, the controlled variable calculator 214 sets a width of reduction of the amplitude R of the current command signal $I_{ref}$ according to the magnitude of the voltage change ratio $\alpha_D$ when the decision of starting the operation of reducing the amplitude R is made. That is, the greater the voltage change ratio $\alpha_D$ is, the more the amplitude R of the current command signal $I_{ref}$ is reduced. Conversely, the smaller the voltage change ratio $\alpha_D$ is, the less the amplitude R of the current command signal $I_{ref}$ is reduced. By this operation, the photovoltaic array operating point that has shifted to the short-circuit current side of the maximum power point $W_{MAX(E1)}$ can be rapidly shifted to the open-circuit voltage side.

Figure 14:
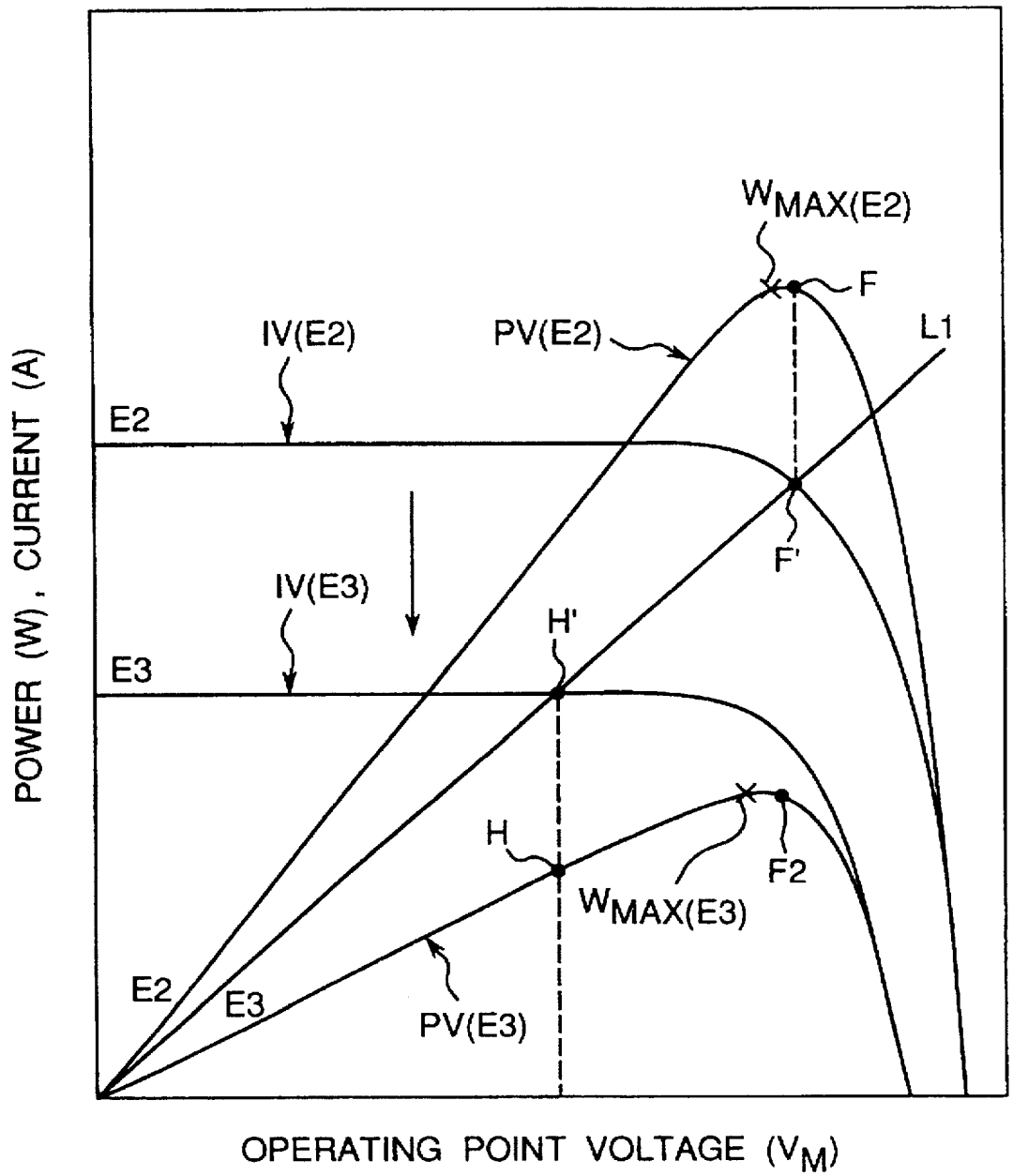
FIG. 14 is a graph schematically showing a relation between the voltage at the operating point of the inverter apparatus of the third embodiment and the photovoltaic array output power or output current.

Next, maximum power point follow control in the case where the solar irradiance abruptly changes from a great intensity (E2) to a small intensity (E3) will be described with reference to FIG. 14. FIG. 14 is a graph showing a correlation between voltage and power or current for the solar irradiances (E2 and E3). The curves denoted by the symbols PV(E2) and PV(E3) indicate the photovoltaic array power-to-voltage characteristic curves for the solar irradiances E2 and E3, while the curves denoted by the symbols IV(E2) and IV(E3) indicate the photovoltaic array current-to-voltage characteristic curves for the solar irradiances E2 and E3.

When the solar irradiance instantaneously changes from E2 to E3 in a state (point F) in which the photovoltaic array operating point is following a maximum power point $W_{MAX(E2)}$ on the photovoltaic array power-to-voltage characteristic curve PV(E2), the photovoltaic array operating point instantaneously shifts from the point F to a point H on the photovoltaic array power-to-voltage characteristic curve PV(E3). The reason for the above is as follows. In FIG. 14, in the state in which the operating point on the photovoltaic array power-to-voltage characteristic curve PV(E2) is located at the point F, the operating point on the photovoltaic array current-to-voltage characteristic curve IV(E2) is located at a point F' at the same voltage as the voltage at the point F. In this stage, the characteristic curve of the load connected to the photovoltaic array 2 is L1, where the point F' and the characteristic curve L1 of the load intersect each other.

When the solar irradiance E2 instantaneously shifts to E3 in this state, the photovoltaic array operating point shifts from the point F' on the photovoltaic array current-to-voltage characteristic curve IV(E2) to a point H' that is the intersection of the load characteristic curve L1 and the photovoltaic array current-to-voltage characteristic curve IV(E3). Therefore, on the photovoltaic array power-to-voltage characteristic curve PV(E3), the photovoltaic array operating point shifts to the point H at the same voltage as the voltage at the point H'.

Figure 15A:
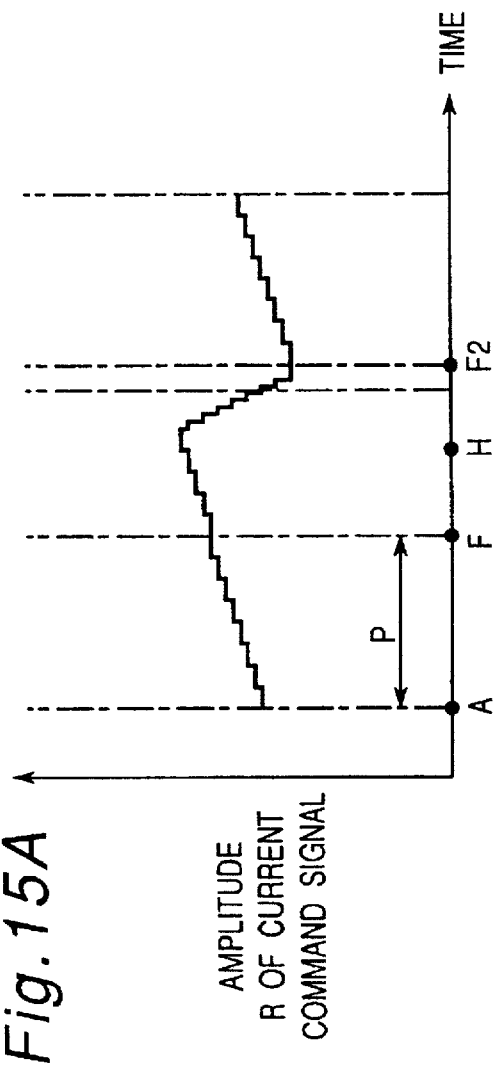
FIGS. 15A and 15B are schematic graphs showing the change in amplitude of the current command signal and the change of voltage at the operating point in accordance with the amplitude change, respectively, in the inverter apparatus of the third embodiment.
Figure 15B:
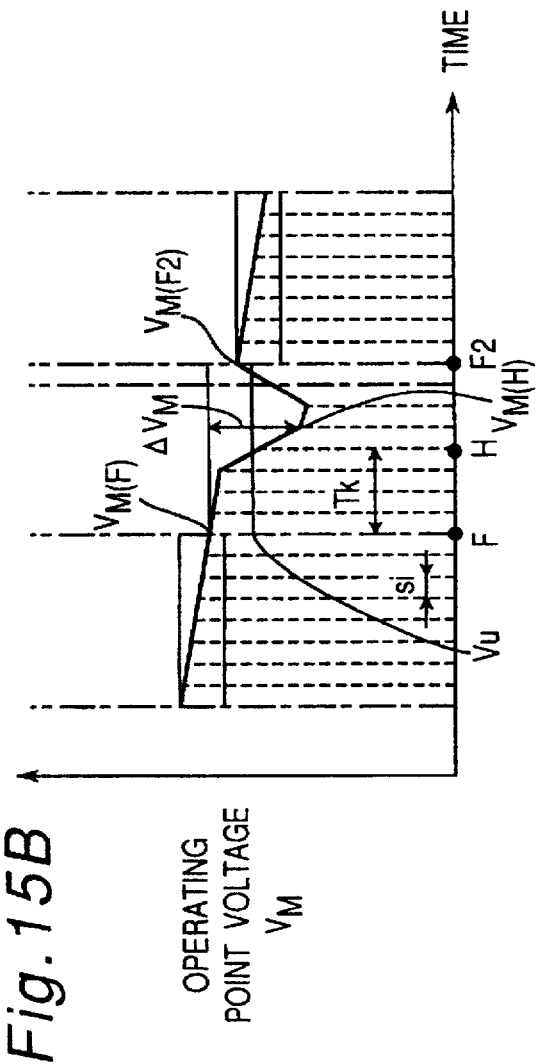

When the solar irradiance thus reduces abruptly, the amplitude R of the current command signal $I_{ref}$ and the voltage at the photovoltaic array operating point change as shown in FIGS. 15A and 15B. That is, before the solar irradiance is abruptly reduced, the photovoltaic array operating point is following the maximum power point $W_{MAX(E2)}$ on the photovoltaic array power-to-voltage characteristic curve PV(E2), and the photovoltaic array operating point voltage is reducing with time until the point F is reached. When the solar irradiance E2 abruptly reduces to the smaller solar irradiance E3 in this state, the voltage change monitor 201 knows this event as follows. That is, the voltage change monitor 201 calculates a voltage change ratio $\alpha_H$ in an elapsed time $T_k$ from the point F to the point H. For calculating the voltage change ratio $\alpha_H$, a voltage change $\Delta V_H$ ($=V_{ST}-V_{M(H)}$) is obtained by subtracting an operating point voltage $V_{M(H)}$ at point H from the voltage standard $V_{ST}$ ($=$operating point voltage $V_{M(F)}$) at the point F in the same manner as described above. Then, by dividing the obtained voltage change $\Delta V_H$ by the elapsed time $T_k$, the voltage change ratio $\alpha_H$ ($=\Delta V_H/T_k$) is obtained.

The voltage change monitor 201 compares the obtained voltage change ratio $\alpha_H$ with the preparatorily stored upper limit value $\beta$ (the upper limit of the voltage change ratio $\alpha$). Further, it inspects the direction of change of voltage. In this case, the voltage at the photovoltaic array operating point reduces greatly as time elapses, and therefore, the voltage change ratio $\alpha_D >$ the upper limit value $\beta$ and $V_{ST} > V_{M(H)}$ (meaning that the direction of change of voltage is negative). Therefore, the voltage change monitor 201 decides that the operating point at the point H is located on the short-circuit current side of a maximum power point $W_{MAX(E3)}$, and outputs a signal representing the information to the controlled variable calculator 214 at the moment (point H) at which the voltage change ratio $\alpha$ exceeds the upper limit value $\beta$, without waiting for the elapse of the period P.

The controlled variable calculator 214 instantaneously switches over to the operation of reducing the inverter output, or the amplitude R of the current command signal $I_{ref}$, based on the signal transmitted from the voltage change monitor 201. When the controlled variable calculator 214 continues the operation of reducing the amplitude R of the current command signal $I_{ref}$, the photovoltaic array operating point shifts from the position on the short-circuit current side of the maximum power point $W_{MAX(E3)}$ toward the maximum power point $W_{MAX(E3)}$ and finally to a position on the open-circuit voltage side of the maximum power point $W_{MAX(E3)}$.

The fact that the photovoltaic array operating point has shifted to the open-circuit voltage side beyond the maximum power point $W_{MAX(E3)}$ is decided as follows. That is, when the operating point shifts from the short-circuit current side, to the maximum power point, and then to the open-circuit voltage side, the operating point voltage $V_M$ increases. The voltage change monitor 201 calculates the voltage lower limit $V_U$ ($=V_{ST}-\Delta V$) by subtracting the permissible voltage change $\Delta V$ from the voltage standard $V_{ST}$ ($=V_{M(F)}$). Then, the operating point voltage $V_M$ is compared with the voltage lower limit $V_U$. When $V_M < V_U$, it is decided that the photovoltaic array operating point is still located on the short-circuit current side of the maximum power point $W_{MAX(E3)}$ and a signal representing the information is outputted to the controlled variable calculator 214. Then, the controlled variable calculator 214 continues the operation of reducing the amplitude R of the current command signal $I_{ref}$ by which the photovoltaic array operating point shifts further to the open-circuit voltage side.

When $V_M > V_U$ (corresponding to a point F2 in FIGS. 15A, 15B and 14), it is decided that the photovoltaic array operating point has shifted to the open-circuit voltage side beyond the maximum power point $W_{MAX(E3)}$ as a consequence of the shift of the photovoltaic array operating point to the open-circuit voltage side, and a signal representing the information is outputted to the controlled variable calculator 214. Then, the controlled variable calculator 214 stops the operation of reducing the amplitude R of the current command signal $I_{ref}$ and instantaneously switches the operation to the operation of increasing the amplitude R of the current command signal $I_{ref}$. In this stage, the voltage change monitor 201 updates the voltage standard $V_{ST}$ using the operating point voltage $V_{M(F2)}$ at the time point (point F2) when $V_{M(F2)} > V_U$ occurs.

By executing the operation as described above, the operating point located on the short-circuit current side of the maximum power point $W_{MAX(E3)}$ can be instantaneously shifted to the open-circuit voltage side of the maximum power point $W_{MAX(E3)}$, thereby allowing the photovoltaic array operating point to rapidly follow the maximum power point $W_{MAX(E3)}$ even in the state in which the solar irradiance is abruptly reduced.

The inverter apparatus 200 shifts the photovoltaic array operating point to the open-circuit voltage side by the operation of reducing the amplitude R of the current command signal $I_{ref}$. In executing such operation, the width of reduction of the amplitude R of the current command signal $I_{ref}$ is set according to the magnitude of the voltage change ratio $\alpha_H$ when the decision for executing the operation of reducing the amplitude R is made. That is, the greater the voltage change ratio $\alpha_H$ is, the more the amplitude R of the current command signal $I_{ref}$ is reduced. Conversely, the smaller the voltage change ratio $\alpha_H$ is, the less the amplitude R of the current command signal $I_{ref}$ is reduced. By this operation, the photovoltaic array operating point that has shifted to the short-circuit current side of the maximum power point $W_{MAX(E3)}$ can be rapidly shifted to the open-circuit voltage side.

In general, when the solar irradiance is abruptly reduced, the photovoltaic array operating point shifts greatly from the maximum power point $W_{MAX}$ to the short-circuit current side, and it takes much time to restore the photovoltaic array operating point that has greatly shifted on the short-circuit current side back to the maximum power point $W_{MAX}$. However, the inverter apparatus 200 decides by the magnitude of the voltage change ratio α how much the photovoltaic array operating point has shifted to the short-circuit current side apart from the maximum power point $W_{MAX}$, and it adjusts the width of reduction of the amplitude R of the current command signal $I_{ref}$ based on the decision. Therefore, even when the photovoltaic array operating point shifts greatly to the short-circuit current side of the maximum power point $W_{MAX}$ due to the abrupt reduction of the solar irradiance, the operating point can be rapidly restored to the maximum power point $W_{MAX}$.

Figure 16:
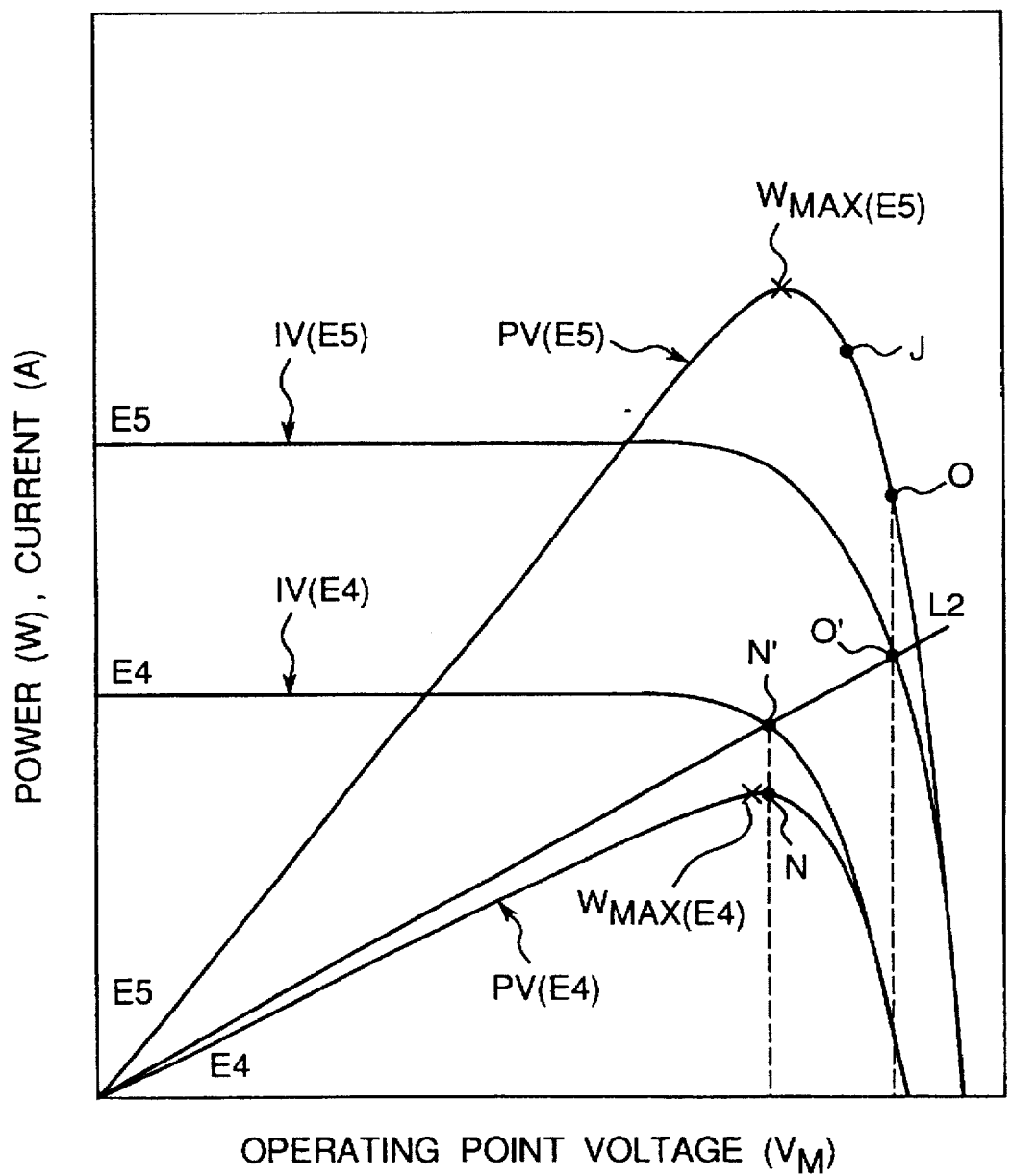
FIG. 16 is a graph showing a relation between the voltage at the operating point of the inverter apparatus of the third embodiment and the photovoltaic array output power or output current.

Next, maximum power point follow control in the case where the solar irradiance abruptly changes from a small intensity E4 to a great intensity E5 will be described with reference to FIG. 16. FIG. 16 is a graph showing a correlation between voltage and power or current for the solar irradiances (E4 and E5). The curves denoted by the symbols PV(E4) and PV(E5) indicate the photovoltaic array power-to-voltage characteristic curves for the solar irradiances E4 and E5, while the curves denoted by the symbols IV(E4) and IV(E5) indicate the photovoltaic array current-to-voltage characteristic curves for the solar irradiances E4 and E5.

When the solar irradiance instantaneously changes from E4 to E5 in a state (point N) in which the operating point is following a maximum power point $W_{MAX(E4)}$ on the photovoltaic array power-to-voltage characteristic curve PV(E4), the photovoltaic array operating point instantaneously shifts from the point N to a point O on the photovoltaic array power-to-voltage characteristic curve PV(E5). The reason for the above is as follows. In FIG. 16, in the state in which the operating point on the photovoltaic array power-to-voltage characteristic curve PV(E4) is located at the point N, the operating point on the photovoltaic array current-to-voltage characteristic curve IV(E4) is located at a point N' at the same voltage as the voltage at the point N. In this stage, the characteristic curve of the load connected to the photovoltaic array 2 is L2, where the point N' and the characteristic curve L2 of the load intersect each other.

When the solar irradiance E4 instantaneously shifts to E5 in this state, the photovoltaic array operating point shifts from the point N' on the photovoltaic array current-to-voltage characteristic curve IV(E4) to a point O' that is the intersection of the load characteristic curve L2 and the photovoltaic array current-to-voltage characteristic curve IV(E5). Therefore, on the photovoltaic array power-to-voltage characteristic curve PV(E5), the photovoltaic array operating point shifts to the point O at the same voltage as the voltage at the point O'.

When the solar irradiance thus increases abruptly, the amplitude R of the current command signal $I_{ref}$ and the voltage at the photovoltaic array operating point change as shown in FIGS. 17A and 17B. That is, before the solar irradiance is abruptly increased, the photovoltaic array operating point follows the maximum power point $W_{MAX(E9)}$ on the photovoltaic array power-to-voltage characteristic curve PV(E4), and the photovoltaic array operating point reduces with time until the point N is reached. When the solar irradiance E4 abruptly increases to the greater solar irradiance E5, the voltage change monitor 201 knows this event as follows. That is, assuming that the time point after the elapse of the period P from the point N is the point O and that the solar irradiance E4 abruptly increases to the greater solar irradiance E5 while the time elapses from the point N to the point O, the operating point voltage $V_{M(O)}$ at the point O greatly increases by $\Delta V_O$ from the voltage standard $V_{ST}$ ($=V_{M(N)}$).

Upon detecting that the operating point voltage $V_{M(O)}$ at the point O is greater than the voltage standard $V_{ST}$ ($=V_{M(N)}$) ($V_{M(O)} > V_{ST}$), the voltage change monitor 201 makes the following decision. That is, the photovoltaic array operating point at the point O is located on the open-circuit voltage side of a maximum power point $W_{MAX(E5)}$ and the distance between the photovoltaic array operating point at the point O and the maximum power point $W_{MAX(E5)}$ is greater than the distance between the photovoltaic array operating point at the point N and the maximum power point $W_{MAX(E4)}$.

Upon making the above decision, the voltage change monitor 201 outputs a signal representing the decision content to the controlled variable calculator 214. Then, the controlled variable calculator 214 increases the amplitude R of the current command signal $I_{ref}$ more greatly than usual, thereby rapidly shifting the photovoltaic array operating point to the maximum power point $W_{MAX(E5)}$.

The position of the photovoltaic array operating point in the state in which the solar irradiance is increased is decided in this way. The voltage change monitor 201 calculates the voltage change ratio $\alpha_\eta = (V_{M(\eta)} - V_{M(N)})/P$ in this stage, and according to the magnitude of the voltage change ratio $\alpha_O$, it decides how much the photovoltaic array operating point at the point O is separated from the maximum power point $W_{MAX(E5)}$, thereby determining the amount of increase of the amplitude R of the current command signal $I_{ref}$.

Specifically, for a greater the voltage change ratio $\alpha_O$, the monitor 201 judges that the photovoltaic array operating point at the point O is separated farther from the maximum power point $W_{MAX(E5)}$, and increases the amount of increase of the amplitude R, thereby rapidly shifting the photovoltaic array operating point separated from the maximum power point $W_{MAX(E5)}$ to the maximum power point $W_{MAX(E5)}$. It is to be noted that the operation of rapidly restoring the photovoltaic array operating point that has greatly shifted to the open-circuit voltage side of the maximum power point $W_{MAX(E5)}$ to the maximum power point $W_{MAX(E5)}$ is performed only in a period from the point O to a point O2 after the elapse of a specified time (in this inverter apparatus 200, the period from the point O to the point O2 is defined as one cycle of the period P). After the point O2, the operation is switched to the normal operation of gradually increasing the amplitude R. This is because, when the operation of rapidly restoring the photovoltaic array operating point located on the open-circuit voltage side to the vicinity of the maximum power point $W_{MAX(E5)}$ is performed for a long period, there is a possibility that the photovoltaic array operating point greatly shifts to the short-circuit current side beyond the maximum power point $W_{MAX(E5)}$.

Furthermore, in executing the aforementioned operation (the operation of rapidly restoring the photovoltaic array operating point located on the open-circuit voltage side to the vicinity of the maximum power point $W_{MAX(E5)}$), the upper limit value $\beta'$ of the voltage change ratio $\alpha$ is set as follows. That is, in the operation of rapidly restoring the photovoltaic array operating point located on the open-circuit voltage side to the vicinity of the maximum power point $W_{MAX(E5)}$, the amplitude R is increased more than in the normal case. Therefore, in spite of the fact that the photovoltaic array operating point is located on the open-circuit voltage side of the maximum power point $W_{MAX(E5)}$, the voltage change ratio sometimes exceeds the previously set upper limit value $\beta$. If such a state occurs, the voltage change monitor 201 will make such a faulty decision that the photovoltaic array operating point is located on the short-circuit current side of the maximum power point $W_{MAX(E5)}$. Therefore, a permissible voltage change $\Delta V'$ greater than the permissible voltage change $\Delta V$ used in setting the upper limit value $\beta$ is newly set, and a value $\Delta V'/P$ obtained by dividing the permissible voltage change $\Delta V'$ by the period P is set as the upper limit value $\beta'$. By thus separately setting the upper limit value $\beta'$ and storing the same in the voltage change monitor 201, the possible faulty decision of the position of the photovoltaic array operating point is prevented.

By executing the above operation, the photovoltaic array operating point that is located on the open-circuit voltage side of the maximum power point $W_{MAX(E5)}$ and separated far apart from the maximum power point $W_{MAX(E5)}$ is made to approach the maximum power point $W_{MAX(E5)}$ more rapidly than in the normal operation of gradually increasing the amplitude R of the current command signal $I_{ref}$.

Although the PWM controller 15, the controlled variable calculator 214, the voltage change monitor 201 and the polarity reversing controller 17 are shown by a block diagram in the figure of the present embodiment, they can be constituted by software.

Furthermore, as a method for judging whether or not the photovoltaic array operating point has shifted from the open-circuit voltage side to the short-circuit current side beyond the maximum power point, the present embodiment monitors as to whether or not the voltage change ratio $\alpha$ at each sampling time s exceeds the upper limit value $\beta$. However, it is also acceptable to monitor as to whether or not the operating point voltage $V_M$ becomes smaller than the voltage lower limit $V_U$ at each sampling time s, instead of monitoring the voltage change ratio $\alpha$.

Furthermore, in the aforementioned embodiment, the upper limit value $\beta$ is stored as a preset value in the voltage change monitor 201. However, the value may be a variable value which varies depending on the change of environments such as the solar irradiance and cell temperature.

(Fourth Embodiment)

Figure 18:
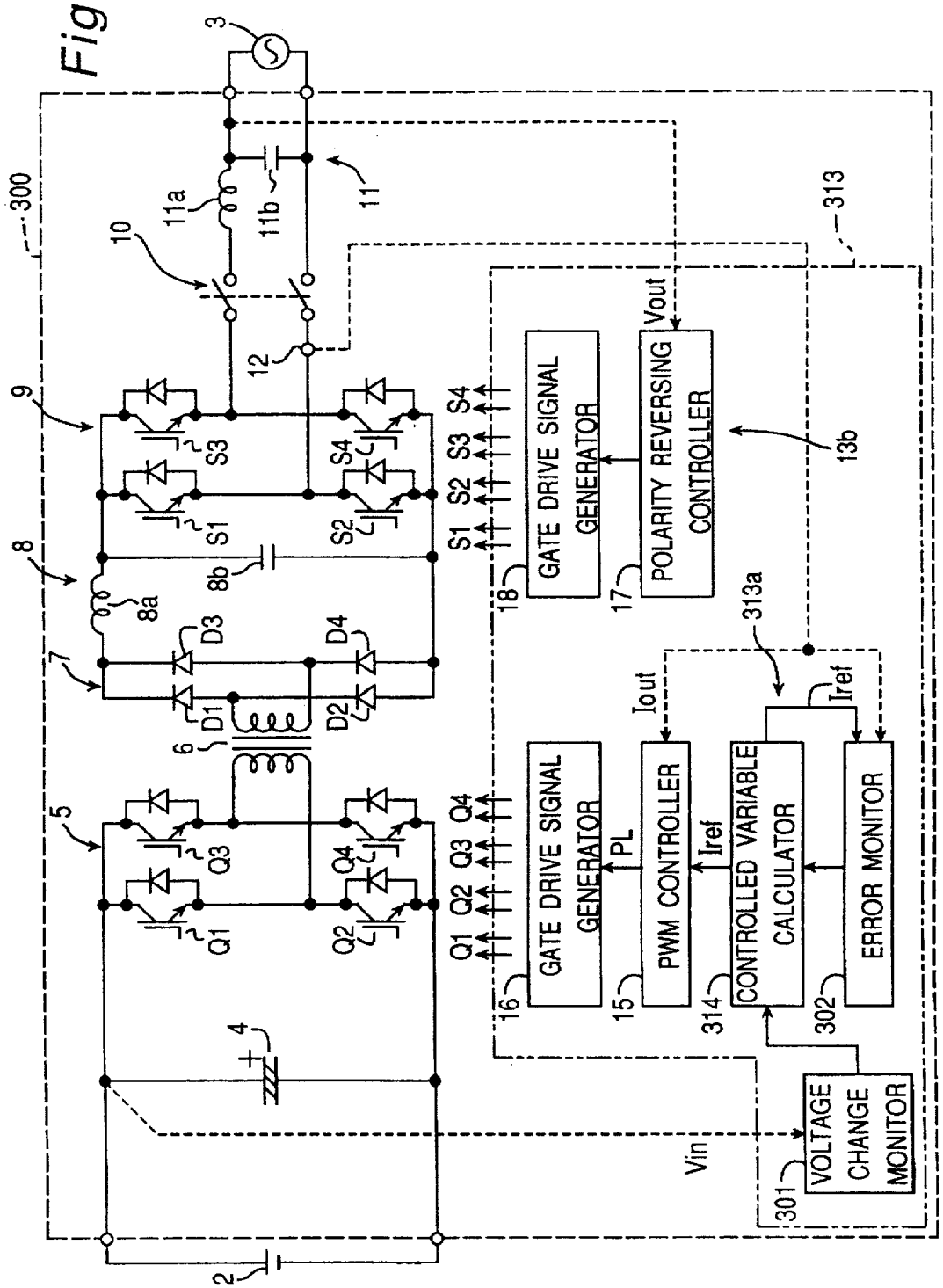
FIG. 18 is a diagram showing the total construction of an inverter apparatus according to a fourth embodiment of the present invention.

FIG. 18 shows an inverter apparatus 300 according to a fourth embodiment of the present invention. This inverter apparatus 300 basically has a similar construction to that of the inverter apparatus 200. Therefore, in FIG. 18, the same or similar components are denoted by the same reference numerals used in FIG. 11, and no detailed description is provided therefor.

The inverter apparatus 300 is characterized in that it has an error monitor 302 in addition to a voltage change monitor 301 in an inverter bridge control system 313a of a control circuit 313, and it is further characterized by the construction of a controlled variable calculator 314.

The error monitor 302 performs the following an operation. That is, in the inverter apparatus 300, the on/off control operation of the switching elements Q1 through Q4 of the high-frequency inverter bridge 5 is controlled such that the error G between the inverter output current signal $I_{out}$ and the current command signal $I_{ref}$ set by the controlled variable calculator 314 disappears. For such a control, the error G is monitored by the error monitor 302, and when the error G almost disappears within a specified time, it is decided that the photovoltaic array operating point is located on the open-circuit voltage side of the maximum power point $W_{MAX}$. When the error continues to exist without disappearing within the specified time, it is decided that the photovoltaic array operating point is located on the short-circuit current side of the maximum power point $W_{MAX}$.

Figure 19A:
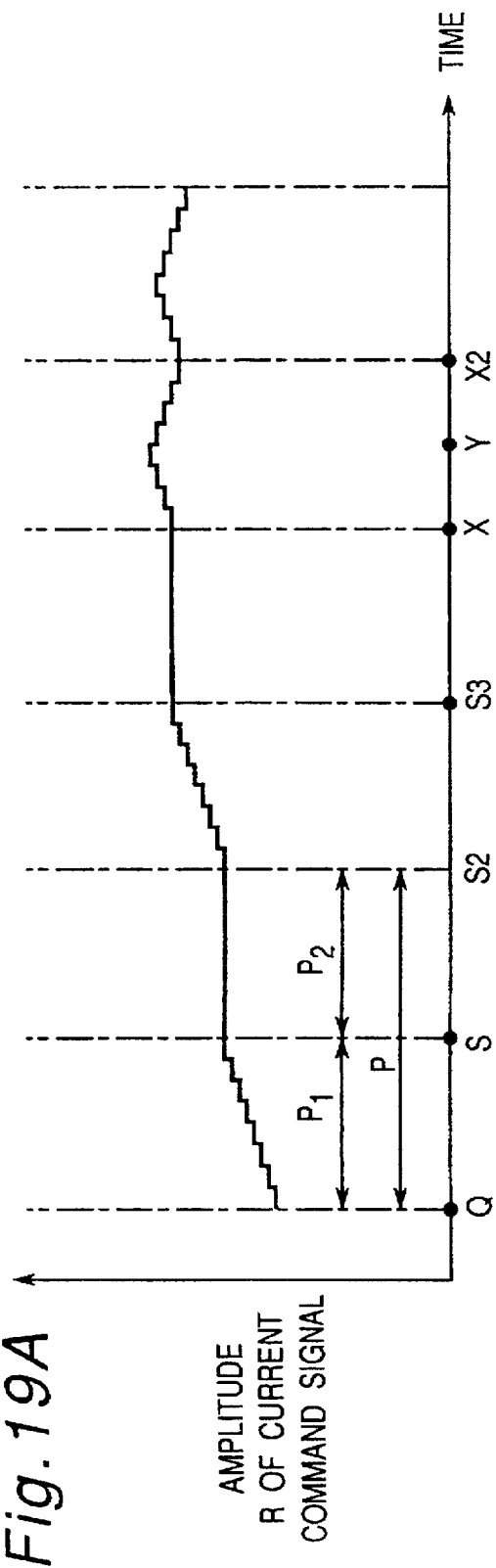
FIGS. 19A and 19B are charts schematically showing the change in amplitude of the current command signal and the change of voltage at the operating point in accordance with the amplitude change, respectively, in the inverter apparatus of the fourth embodiment.
Figure 19B:
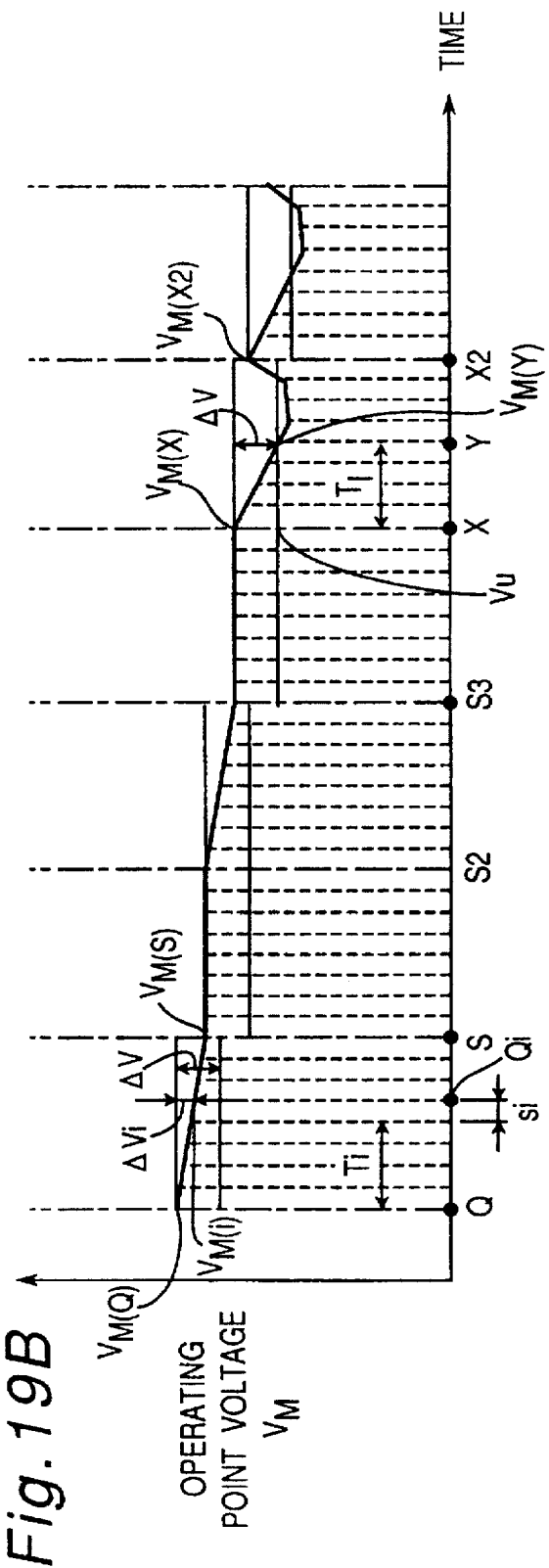

The controlled variable calculator 314 basically performs the following operation. That is, as shown in FIGS. 19A and 19B, an arbitrary period P is set, and the period P is divided into two sub-periods $P_1$ and $P_2$. In the former sub-period $P_1$, the amplitude R of the current command signal $I_{ref}$ is gradually increased at a specified rate of increase. In the latter sub-period $P_2$, the amplitude R of the current command signal $I_{ref}$ that has been increased in the sub-period $P_1$ is maintained so that it does not change. By repeating the period P as described above, the amplitude R of the current command signal $I_{ref}$ is gradually increased.

The controlled variable calculator 314 makes the monitoring of the change of voltage by the voltage change monitor 301 and the monitoring of the error G by the error monitor 302 compatible by dividing the period P into the sub-period $P_1$ in which the amplitude R is increased and the sub-period $P_2$ in which the amplitude R is not changed. That is, in the state in which the operation of gradually increasing the amplitude R is performed and the error G still exists. Therefore, the error monitor 302 cannot determine the position of the photovoltaic array operating point. On the other hand, in the state in which the operation of gradually increasing the amplitude R is not performed under the condition that the solar irradiance is stable, there is no such possibility that the voltage at the photovoltaic array operating point will reduce with certain a regularity. Therefore, the voltage change monitor 301 cannot decide the position of the photovoltaic array operating point.

Therefore, in the entire period P by monitoring the reduction of the voltage at the photovoltaic array operating point by the voltage change monitor 201, the position of the photovoltaic array operating point is decided. On the other hand, in the sub-period $P_2$ in which the amplitude R is not changed, by monitoring whether or not the error between the current command signal $I_{ref}$ and the inverter output current signal $I_{out}$ disappears within a specified time, the position of the photovoltaic array operating point is decided.

As described above, by being further provided with the voltage change monitor 301, the inverter apparatus 300 concurrently uses the method of making the photovoltaic array operating point follow the maximum power point by monitoring the error and the method of making the photovoltaic array operating point follow the maximum power point by monitoring the change per unit time of voltage at the photovoltaic array operating point.

First, the photovoltaic array operating point position determining operation by the voltage change monitor 301 will be described. The voltage change monitor 301 monitors whether or not the change per unit time of the operating point voltage $V_M$ (referred to as a voltage change ratio $\alpha$ hereinafter) exceeds the upper limit value $\beta$ every sampling time s. The upper limit value $\beta$ is set as follows. That is, a change of voltage occurring in executing the amplitude increasing control of the amplitude R at a specified rate of increase for the sub-period $P_1$ in the state that the photovoltaic array operating point is located on the open-circuit voltage side of the maximum power point $W_{MAX}$, is defined as a voltage change $\Delta V'$, and a change of voltage slightly greater than the voltage change $\Delta V'$ is set as a permissible voltage change $\Delta V$. Then, a value $\Delta V/P_1$ obtained by dividing the thus set permissible voltage change $\Delta V$ by the sub-period $P_1$ is set as the upper limit value $\beta (\beta=\Delta V/P_1)$.

Figure 20:
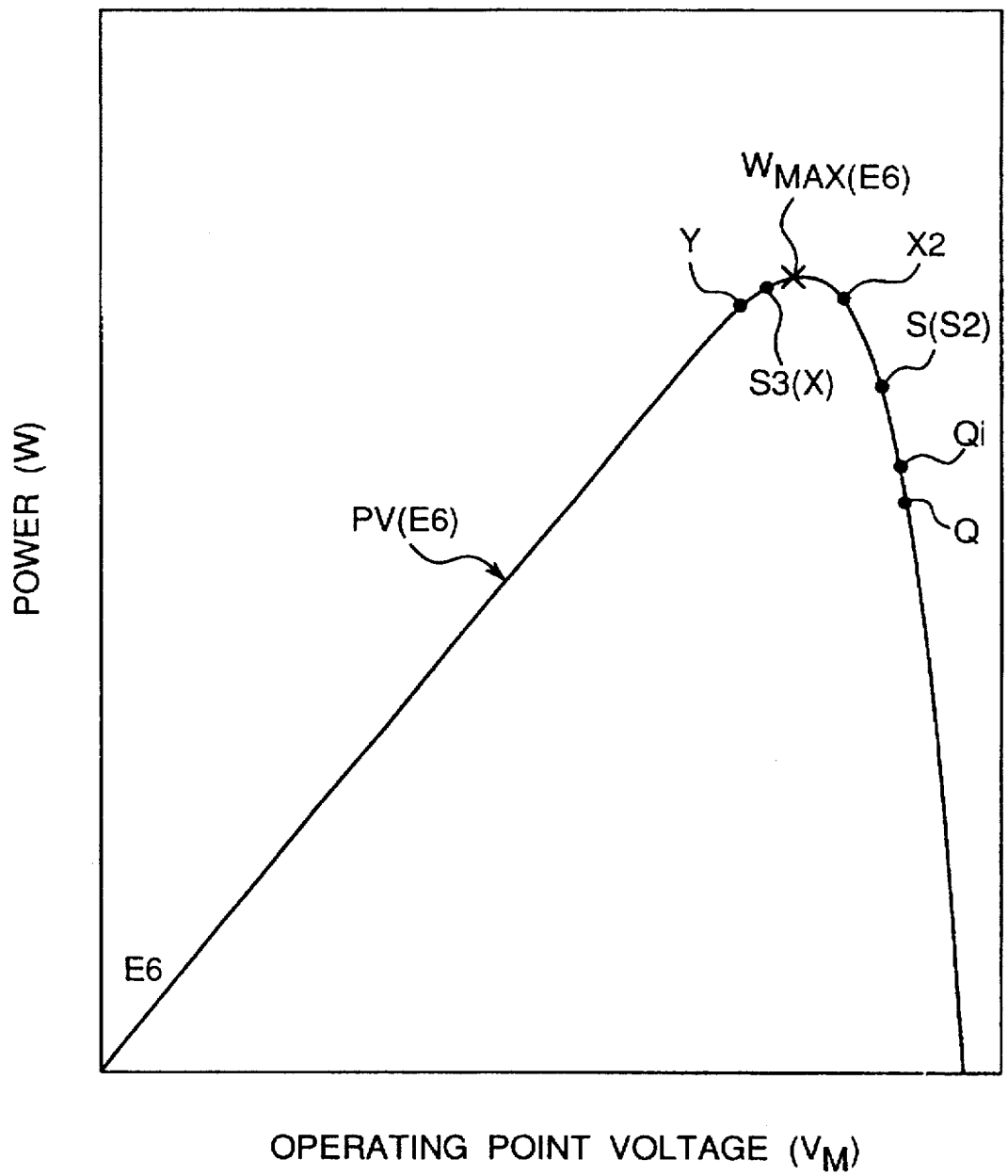
FIG. 20 is a graph showing a relation between the voltage at the operating point of the inverter apparatus of the fourth embodiment and the photovoltaic array output power.

The voltage change monitor 301 monitors the voltage change ratio $\alpha$ with the upper limit value $\beta$ stored therein. The monitoring of the voltage change ratio $\alpha$ is performed as follows. The following description is provided on the assumption that as shown in FIG. 20, the photovoltaic array operating point first shifts from a point Q located on the open-circuit voltage side of a maximum power point $W_{MAX(E6)}$ to a point S (point S2) that is also located on the open-circuit voltage side of the maximum power point on a photovoltaic array power-to-voltage characteristic curve PV(E6) for a great and stable solar irradiance E6. Thereafter it shifts to a point S3 (point X) located slightly on the short-circuit current side of the maximum power point $W_{MAX}$. It then further shifts to a point Y located further on the short-circuit current side.

The voltage change monitor 301 stores therein the value of the operating point voltage $V_{M(Q)}$ at the start time (point Q) of the period P as a voltage standard $V_{ST}$. When the controlled variable calculator 314 performs the control of gradually increasing the amplitude R of the current command signal $I_{ref}$ at a constant rate of increase during the sub-period $P_1$ in this state, the photovoltaic array operating point shifts on the photovoltaic array power-to-voltage characteristic curve PV(E6), with which the operating point voltage $V_M$ reduces.

In this stage, the voltage change monitor 301 calculates a voltage change ratio $\alpha_{(1\ to\ n)}$ every sampling time $s_{(1\ to\ n)}$. The voltage change ratio $\alpha_{(1\ to\ n)}$ is calculated as follows. In this case, the following description is provided by taking as an example a voltage change ratio $\alpha_i$ after the elapse of an i'th sampling time $s_i$ from the start time (point Q, for example) of the sub-period $P_1$. A voltage change $\Delta V_i (=V_{ST}-V_{M(i)})$ is obtained by subtracting an operating point voltage $V_{M(i)}$ at the time point (point $Q_i$) after the elapse of the i'th sampling time $s_i$ from the start time of the sub-period $P_1$ from the voltage standard $V_{ST}$ (corresponding to an operating point voltage $V_{M(Q)}$ at the point Q). Then, a voltage change ratio $\alpha_i (=\Delta V_i/T_i)$ is obtained by dividing the obtained voltage change $\Delta V_i$ by an elapsed time $T_i$ from the start time of the period P to the end of the i'th sampling time $s_i$.

The voltage change monitor 301 locates the photovoltaic array operating point by comparing in magnitude the thus obtained voltage change ratio $\alpha_i$ with an upper limit value $\beta$ and according to the direction of the change of voltage. That is, when the direction of the change of voltage is negative ($V_{ST}>V_{M(i)}$) and $\alpha_i<\beta$, it is decided that the photovoltaic array operating point (point $Q_i$) after the elapse of the sampling time $s_i$ is located on the open-circuit voltage side of the maximum power point $W_{MAX(E6)}$. On the other hand, when the direction of the change of voltage is negative ($V_{ST}>V_{M(i)}$) and $\alpha_i>\beta$, it is decided that the photovoltaic array operating point (point $Q_1$) after the elapse of the sampling time $s_i$ is located on the short-circuit current side of the maximum power point $W_{MAX(E6)}$.

(Operation in the case where $\alpha<\beta$)

If the photovoltaic array operating point shifts from the point Q to the point $Q_i$, both located on the open-circuit voltage side of the maximum power point $W_{MAX(E6)}$, then $V_{ST}>V_{M(i)}$ (meaning that the direction of the change of voltage is negative) at the point $A_i$, and $\alpha_i<\beta$. Upon detecting the above state, the voltage change monitor 301 decides that the photovoltaic array operating point at the point $Q_i$ is located on the open-circuit voltage side of the maximum power point $W_{MAX(E6)}$, and outputs a signal representing the information to the controlled variable calculator 314. The controlled variable calculator 314 continues the operation of gradually increasing the amplitude R of the current command signal $I_{ref}$ based on this signal, so that the photovoltaic array operating point approaches the maximum power point $W_{MAX(E6)}$.

When the above state continues for the sub-period $P_1$, the voltage change monitor 301 updates the voltage standard $V_{ST}$. The updating of the voltage standard $V_{ST}$ is performed by updating and storing an operating point voltage ($V_{M(S)}$) at the time point (point S) after the elapse of the sub-period $P_1$ as the next voltage standard $V_{ST}$.

After updating the voltage standard $V_{ST}$, the controlled variable calculator 314 changes over to the operation for not changing the amplitude R of the current command signal $I_{ref}$ during the sub-period $P_2$. Then, the amplitude R of the current command signal $I_{ref}$ stops increasing, so that the operating point voltage does not reduce. Therefore, the voltage change monitor 301 cannot decide the position of the photovoltaic array operating point. For this reason, in the sub-period $P_2$, the error monitor 302 decides the position of the photovoltaic array operating point, as will be described later.

(Operation in the case where $\alpha>\beta$)

In FIG. 20, when the operation of increasing the amplitude R of the current command signal $I_{ref}$ continues at the point X located about the maximum power point $W_{MAX(E6)}$ on the open-circuit voltage side (in this case, the point X is set at the time point at which it is synchronized with the start of the sub-period $P_1$ for the sake of simplicity of explanation), a power greater than the maximum power that can be taken out of the photovoltaic array 2 is demanded, and therefore, the photovoltaic array operating point shifts from the point X to a point Y beyond the maximum power point $W_{MAX(E1)}$ by being pulled toward the short-circuit current side. In this stage, the operating point voltage $V_M$ changes in the direction in which it is largely reduced as time elapses.

Such a change of the operating point voltage $V_M$ as described above is detected by the voltage change monitor 301. That is, referring to FIGS. 19A and 19B, by subtracting an operating point voltage $V_{M(Y)}$ at the time of the point Y from the voltage standard $V_{ST}$ (=operating point voltage $V_{M(X)}$) at the point X, a voltage change $\Delta V_Y$ (=$V_{ST}-V_{M(Y)}$) is obtained. Then, a voltage change ratio $\alpha_Y$ (=$\Delta V_Y/T_1$) is obtained by dividing the obtained voltage change $\Delta V_Y$ by an elapsed time $T_1$ from the point X to the point Y.

The voltage change monitor 301 makes the following decision based on a comparison of the thus obtained voltage change ratio $\alpha_Y$ with the upper limit value $\beta$ and the direction of the change of voltage. In this case, the voltage at the photovoltaic array operating point greatly reduces as time elapses, and therefore, $V_{ST} > V_{M(Y)}$ (meaning that the direction of the change of voltage is negative) and $\alpha_Y > \beta$. Upon detecting the above fact, the voltage change monitor 301 decides that the photovoltaic array operating point at the point Y at which $V_{ST} > V_{M(y)}$ and $\alpha_Y > \beta$ is located on the short-circuit current side of the maximum power point $W_{MAX(E6)}$.

Upon determining that the photovoltaic array operating point is located on the short-circuit current side of the maximum power point $W_{MAX(E6)}$, the voltage change monitor 301 outputs a signal representing the information to the controlled variable calculator 314 at the moment (=point Y) at which the exceeding of the voltage change ratio $\alpha_Y$ over the upper limit value $\beta$ is detected, without waiting for the completion of the sub-period $P_1$. Based on this signal, the controlled variable calculator 314 instantaneously switches over to the operation of making the inverter output reduce, or reducing the amplitude R of the current command signal $I_{ref}$.

When the controlled variable calculator 314 continues the operation of reducing the amplitude R of the current command signal $I_{ref}$, the photovoltaic array operating point shifts from the position on the short-circuit current side of the maximum power point $W_{MAX(E6)}$ toward the maximum power point $W_{MAX(E6)}$ and finally to a position on the open-circuit voltage side of the maximum power point $W_{MAX(E6)}$.

The fact that the photovoltaic array operating point has shifted to the open-circuit voltage side beyond the maximum power point $W_{MAX(E6)}$ is decided as follows. That is, when the photovoltaic array operating point shifts from the short-circuit current side to the maximum power point, and then to the open-circuit voltage side, the operating point voltage $V_M$ increases. Therefore, the voltage change monitor 301 calculates a voltage lower limit $V_U$ (=$V_{ST}-\Delta V$) by subtracting the permissible voltage change $\Delta V$ from the voltage standard $V_{ST}$ (=$V_{M(X)}$). Then, the operating point voltage $V_M$ detected every sampling time s is compared with the voltage lower limit $V_U$. When $V_M < V_U$, it is decided that the photovoltaic array operating point is still located on the short-circuit current side of the maximum power point $W_{MAX(E6)}$, and a signal representing the information is outputted to the controlled variable calculator 314. Then, the controlled variable calculator 314 continues the operation of reducing the amplitude R of the current command signal $I_{ref}$ by which the photovoltaic array operating point further shifts toward the open-circuit voltage side.

On the other hand, when $V_M > V_U$ (corresponding to a point X2 in FIG. 20), it is decided that the photovoltaic array operating point has shifted to the open-circuit voltage side beyond the maximum power point $W_{MAX(E6)}$ as a consequence of the shift of the photovoltaic array operating point to the open-circuit voltage side, and a signal representing this information is outputted to the controlled variable calculator 314. Then, the controlled variable calculator 314 stops the operation of reducing the amplitude R of the current command signal $I_{ref}$ and switches the operation conversely to the operation of increasing the amplitude R of the current command signal $I_{ref}$. In this stage, the voltage change monitor 301 updates the voltage standard $V_{ST}$ using an operating point voltage $V_{M(X2)}$ at the time point when $V_M$ becomes $V_M > V_U$ (point X2).

By repeating the operation as described above, the photovoltaic array operating point located on the short-circuit current side of the maximum power point $W_{MAX(E6)}$ is instantaneously shifted to the open-circuit voltage side of the maximum power point $W_{MAX(E6)}$.

Furthermore, in executing the operation of reducing the amplitude R of the current command signal $I_{ref}$, the controlled variable calculator 314 sets a width of reduction of the amplitude R of the current command signal $I_{ref}$ according to the magnitude of the voltage change ratio $\alpha_Y$ when the decision of starting the operation of reducing the amplitude R is made, as in the inverter apparatus 200 of the aforementioned third embodiment.

Figure 21:
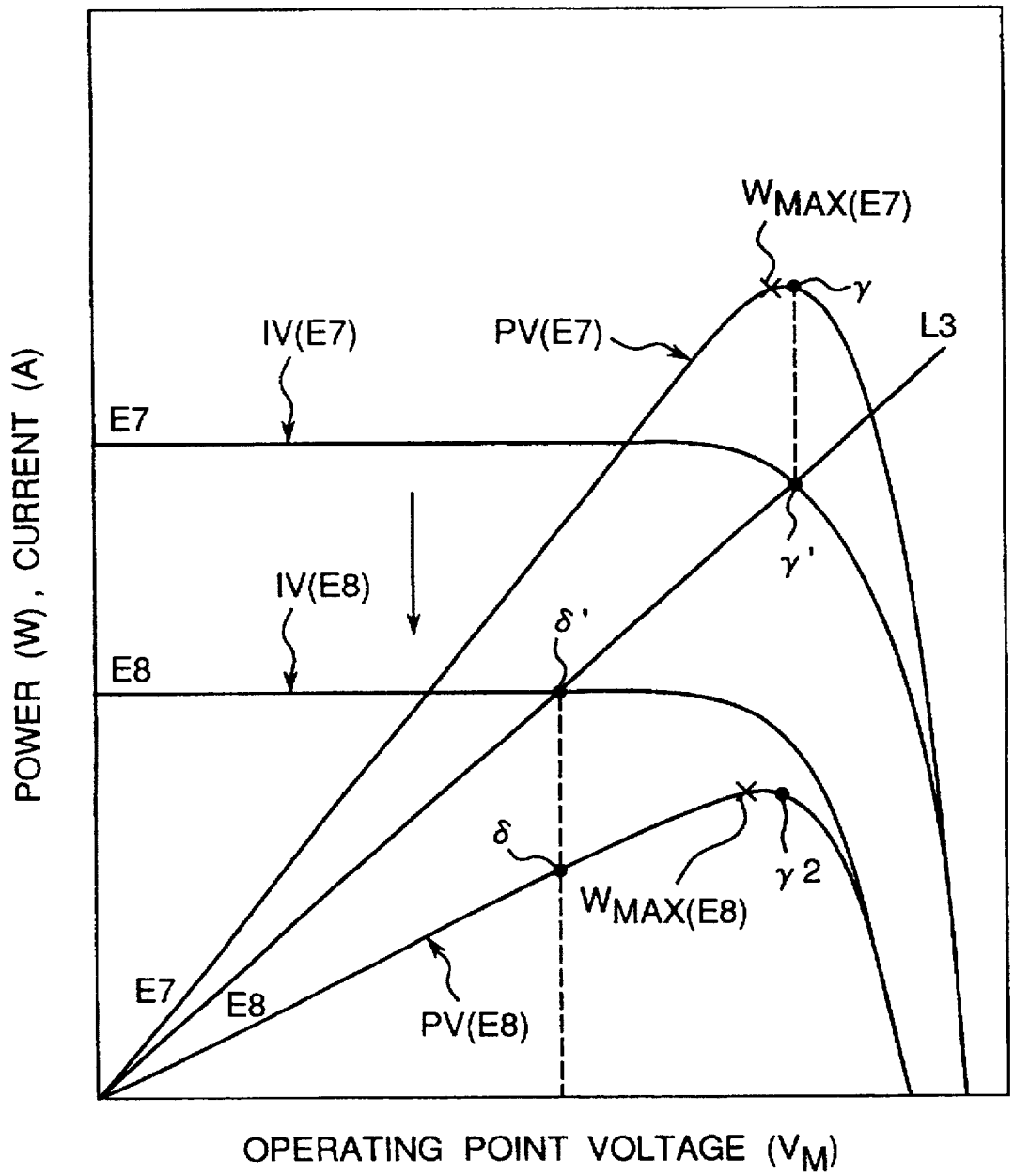
FIG. 21 is a graph schematically showing a relation between the operating point voltage of the inverter apparatus of the fourth embodiment and the photovoltaic array output power or output current.

Next, maximum power point follow control in the case where the solar irradiance abruptly changes from a great intensity (E7) to a small intensity (E8) will be described with reference to FIG. 21. FIG. 21 is a graph showing a correlation between voltage and power or current for the solar irradiances (E7 and E8). The curves denoted by the symbols PV(E7) and PV(E8) indicate the photovoltaic array power-to-voltage characteristic curves for the solar irradiances E7 and E8, while the curves denoted by the symbols IV(E7) and IV(E8) indicate the photovoltaic array current-to-voltage characteristic curves for the solar irradiances E7 and E8.

When the solar irradiance instantaneously changes from E7 to E8 in a state (point $\gamma$) in which the photovoltaic array operating point is following a maximum power point $W_{MAX(E7)}$ on the photovoltaic array power-to-voltage characteristic curve PV(E7), the photovoltaic array operating point instantaneously shifts from the point $\gamma$ to a point $\delta$ on the photovoltaic array power-to-voltage characteristic curve PV(E8). The reason for the above is as follows. In FIG. 21, in the state in which the operating point on the photovoltaic array power-to-voltage characteristic curve PV(E7) is located at the point $\gamma$, the operating point on the photovoltaic array current-to-voltage characteristic curve IV(E7) is located at a point $\gamma'$ at the same voltage as the voltage at the point $\gamma$. In this stage, the characteristic curve of the load connected to the photovoltaic array 2 is L3, where the point $\delta'$ and the characteristic curve L3 of the load intersect each other.

When the solar irradiance E7 instantaneously shifts to E8 in this state, the photovoltaic array operating point shifts from the point $\gamma'$ on the photovoltaic array current-to-voltage characteristic curve IV(E7) to a point $\delta'$ that is the intersection of the load characteristic curve L3 and the photovoltaic array current-to-voltage characteristic curve IV(E8). Therefore, on the photovoltaic array power-to-voltage characteristic curve PV(E8), the photovoltaic array operating point shifts to the point $\delta$ at the same voltage as the voltage at the point $\delta'$.

Figure 22A:
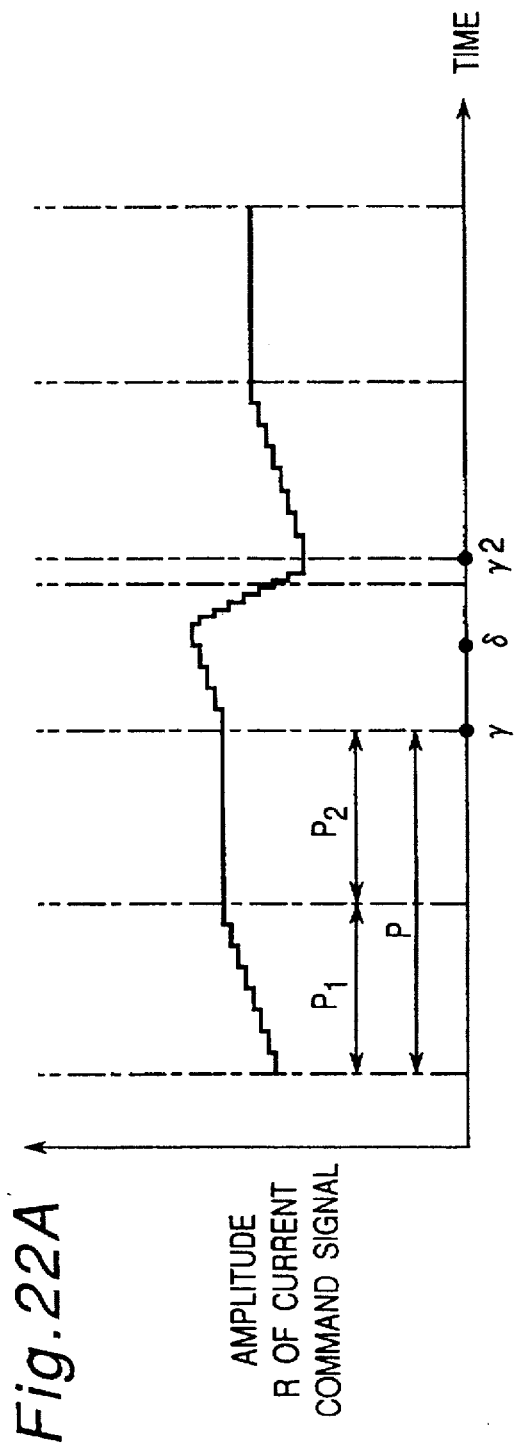
FIGS. 22A and 22B are charts showing the change in amplitude of a current command signal and the change of voltage at the operating point in accordance with the amplitude change, respectively, in the inverter apparatus of the fourth embodiment.
Figure 22B:
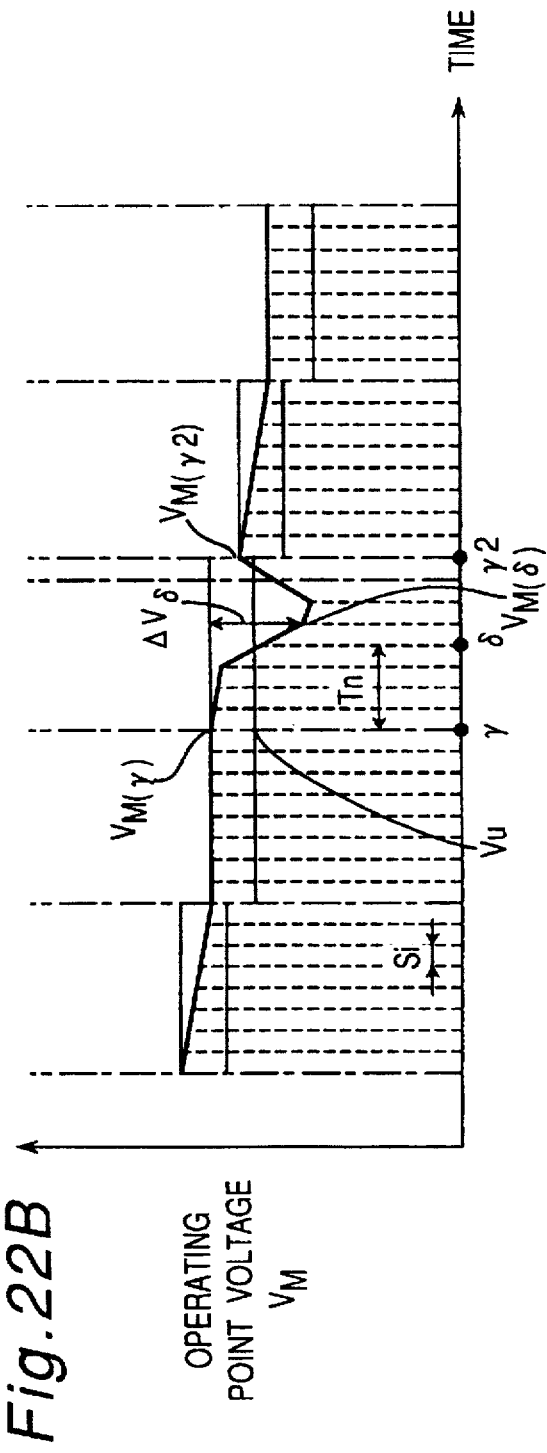

When the solar irradiance thus reduces abruptly, the amplitude R of the current command signal $I_{ref}$ and the voltage at the photovoltaic array operating point change as shown in FIGS. 22A and 22B. That is, before the solar irradiance is abruptly reduced, the photovoltaic array operating point is following the maximum power point $W_{MAX(E7)}$ on the photovoltaic array power-to-voltage characteristic curve PV(E7), and the photovoltaic array operating point voltage is reducing with time until the point γ is reached. When the solar irradiance E7 abruptly reduces to the smaller solar irradiance E8 in this state, the voltage change monitor 301 knows this event as follows. That is, the voltage change monitor 301 calculates a voltage change ratio $\alpha_\delta$ in an elapsed time $T_n$ from the point F to the point H. For calculating the voltage change ratio $\alpha_\delta$, a voltage change $\Delta V_\delta$ $(=V_{ST}-V_{M(\delta)})$ is obtained by subtracting an operating point voltage $V_{M(\delta)}$ at point δ from the voltage standard $V_{ST}$ (=operating point voltage $V_{M(\gamma)}$) at the point γ in the same manner as described above. Then, by dividing the obtained voltage change $\Delta V_\delta$ by the elapsed time $T_n$, the voltage change ratio $\alpha_\delta$ $(=\Delta V_\delta/T_n)$ is obtained.

The voltage change monitor 301 compares the obtained voltage change ratio $\alpha_\delta$ with the preparatorily stored upper limit value β. In this case, because the voltage at the photovoltaic array operating point reduces greatly as time elapses, $V_{ST}>V_{M(H)}$ (meaning that the direction of change of voltage is negative) and $\alpha_\delta>\beta$. Therefore, the voltage change monitor 301 decides that the operating point at the point δ is located on the short-circuit current side of a maximum power point $W_{MAX(E8)}$, and outputs a signal representing the information to the controlled variable calculator 314 at the moment (point δ) at which the voltage change ratio α exceeds the upper limit value β, without waiting for the elapse of the period during which the above decision was made (in the example of FIG. 22, the decision was made in the sub-period $P_1$, but if the decision is made in the sub-period $P_2$, the same thing happens.).

The controlled variable calculator 314 instantaneously switches over to the operation of reducing the inverter output, or the amplitude R of the current command signal $I_{ref}$ based on the signal transmitted from the voltage change monitor 301. When the controlled variable calculator 314 continues the operation of reducing the amplitude R of the current command signal $I_{ref}$, the photovoltaic array operating point shifts from the position on the short-circuit current side of the maximum power point $W_{MAX(E8)}$ toward the maximum power point $W_{MAX(E8)}$ and finally to a position on the open-circuit voltage side of the maximum power point $W_{MAX(E8)}$.

The fact that the photovoltaic array operating point has shifted to the open-circuit voltage side beyond the maximum power point $W_{MAX(E8)}$ is decided as follows. That is, when the operating point shifts from the short-circuit current side to the maximum power point, and then to the open-circuit voltage side, the operating point voltage $V_M$ increases. The voltage change monitor 301 calculates the voltage lower limit $V_U$ $(=V_{ST}-\Delta V)$ by subtracting the permissible voltage change $\Delta V$ from the voltage standard $V_{ST}$ $(=V_{M(\gamma)})$. Then, the operating point voltage $V_M$ is compared with the voltage lower limit $V_U$. When $V_M<V_U$, it is decided that the photovoltaic array operating point is still located on the short-circuit current side of the maximum power point $W_{MAX(E8)}$ and a signal representing the information is outputted to the controlled variable calculator 314. Then, the controlled variable calculator 314 continues the operation of reducing the amplitude R of the current command signal $I_{ref}$, by which the photovoltaic array operating point shifts further to the open-circuit voltage side.

When $V_M>V_U$ (corresponding to a point γ2 in FIG. 22), it is decided that the photovoltaic array operating point has shifted to the open-circuit voltage side beyond the maximum power point $W_{MAX(E8)}$ as a consequence of the shift of the photovoltaic array operating point to the open-circuit voltage side, and a signal representing the information is outputted to the controlled variable calculator 314. Then, the controlled variable calculator 314 stops the operation of reducing the amplitude R of the current command signal $I_{ref}$ and instantaneously switches the operation to the operation of increasing the amplitude R of the current command signal $I_{ref}$. In this stage, the voltage change monitor 301 updates the voltage standard $V_{ST}$ using the operating point voltage $V_{M(\gamma2)}$ at the time point (point γ2) when $V_{M(\gamma2)}>V_U$ occurs.

By executing the operation as described above, the operating point located on the short-circuit current side of the maximum power point $W_{MAX(E8)}$ can be instantaneously shifted to the open-circuit voltage side of the maximum power point $W_{MAX(E8)}$, thereby allowing the photovoltaic array operating point to rapidly follow the maximum power point $W_{MAX(E8)}$ even in the state in which the solar irradiance is abruptly reduced.

The inverter apparatus 300 shifts the photovoltaic array operating point to the open-circuit voltage side by the operation of reducing the amplitude R of the current command signal $I_{ref}$. In executing such operation, the width of reduction of the amplitude R of the current command signal $I_{ref}$ is set according to the magnitude of the voltage change ratio $\alpha_\delta$ when the decision for executing the operation of reducing the amplitude R is made. That is, the greater the voltage change ratio $\alpha_\delta$ is, the more the amplitude R of the current command signal $I_{ref}$ is reduced. Conversely, the smaller the voltage change ratio $\alpha_\delta$ is, the less the amplitude R of the current command signal $I_{ref}$ is reduced. By this operation, the photovoltaic array operating point that has shifted to the short-circuit current side of the maximum power point $W_{MAX(E8)}$ can be rapidly shifted to the open-circuit voltage side. This has been already explained in connection with the third embodiment.

Figure 23:
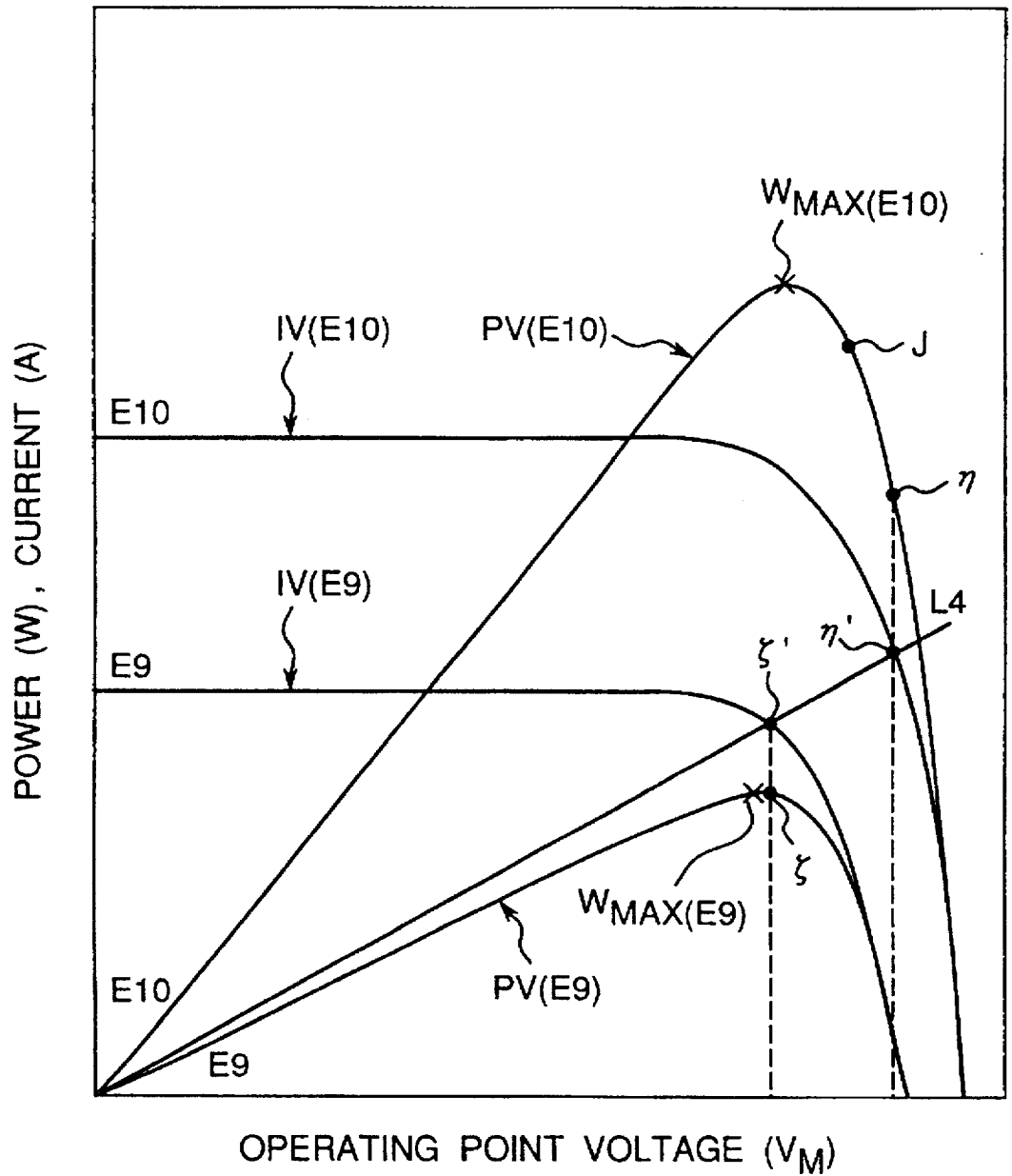
FIG. 23 is a schematic graph showing a relation between the voltage at the operating point of the inverter apparatus of the fourth embodiment and the photovoltaic array output power.

Next, maximum power point follow control in the case where the solar irradiance abruptly changes from a small intensity E9 to a great intensity E10 will be described with reference to FIG. 23. FIG. 23 is a graph showing a correlation between voltage and power or current for the solar irradiances (E9 and E10). The curves denoted by the symbols PV(E9) and PV(E10) indicate the photovoltaic array power-to-voltage characteristic curves for the solar irradiances E9 and E10, while the curves denoted by the symbols IV(E9) and IV(E10) indicate the photovoltaic array current-to-voltage characteristic curves for the solar irradiances E9 and E10.

When the solar irradiance instantaneously changes from E9 to E10 in a state (point ζ) in which the operating point is following a maximum power point $W_{MAX(E9)}$ on the photovoltaic array power-to-voltage characteristic curve PV(E9), the photovoltaic array operating point instantaneously shifts from the point ζ to a point η on the photovoltaic array power-to-voltage characteristic curve PV(E10). The reason for the above is as follows. In FIG. 23, in the state in which the operating point on the photovoltaic array power-to-voltage characteristic curve PV(E9) is located at the point ζ, the operating point on the photovoltaic array current-to-voltage characteristic curve IV(E9) is located at a point ζ' at the same voltage as the voltage at the point ζ. In this stage, characteristic curve of the load connected to the photovoltaic array 2 is L4, where the point ζ' and the characteristic curve L4 of the load intersect each other.

When the solar irradiance E9 instantaneously shifts to E10 in this state, the photovoltaic array operating point shifts from the point ζ' on the photovoltaic array current-to-voltage characteristic curve IV(E9) to a point η' that is the intersection of the load characteristic curve L4 and the photovoltaic array current-to-voltage characteristic curve IV(E10).

Therefore, on the photovoltaic array power-to-voltage characteristic curve PV(E10), the photovoltaic array operating point shifts to the point η at the same voltage as the voltage at the point η'.

Figure 24A:
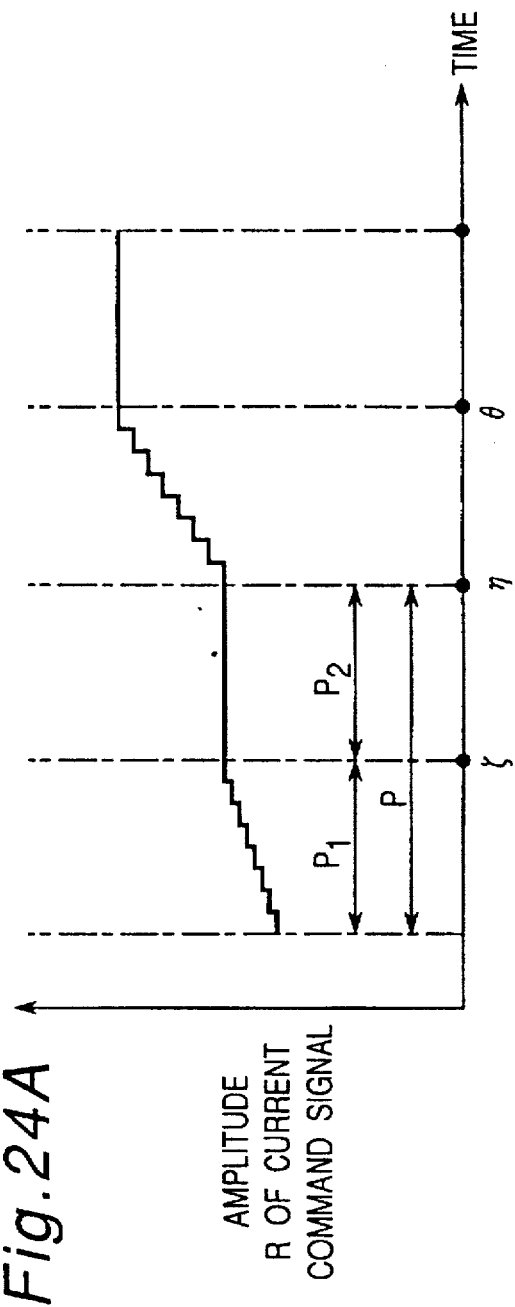
FIGS. 24A and 24B are charts showing the change in amplitude of the current command signal and the change of voltage at the operating point in accordance with the amplitude change, respectively, in the inverter apparatus of the fourth embodiment.
Figure 24B:
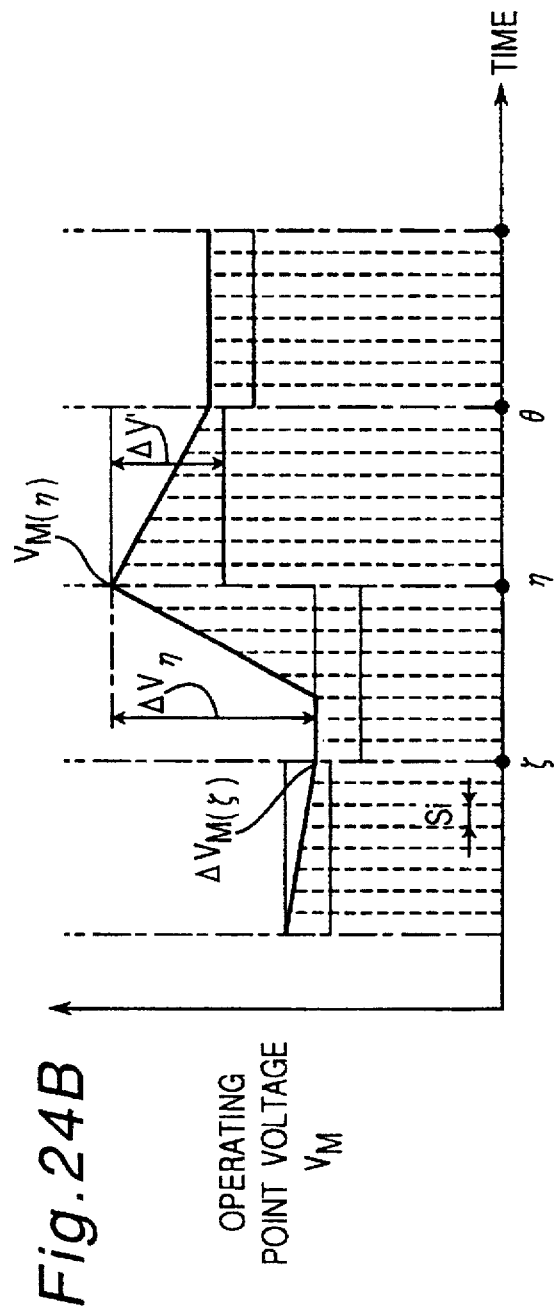

When the solar irradiance thus increases abruptly, the amplitude R of the current command signal $I_{ref}$ and the voltage at the photovoltaic array operating point change as shown in FIGS. 24A and 24B. That is, before the solar irradiance is abruptly increased, the photovoltaic array operating point follows the maximum power point $W_{MAX(E9)}$ on the photovoltaic array power-to-voltage characteristic curve PV(E9), and the photovoltaic array operating point reduces with time until the point ζ is reached. When the solar irradiance E9 abruptly increases to the greater solar irradiance E10, the voltage change monitor 301 knows this event as follows. Assume that the time point after the elapse of the sub-period $P_1$ or $P_2$ from the point ζ is the point η and that the solar irradiance E9 abruptly increases to the greater solar irradiance E10 while the time elapses from the point ζ to the point η. FIGS. 24A and 24B show the abrupt increase from the solar irradiance E9 to the greater solar irradiance E10 during the sub-period $P_2$ during which the amplitude R is not increased, by way of example. However, a similar thing happens when the abrupt increase from the solar irradiance E9 to the larger solar irradiance E10 occurs during the sub-period $P_1$ during which the amplitude is increased gradually.

If the solar irradiance E9 abruptly increases to the greater solar irradiance E10 while the time elapses from the point ζ to the point η, the operating point voltage $V_{M(\eta)}$ at the point η greatly increases by $\Delta V_\eta$ from the voltage standard $V_{ST}$ ($=V_{M(\zeta)}$) set at the point ζ.

Upon detecting that the operating point voltage $V_{M(\eta)}$ at the point η is greater than the voltage standard $V_{ST}$ ($=V_{M(\zeta)}$) ($V_{M(\eta)} > V_{ST}$), the voltage change monitor 301 makes the following decision. That is, the photovoltaic array operating point at the point η is located on the open-circuit voltage side of a maximum power point $W_{MAX(E10)}$ and the distance between the photovoltaic array operating point at the point η and the maximum power point $W_{MAX(E10)}$ is greater than the distance between the photovoltaic array operating point at the point ζ and the maximum power point $W_{MAX(E9)}$.

Upon making the above decision, the voltage change monitor 301 outputs a signal representing the decision content to the controlled variable calculator 314. Then, the controlled variable calculator 314 increases the amplitude R of the current command signal $I_{ref}$ more greatly than usual, thereby rapidly shifting the photovoltaic array operating point to the maximum power point $W_{MAX(E10)}$.

The position of the photovoltaic array operating point in the state in which the solar irradiance is increased is decided in this way. The voltage change monitor 301 calculates the voltage change ratio $\alpha_\eta = (V_{M(\eta)} - V_{M(S)})/(P_2 \text{ or } P_1)$ in this stage, and according to the magnitude of the voltage change ratio $\alpha_\eta$, it decides how much the photovoltaic array operating point at the point η is separated from the maximum power point $W_{MAX(E10)}$. Thus, it thereby deciding the amount of increase of the amplitude R of the current command signal $I_{ref}$. By this operation, the photovoltaic array operating point apart from the maximum power point $W_{MAX(E10)}$ is rapidly shifted to the maximum power point $W_{MAX(E10)}$. This has been already explained in connection with the third embodiment.

Furthermore, in executing the aforementioned operation (the operation of rapidly restoring the photovoltaic array operating point located on the open-circuit voltage side to the vicinity of the maximum power point $W_{MAX(E10)}$), the upper limit value β' of the voltage change ratio α is set as follows. That is, in the operation of rapidly restoring the photovoltaic array operating point located on the open-circuit voltage side to the vicinity of the maximum power point $W_{MAX(E10)}$, the amplitude R is increased more than in the normal case. Therefore, in spite of the fact that the photovoltaic array operating point is located on the open-circuit voltage side of the maximum power point $W_{MAX(E10)}$, the voltage change ratio sometimes exceeds the previously set upper limit value β. If such a state occurs, the voltage change monitor 301 will make such a faulty decision that the photovoltaic array operating point is located on the short-circuit current side of the maximum power point $W_{MAX(E10)}$. Therefore, a permissible voltage change $\Delta V'$ greater than the permissible voltage change $\Delta V$ used in setting the upper limit value β is newly set, and a value $\Delta V'/P_2$ obtained by dividing the permissible voltage change $\Delta V'$ by the sub-period $P_2$ is set as the upper limit value β'. By thus separately setting the upper limit value β' and storing the same in the voltage change monitor 301, the possible faulty decision of the position of the photovoltaic array operating point is prevented.

By executing the above operation, the photovoltaic array operating point that is located on the open-circuit voltage side of the maximum power point $W_{MAX(E10)}$ and separated far apart from the maximum power point $W_{MAX(E10)}$ is made to approach the maximum power point $W_{MAX(E10)}$ more rapidly than in the normal operation of gradually increasing the amplitude R of the current command signal $I_{ref}$.

Figure 25A:
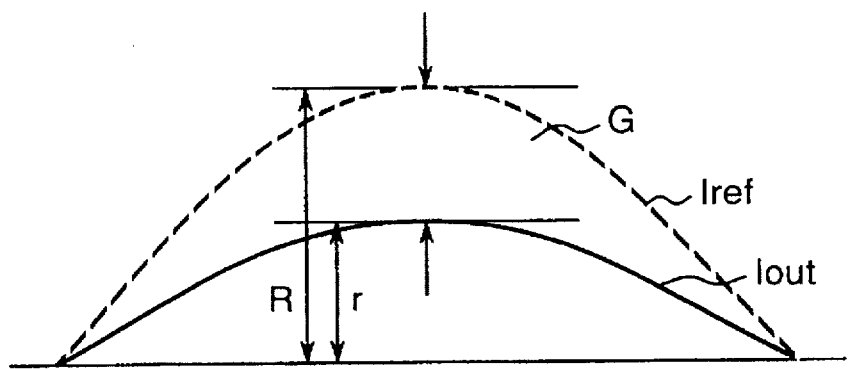
FIGS. 25A, 25B and 25C are diagrams showing a relation between the current command signal and the inverter output current signal of the inverter apparatuses of the fourth and fifth embodiments.

Next, error monitoring operation by the error monitor 302 will be described immediately after the end of the sub-period $P_1$ during which the controlled variable calculator 314 and the PWM controller 15 perform the PWM modulation control for making the waveform of the inverter output current signal $I_{out}$ approach the waveform of the current command signal $I_{ref}$ while gradually increasing the amplitude R of the current command signal $I_{ref}$, an error G as shown in FIG. 25A exists between the amplitude R of the current command signal $I_{ref}$ and the amplitude r of the inverter output current signal $I_{out}$.

In this state, the PWM control is performed in the subsequent sub-period $P_2$ for eliminating the error G, i.e., making the waveform of the inverter output current signal $I_{out}$ unlimitedly approach the waveform of the current command signal $I_{ref}$ while maintaining the amplitude R of the current command signal $I_{ref}$ occurring when the sub-period $P_1$ ends. In the sub-period $P_2$ in which the above control operation is performed, the error monitor 302 monitors whether or not the error G between the amplitude R of the current command signal $I_{ref}$ and the amplitude r of the inverter output current signal $I_{out}$ disappears within a specified time T (specified time T ≦ sub-period $P_2$). When the error G disappears within the specified time T, it is decided that the photovoltaic array operating point is located on the open-circuit voltage side of the maximum power point $W_{MAX}$. Conversely, when the error G does not disappear even after the specified time T has elapsed, it is decided that the photovoltaic array operating point is located on the short-circuit current side of the maximum power point $W_{MAX}$.

Figure 25B:
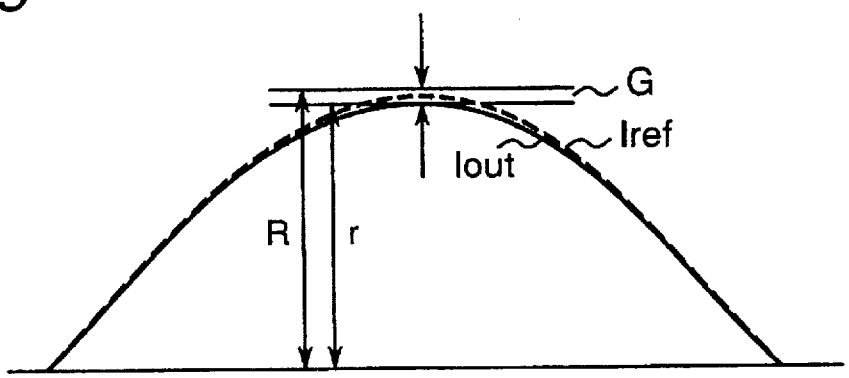

For example, as shown in FIGS. 19A, 19B and 20, the point S located on the open-circuit voltage side of the maximum power point $W_{MAX}$ is the photovoltaic array operating point immediately after the completion of the sub-period $P_1$ during which the amplitude R of the current command signal $I_{ref}$ has increased at a constant rate of increase from the point Q to the point S. At the point S, the aforementioned error G exists between the amplitude R of the current command signal $I_{ref}$ and the amplitude r of the inverter output current signal $I_{out}$. In this state, the controlled variable calculator 314 and the PWM controller 15 subsequently perform the PWM modulation control for making the waveform of the inverter output current signal $I_{out}$ approach the waveform of the current command signal $I_{ref}$ while maintaining the amplitude R of the current command signal $I_{ref}$ as it is, during the sub-period $P_2$ (point S→point S2). After the elapse of the specified time T (T≦$P_2$), the error G between the amplitude R of the current command signal $I_{ref}$ and the amplitude r of the inverter output current signal $I_{out}$ almost disappears as shown in FIG. 25B. Therefore, upon detecting that the error G almost disappears after the elapse of the specified time T, the error monitor 302 decides that the photovoltaic array operating point is located on the open-circuit voltage side of the maximum power point $W_{MAX}$.

Figure 25C:
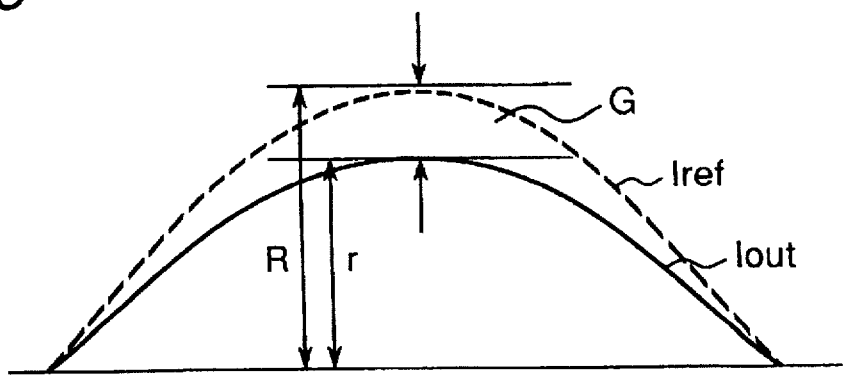
Figure 26:
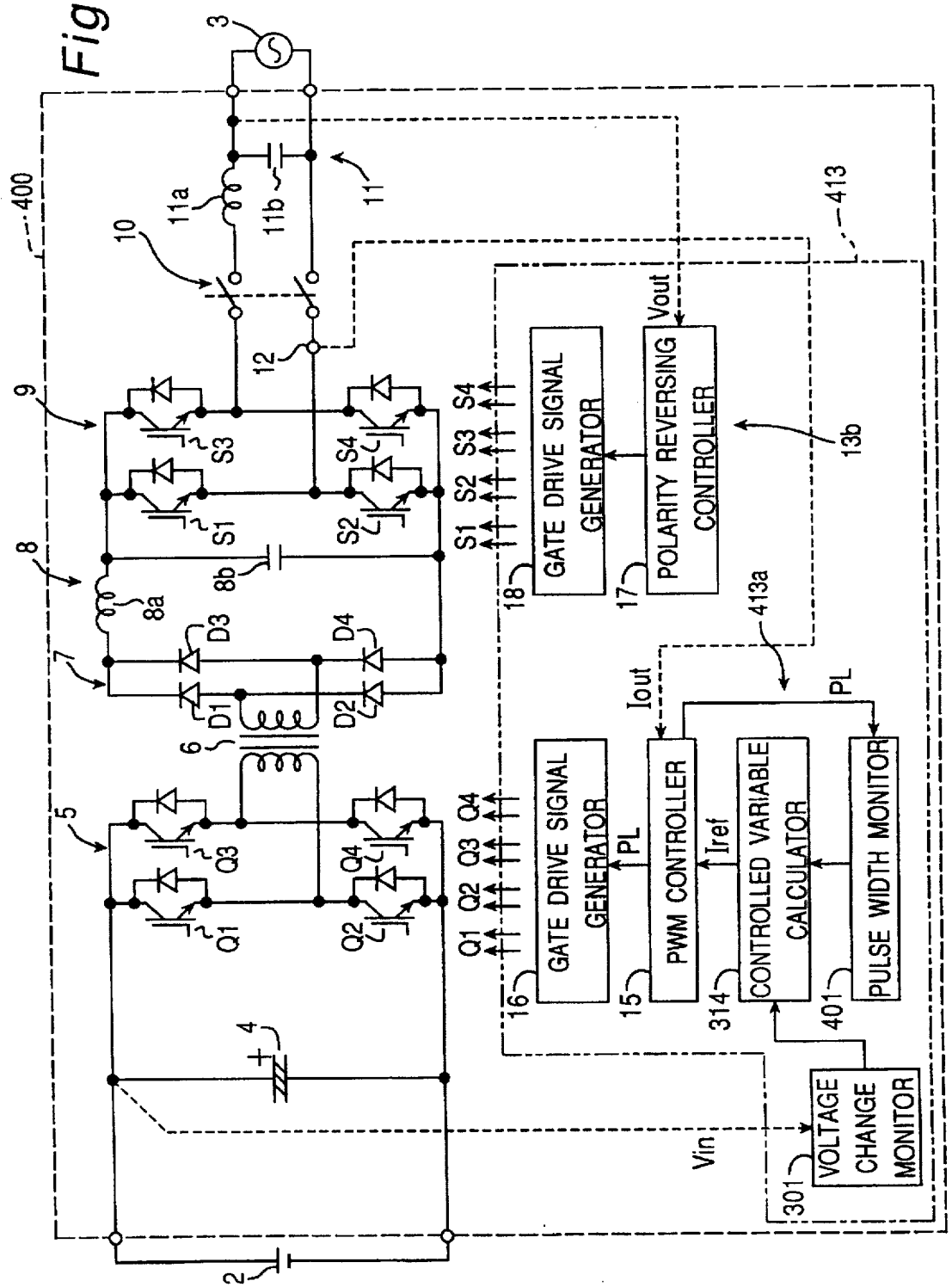
FIG. 26 is a diagram showing the total construction of an inverter apparatus according to a fifth embodiment of the present invention.
Figure 27:
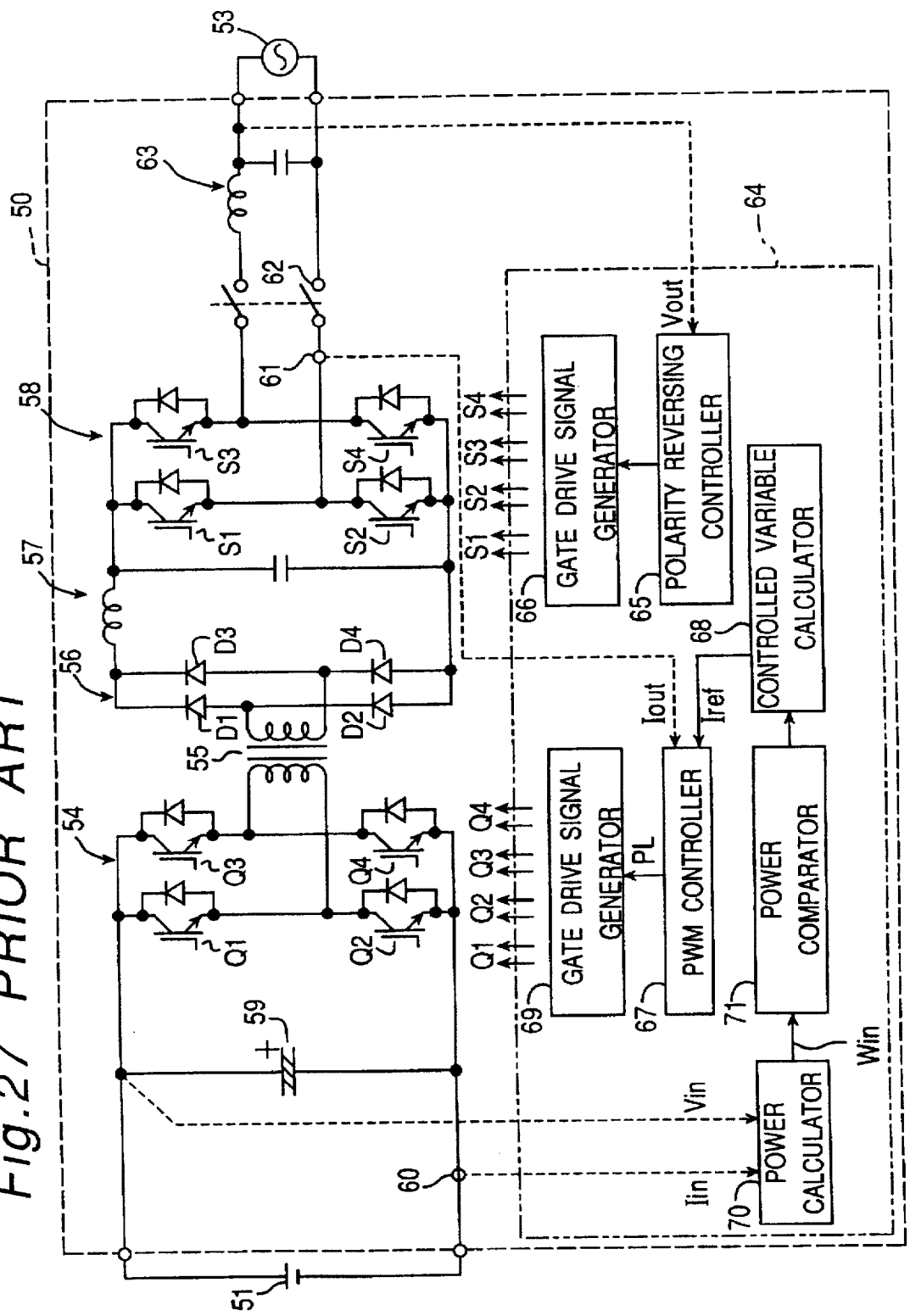
FIG. 27 is a diagram showing the total construction of a prior art inverter apparatus.
Figure 28:
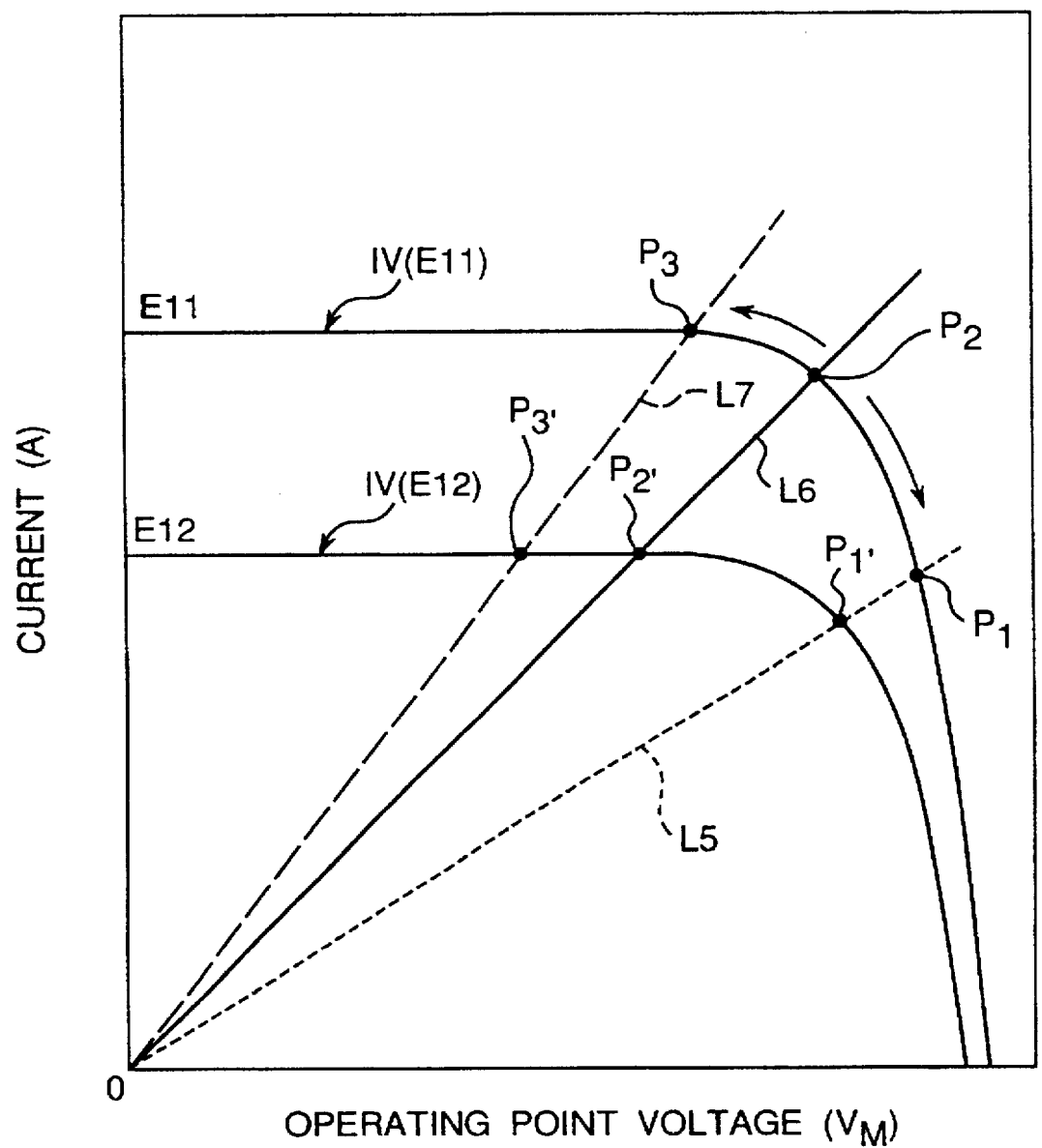
FIG. 28 is a graph showing a relation between the voltage at the operating point of the prior art inverter apparatus and the photovoltaic array output current.
Figure 29:
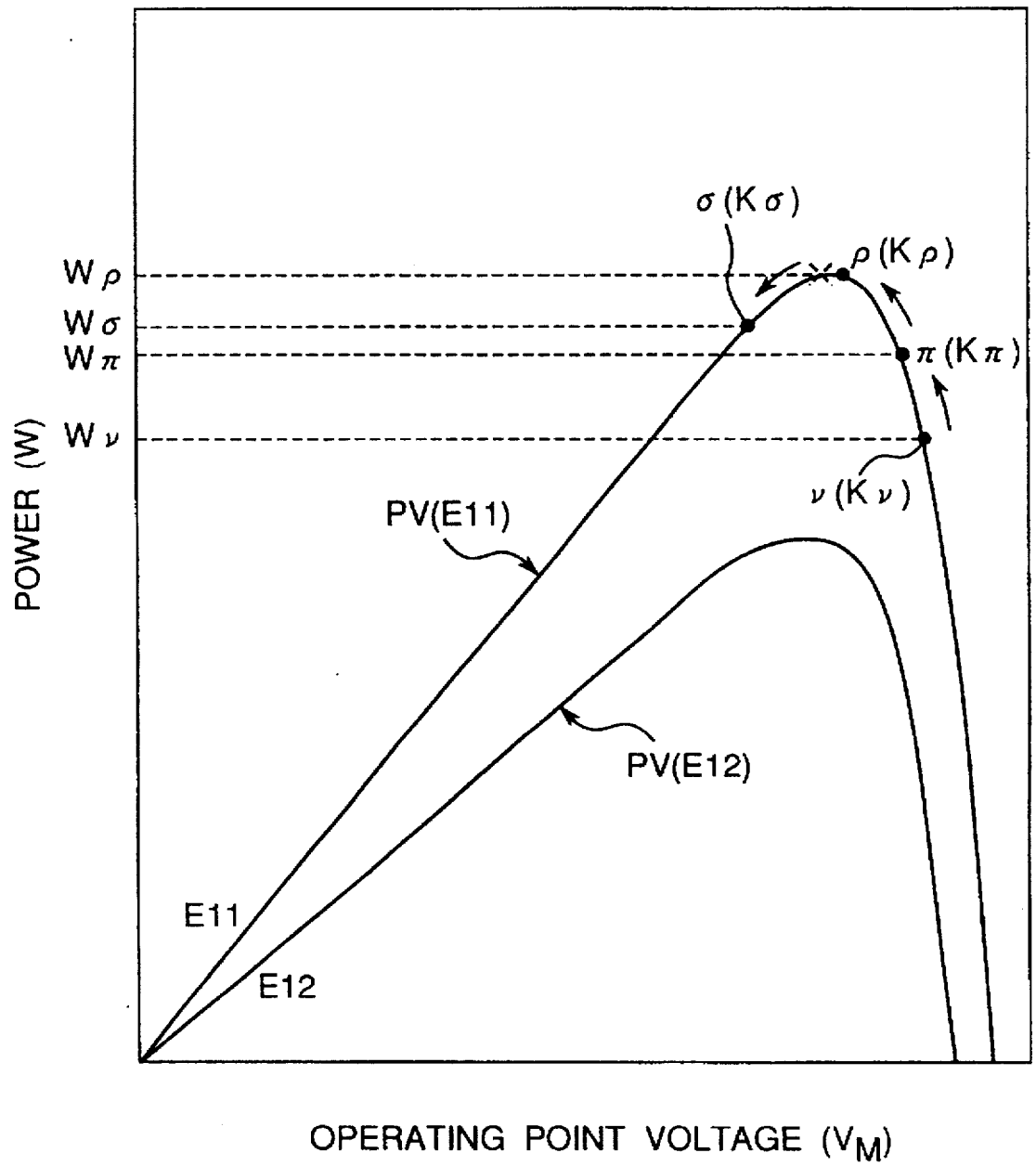
FIG. 29 is a graph showing a relation between the voltage at the operating point of the prior art inverter apparatus and the photovoltaic array output power.

On the other hand, for example, a point S3 shown in FIGS. 19A, 19B and 20 is the photovoltaic array operating point immediately after the slight shift thereof to the short-circuit current side from the open-circuit voltage side beyond the maximum power point $W_{MAX}$ as a consequence of the increase at a constant rate of increase of the amplitude R of the current command signal $I_{ref}$ during the sub-period $P_1$ from the point S2 to the point S3, when the voltage change ratio α has not yet increased so much and is not exceeding the upper limit value β. Furthermore, at this point S3, similarly to the point S, the aforementioned error G exists between the amplitude R of the current command signal $I_{ref}$ and the amplitude r of the inverter output current signal $I_{out}$. In this state, the controlled variable calculator 314 and the PWM controller 15 subsequently perform the PWM modulation control for making the waveform of the inverter output current signal $I_{out}$ approach the waveform of the current command signal $I_{ref}$ while maintaining the amplitude R of the current command signal $I_{ref}$ as it is, during the sub-period $P_2$ (point S3→point X). Even after the elapse of the specified time T (T≦$P_2$), the error G still exists between the amplitude R of the current command signal $I_{ref}$ and the amplitude r of the inverter output current signal $I_{out}$ as shown in FIG. 25C. Therefore, upon detecting that the error G still exists after the elapse of the specified time T, the error monitor 302 decides that the photovoltaic array operating point has shifted to the short-circuit current side from the open-circuit voltage side beyond the maximum power point $W_{MAX}$.

The error monitor 302 decides the position of the photovoltaic array operating point as described above. The subsequent operation of making the photovoltaic array operating point shift toward the maximum power point $W_{MAX}$ is similar to the operation of shifting the photovoltaic array operating point performed after the photovoltaic array position determining operation of the voltage change monitor 301, and thus, no description is provided therefor.

The inverter apparatus 300 that decides the position of the photovoltaic array operating point by using both the voltage change monitor 301 and the error monitor 302 has the following features. That is, when the solar irradiance abruptly changes, the voltage change monitor 301 can more rapidly decide the position of the photovoltaic array operating point than the error monitor 302. Conversely, when the solar irradiance is stable, the error monitor 302 can more rapidly decide the position of the photovoltaic array operating point than the voltage change monitor 301. Therefore, the inverter apparatus 300 that is concurrently using the voltage change monitor 301 and the error monitor 302 quickly decides the position of the photovoltaic array operating point and makes it follow the maximum power point $W_{MAX}$ both when the solar irradiance is stable and when the solar irradiance abruptly changes. This will be described in detail below.

Since the monitoring of the error G between the amplitude R of the current command signal $I_{ref}$ and the amplitude r of the inverter output current signal $I_{out}$ is performed every period P, it takes much time for the error monitor 302 to decide that the solar irradiance has abruptly changed and that the photovoltaic array operating point has shifted to the short-circuit current side.

In contrast, the operating point voltage $V_M$ rapidly changes when the solar irradiance abruptly changes. Therefore, the voltage change monitor 301, which decides the position of the photovoltaic array operating point based on the voltage change ratio α and the direction of the change of voltage (i.e., whether the voltage changes in the positive direction or in the negative direction) of the operating point voltage $V_M$, can rapidly decide the position of the photovoltaic array operating point even when the solar irradiance abruptly changes. Thus, when the solar irradiance has abruptly changed, the voltage change monitor 301 can more rapidly decide the position of the photovoltaic array operating point than the error monitor 302.

On the other hand, in the voltage change monitor 301, the upper limit value β serving as an upper limit of the voltage change ratio α on the open-circuit voltage side is set with a certain margin with respect to a calculated upper limit value β" of the voltage change ratio α(β−β"≠0). This is because, if the upper limit value β is set equal to the calculated upper limit value β", when a measured voltage value becomes smaller than the actual voltage value due to a detection error in detecting the operating point voltage $V_M$ or other factors, the voltage change monitor 301 sometimes faultily decides that the photovoltaic array operating point is located on the short-circuit current side, contrary to the fact that the photovoltaic array operating point is actually located on the open-circuit voltage side of the maximum power point $W_{MAX}$. In order to prevent such a faulty decision from being made, it is necessary to set the upper limit value β at a value slightly greater than the calculated upper limit value β".

In contrast, the change of the operating point voltage in the vicinity of the maximum power point $W_{MAX}$ is small, and even when the photovoltaic array operating point shifts slightly to the short-circuit current side beyond the maximum power point $W_{MAX}$, a voltage decrease amount λ in that stage is very small. Therefore, the voltage change monitor 301 can decide that the photovoltaic array operating point has shifted to the short-circuit current side beyond the maximum power point $W_{MAX}$ only when the voltage decrease amount λ exceeds the margin of the upper limit value β (λ>β−β"). That is, the voltage change monitor 301 cannot decide that the photovoltaic array operating point has shifted to the short-circuit current side until the voltage decrease amount λ exceeds the margin of the upper limit value β (i.e., while λ≦β−β") even when the photovoltaic array operating point has shifted to the short-circuit current side beyond the maximum power point $W_{MAX}$, and consequently a small lag is generated in deciding whether or not the operating point has shifted beyond the maximum power point $W_{MAX}$. Due to the above lag in making a decision, the position decision accuracy of the photovoltaic array operating point by the voltage change monitor 301 at a stable solar irradiance cannot help reducing a little.

In contrast to the above, immediately after the shift of the photovoltaic array operating point to the short-circuit current side beyond the maximum power point $W_{MAX}$, the error G between the amplitude R of the current command signal $I_{ref}$ and the amplitude r of the inverter output current signal $I_{out}$ starts existing. That is, the shift of the photovoltaic array operating point to the short-circuit current side beyond the maximum power point $W_{MAX}$ and the existence of the error G occur almost simultaneously. Therefore, the error monitor 302, which decides the position of the photovoltaic array operating point depending on whether or not the error G is existing, can instantaneously decide the shift of the photovoltaic array operating point to the short-circuit current side beyond the maximum power point $W_{MAX}$ in the state in which the solar irradiance is stable. Thus, when the solar irradiance is stable, the error monitor 302 can more rapidly decide the position of the photovoltaic array operating point than the voltage change monitor 301.

(Fifth Embodiment)

In the aforementioned fourth embodiment, the position of the photovoltaic array operating point is decided depending on whether or not the error G has converged on zero by the voltage change monitor 301 and the error monitor 302. However, in an inverter apparatus 400 according to the fifth embodiment, a pulse width monitor 401 is provided instead of the error monitor 302 in a high-frequency inverter bridge control system 413a of a control circuit 413, and the pulse width monitor 401 and the voltage change monitor 301 decide the position of the photovoltaic array operating point. It is to be noted that this inverter apparatus 400 has the same constructions and operations as those of the inverter apparatus 300 of the fourth embodiment except for the pulse width monitor 401, and thus, no description is provided therefor.

To the pulse width monitor 401 is inputted the pulse train signal PL obtained by the PWM controller 15, and the pulse width monitor 401 is always monitoring the pulse width $P_W$ of the inputted pulse train signal PL. The pulse width $P_W$ of the pulse train signal PL varies in accordance with a specific regularity corresponding to the change of the output power of the photovoltaic array 2. Therefore, by monitoring the change of the pulse width $P_W$, it is decided whether the operating point on the photovoltaic array output characteristic curve is located on the open-circuit voltage side or on the short-circuit current side of the maximum power point.

Next, error monitoring operation by the error monitor 302 will be described. In the sub-period $P_1$, the controlled variable calculator 314 and the PWM controller 15 perform the PWM modulation control for making the waveform of the inverter output current signal $I_{out}$ approach the waveform of the current command signal $I_{ref}$ while gradually increasing the amplitude R of the current command signal $I_{ref}$. As a result, immediately after the sub-period $P_1$, an error G as shown in FIG. 25A exists between the amplitude R of the current command signal $I_{ref}$ and the amplitude r of the inverter output current signal $I_{out}$.

In this state, the PWM control is performed in the subsequent sub-period $P_2$ for eliminating the error G, i.e., making the waveform of the inverter output current signal $I_{out}$ unlimitedly approach the waveform of the current command signal $I_{ref}$ while maintaining the amplitude R of the current command signal $I_{ref}$ occurring when the sub-period $P_1$ ends. In the sub-period $P_2$ in which the above control operation is performed, the pulse width monitor 401 monitors whether or not the pulse width $P_W$ of the pulse train signal PL converges on a stabilized pulse width within a specified time T (specified time T ≦ sub-period $P_2$). When the pulse width $P_W$ has converged upon a stabilized pulse width within the specified time T, it is decided that the photovoltaic array operating point is located on the open-circuit voltage side of the maximum power point $W_{MAX}$. Conversely, when the pulse width $P_W$ does not converge upon a stabilized pulse width even after the specified time T has elapsed, it is decided that the photovoltaic array operating point is located on the short-circuit current side of the maximum power point $W_{MAX}$.

For example, as shown in FIGS. 19A, 19B and 20, the point S located on the open-circuit voltage side of the maximum power point $W_{MAX}$ is the photovoltaic array operating point immediately after the completion of the sub-period $P_1$ during which the amplitude R of the current command signal $I_{ref}$ has increased at a constant rate of increase from the point Q to the point S. At the point S, the aforementioned error G exists between the amplitude R of the current command signal $I_{ref}$ and the amplitude r of the inverter output current signal $I_{out}$. In this state, the controlled variable calculator 314 and the PWM controller 15 subsequently perform the PWM modulation control for making the waveform of the inverter output current signal $I_{out}$ approach the waveform of the current command signal $I_{ref}$ while maintaining the amplitude R of the current command signal $I_{ref}$ as it is, during the sub-period $P_2$ (point S→point S2). After the elapse of the specified time T (T≦$P_2$), the error G between the amplitude R of the current command signal $I_{ref}$ and the amplitude r of the inverter output current signal $I_{out}$ almost disappears as shown in FIG. 25B. As a consequence, the pulse width $P_W$ converges on a stable pulse width. Therefore, upon detecting that the pulse width $P_W$ has converged on a stabilized pulse width after the elapse of the specified time T, the error monitor 302 decides that the photovoltaic array operating point is located on the open-circuit voltage side of the maximum power point $W_{MAX}$.

On the other hand, for example, a point S3 shown in FIGS. 19A, 19B and 20 is the photovoltaic array operating point immediately after the slight shift thereof to the short-circuit current side from the open-circuit voltage side beyond the maximum power point $W_{MAX}$ as a consequence of the increase at a constant rate of increase of the amplitude R of the current command signal $I_{ref}$ during the sub-period $P_1$ from the point S2 to the point S3, when the voltage change ratio α has not yet increased so much and is not exceeding the upper limit value β. Furthermore, at this point S3, similarly to the point S, the aforementioned error G exists between the amplitude R of the current command signal $I_{ref}$ and the amplitude r of the inverter output current signal $I_{out}$. In this state, the controlled variable calculator 314 and the PWM controller 15 subsequently perform the PWM modulation control for making the waveform of the inverter output current signal $I_{out}$ approach the waveform of the current command signal $I_{ref}$ while maintaining the amplitude R of the current command signal $I_{ref}$ as it is, during the sub-period $P_2$ (point S3→point X). Even after the elapse of the specified time T (T≦$P_2$), the error G still exists between the amplitude R of the current command signal $I_{ref}$ and the amplitude r of the inverter output current signal $I_{out}$ as shown in FIG. 25C, so that the pulse width $P_W$ of the pulse train signal PL does not converge on a stable pulse width. Therefore, upon detecting the non-stabilization of the pulse width $P_W$ after the elapse of the specified time T, the pulse width monitor 401 decides that the photovoltaic array operating point has shifted to the short-circuit current side from the open-circuit voltage side beyond the maximum power point $W_{MAX}$.

The pulse width monitor 401 decides the position of the photovoltaic array operating point as described above. The subsequent operation of making the photovoltaic array operating point shift toward the maximum power point $W_{MAX}$ is similar to the operation of shifting the photovoltaic array operating point performed after the photovoltaic array position determining operation of the voltage change monitor 301, and thus, no description is provided therefor.

In the inverter apparatus 400, when the solar irradiance abruptly changes, the voltage change monitor 301 can more rapidly decide the position of the photovoltaic array operating point than the pulse width monitor 401. Conversely, when the solar irradiance is stable, the pulse width monitor 401 can more rapidly decide the position of the photovoltaic array operating point than the voltage change monitor 301. Therefore, the inverter apparatus 400 that is concurrently using the voltage change monitor 301 and the pulse width monitor 402 quickly decides the position of the photovoltaic array operating point and makes it follow the maximum power point $W_{MAX}$ both when the solar irradiance is stable and when the solar irradiance abruptly changes. The reason for this is similar to that explained in connection with the fourth embodiment, and is therefore omitted here.

The embodiments of the present invention have been described as above. In each of the aforementioned embodiments, the present invention has been implemented by a current control type inverter apparatus. However, the present invention can be implemented by a voltage control type inverter apparatus. In this case, it is proper to control the amplitude or the phase of a voltage command signal (substituting for the current command signal $I_{ref}$ in each of the embodiments) based on position decision information of the photovoltaic array operating point outputted from the voltage change monitors 201, 301, the error monitor 20, 302 or the pulse width monitor 19, 401.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inverter control method which performs on/off control of switching elements connected to a DC power supply such that an inverter output current signal coincides with a reference current waveform signal so as to convert DC power from the DC power supply into an AC power, comprising:

monitoring one of (1) a pulse width of a pulse train signal for executing the on/off control of the switching elements, (2) an error between the reference current waveform signal and the inverter output current signal and (3) change per unit time of voltage at a DC power supply operating point;

determining whether the DC power supply operating point is located on an open-circuit voltage side or on a short-circuit current side of a maximum power point on an output characteristic curve of the DC power supply based on a result of the monitoring; and controlling the inverter output based on a result of the determination such that the DC power supply operating point follows the maximum power point.

2. An inverter control method as claimed in claim 1, wherein the DC power supply is a photovoltaic array.

3. An inverter control method as claimed in claim 1, further comprising:

increasing the inverter output such that the DC power supply operating point shifts toward the maximum power point when it is determined that the operating point is located on the open-circuit voltage side of the maximum power point, and decreasing the inverter output such that the operating point shifts to the open-circuit voltage side when it is determined that the operating point is located on the short-circuit current side of the maximum power point.

4. An inverter control method as claimed in claim 3, wherein the increasing and decreasing of the inverter output are performed by increasing and decreasing an amplitude of the reference current waveform signal, respectively.

5. An inverter control method as claimed in claim 4, wherein the error between the reference current waveform signal and the inverter output current signal is monitored, and when the error substantially disappears within a specified time, it is determined that the DC power supply operating point is located on the open-circuit voltage side of the maximum power point and the amplitude of the reference current waveform signal is increased to shift the operating point toward the maximum power point, and it is determined that the operating point is located on the short-circuit current side of the maximum power point when the error does not disappear after an elapse of the specified time, and the amplitude of the reference current waveform signal is reduced to shift the operating point to the open-circuit voltage side.

6. An inverter control method as claimed in claim 1, wherein the pulse width of the pulse train signal is monitored, and when a variation of the pulse width substantially disappears within a specified time, it is determined that the operating point on the output characteristic curve of the DC power supply is located on the open-circuit voltage side of the maximum power point, and it is determined that the operating point is located on the short-circuit current side of the maximum power point when the variation of the pulse width does not disappear after an elapse of the specified time, and then, based on the determination, the on/off operation of the switching elements is performed through pulse width modulation (PWM) control.

7. An inverter control method as claimed in claim 6, wherein when the pulse width becomes greater than a preset maximum permissible width, it is determined that the operating point is located on the short-circuit current side of the maximum power point.

8. An inverter control method as claimed in claim 1, wherein the change per unit time of voltage at the DC power supply operating point is monitored.

9. An inverter control method as claimed in claim 8, wherein an upper limit value of the change per unit time of voltage at the DC power supply operating point is set, and the upper limit value is compared with the monitored change of voltage to determine the position of the DC power supply operating point on the output characteristic curve.

10. An inverter control method as claimed in claim 9, wherein the change per unit time of voltage at the DC power supply operating point is monitored while executing the operation of increasing or decreasing the inverter output, and when the voltage at the DC power supply operating point is lowered and the change of voltage does not exceed the upper limit value, it is determined that the DC power supply operating point is located on the open-circuit voltage side of the maximum power point, and it is determined that the DC power supply operating point is located on the short-circuit current side of the maximum power point when the voltage at the DC power supply operating point is lowered and the change of voltage exceeds the upper limit value.

11. An inverter control method as claimed in claim 8, wherein a controlled variable of the inverter output is set according to a magnitude of the change per unit time of voltage at the DC power supply operating point.

12. An inverter control method as claimed in claim 8, wherein the DC power supply operating point is made to follow the maximum power point on the output characteristic curve by monitoring the error between the reference current waveform signal and the inverter output current signal in addition to the change per unit time of voltage at the DC power supply operating point.

13. An inverter control method as claimed in claim 12, wherein both the change per unit time of voltage at the DC power supply operating point and the error between the reference current waveform signal and the inverter output current signal are monitored while the operation of increasing or decreasing the inverter output is repeatedly performed alternately with an operation of maintaining an unchanged state of the inverter output.

14. An inverter control method as claimed in claim 12, wherein the change per unit time of voltage at the DC power supply operating point and the error between the reference current waveform signal and the inverter output current signal are monitored while the operation of increasing the inverter output is repeatedly performed alternately with an operation of maintaining the unchanged state of the inverter output;

when the voltage at the DC power supply operating point is lowered and the change of voltage does not exceed the upper limit value, or when the error substantially disappears within a specified time, it is determined that the DC power supply operating point is located on the open-circuit voltage side of the maximum power point; and when the voltage at the DC power supply operating point is lowered and the change of voltage exceeds the upper limit value, or when the error does not disappear after an elapse of the specified time, it is determined that the DC power supply operating point is located on the short-circuit current side of the maximum power point.

15. An inverter control method as claimed in claim 14, wherein the alternate operations of increasing the inverter output and maintaining the unchanged state of the inverter output are continued when it is determined that the DC power supply operating point is located on the open-circuit voltage side of the maximum power point; and when it is decided that the DC power supply operating point is located on the short-circuit current side of the maximum power point, switchover to the operation of decreasing the inverter output is performed.

16. An inverter control method as claimed in claim 8, wherein the DC power supply operating point is made to follow the maximum power point on the output characteristic curve by monitoring the variation of the pulse width of the pulse train signal in addition to the change per unit time of voltage at the DC power supply operating point.

17. An inverter control method as claimed in claim 16, wherein the change per unit time of voltage at the DC power supply operating point and the variation of the pulse width of the pulse train signal are monitored while the operation of increasing or decreasing the inverter output is repeatedly performed alternately with an operation of maintaining an unchanged state of the inverter output.

18. An inverter control method as claimed in claim 16, wherein the change per unit time of voltage at the DC power supply operating point and the variation of the pulse width of the pulse train signal are monitored while the operation of increasing the inverter output is repeatedly performed alternately with an operation of maintaining an unchanged state of the inverter output;

when the voltage at the DC power supply operating point is lowered and the change of voltage does not exceed the upper limit value, or when the variation of the pulse width substantially disappears within a specified time, it is determined that the DC power supply operating point is located on the open-circuit voltage side of the maximum power point; and when the voltage at the DC power supply operating point is lowered and the change of voltage exceeds the upper limit value, or when the variation of the pulse width does not disappear after an elapse of the specified timed, it is determined that the DC power supply operating point is located on the short-circuit current side of the maximum power point.

19. An inverter control method as claimed in claim 18, wherein the alternate operations of increasing the inverter output and maintaining the unchanged state of the inverter output are continued when it is determined that the DC power supply operating point is located on the open-circuit voltage side of the maximum power point; and switchover to the operation of decreasing the inverter output is performed when it is determined that the DC power supply operating point is located on the short-circuit current side of the maximum power point.

20. An inverter apparatus which has switching elements connected to a DC power supply and a control circuit for executing an on/off control of the switching elements such that an inverter output current signal coincides with a reference current waveform signal, and converts DC power from the DC power supply into an alternating current, wherein the control circuit comprises:

a monitoring section which monitors one of (1) a pulse width of a pulse train signal for executing the on/off control of the switching elements, (2) an error between the reference current waveform signal and the inverter output current signal and (3) change per unit time of voltage at a DC power supply operating point, and determines whether the DC power supply operating point is located on an open-circuit voltage side or on a short-circuit current side of a maximum power point on an output characteristic curve of the DC power supply, based on a result of the monitoring; and a control section which controls the inverter output such that the DC power supply operating point follows the maximum power point, based on a result of made by the monitoring section.

21. An inverter apparatus as claimed in claim 20, wherein the monitoring section monitors the pulse width of the pulse train signal, thereby determining that the operating point on the output characteristic curve of the DC power supply is located on the open-circuit voltage side of the maximum power point when a variation of the pulse width substantially disappears within a specified time, and determining that the operating point is located on the short-circuit current side of the maximum power point when the variation of the pulse width does not disappear after an elapse of the specified time;

when the monitoring section determines that the operating point is located on the open-circuit voltage side of the maximum power point, the control section increases the inverter output such that the operating point shifts toward the maximum power point; and when the monitoring section determines that the operating point is located on the short-circuit current side of the maximum power point, the control section reduces the inverter output such that the operating point shifts to the open-circuit voltage side.

22. An inverter apparatus as claimed in claim 21, wherein the monitoring section comprises a pulse width comparator comparing the pulse width with a preset maximum permissible width and determines that the operating point is located on the short-circuit current side of the maximum power point when the pulse width is wider than the maximum permissible width.

23. An inverter apparatus as claimed in claim 20, wherein the monitoring section monitors the error between the reference current waveform signal and the inverter output current signal, thereby determining that the operating point on the output characteristic curve of the DC power supply is located on the open-circuit voltage side of the maximum power point when the error substantially disappears within a specified time, and determining that the operating point is located on the short-circuit current side of the maximum power point when the error does not disappear after an elapse of the specified time;

when the monitoring section determines that the operating point is located on the open-circuit voltage side of the maximum power point, the control section shifts the operating point toward the maximum power point by controlling the amplitude of the reference current waveform signal to increase; and when the monitoring section determines that the operating point is located on the short-circuit current side of the maximum power point, the control section shifts the operating point to the open-circuit voltage side by controlling the amplitude of the reference current waveform signal to decrease.

24. An inverter apparatus as claimed in claim 20, wherein the monitoring section monitors the change per unit time of voltage at the DC power supply operating point, thereby determining that the DC power supply operating point is located on the open-circuit voltage side of the maximum power point when the change per unit time of voltage at the DC power supply operating point does not exceed the upper limit value, and determining that the DC power supply operating point is located on the short-circuit current side of the maximum power point when the change of voltage exceeds the upper limit value.

25. An inverter apparatus as claimed in claim 24, wherein when the monitoring section determines that the DC power supply operating point is located on the open-circuit voltage side of the maximum power point, the control section continues the operation of increasing the inverter output, and switches over to the operation of decreasing the inverter output when the monitoring section determines that the DC power supply operating point is located on the short-circuit current side of the maximum power point.

26. An inverter apparatus as claimed in claim 25, wherein the control circuit further comprises an error monitoring section which monitors the error between the reference current waveform signal and the inverter output current signal, and which determines that the DC power supply operating point is located on the open-circuit voltage side of the maximum power point when the error substantially disappears within a specified time, and which determines that the DC power supply operating point is located on the short-circuit current side of the maximum power point when the error does not disappear after an elapse of the specified time.

27. An inverter apparatus as claimed in claim 25, wherein the control circuit further comprises a pulse width monitoring section which monitors the pulse width of the pulse train signal, and which determines that the DC power supply operating point is located on the open-circuit voltage side of the maximum power point when the variation of the pulse width substantially disappears within a specified time, and which determines that the DC power supply operating point is located on the short-circuit current side of the maximum power point when the variation of the pulse width does not disappear after an elapse of the specified time.

28. An inverter apparatus as claimed in claim 20, wherein the DC power supply is a photovoltaic array.

* * * * *